United States Patent
Iyoda

[19]

[11] Patent Number: 5,961,562
[45] Date of Patent: *Oct. 5, 1999

[54] APPARATUS FOR AND METHOD OF CONTROLLING ACTIVATION OF PASSIVE RESTRAINT

[75] Inventor: Motomi Iyoda, Seto, Japan

[73] Assignee: Toyota Jidosha Kabushiki Kaisha, Toyota, Japan

[ * ] Notice: This patent is subject to a terminal disclaimer.

[21] Appl. No.: 08/742,874

[22] Filed: Nov. 1, 1996

[30] Foreign Application Priority Data

Nov. 6, 1995 [JP] Japan .................................. 7-313623

[51] Int. Cl.$^6$ .................................................. B06R 21/32
[52] U.S. Cl. ................................ 701/45; 701/45; 701/46; 307/10.1; 180/271; 180/282; 280/734; 280/735
[58] Field of Search ...................... 701/45, 46; 307/10.1; 180/271, 282; 280/734, 735

[56] References Cited

U.S. PATENT DOCUMENTS

| | | |
|---|---|---|
| 4,243,248 | 1/1981 | Scholz et al. . |
| 4,836,024 | 6/1989 | Woehrl et al. . |
| 4,985,835 | 1/1991 | Sterler et al. ............................. 701/46 |
| 5,083,276 | 1/1992 | Okano et al. . |
| 5,173,614 | 12/1992 | Woehrl et al. . |
| 5,282,134 | 1/1994 | Gioutsos et al. .......................... 701/45 |
| 5,338,062 | 8/1994 | Kiuchi et al. . |
| 5,365,114 | 11/1994 | Tsurushima et al. . |
| 5,484,166 | 1/1996 | Mazur et al. . |
| 5,504,569 | 4/1996 | Kato et al. . |
| 5,513,109 | 4/1996 | Fujishima . |
| 5,740,041 | 4/1998 | Iyoda ........................................ 701/45 |

FOREIGN PATENT DOCUMENTS

| | | |
|---|---|---|
| 0430813 A1 | 6/1991 | European Pat. Off. . |
| 0 528541 A2 | 2/1993 | European Pat. Off. . |
| 0709255 A1 | 5/1996 | European Pat. Off. . |
| 4128230 A1 | 5/1992 | Germany . |
| 6-56000 | 3/1994 | Japan . |
| WO 90/03289 | 4/1990 | WIPO . |
| WO 96/27514 | 9/1996 | WIPO . |

*Primary Examiner*—William A. Cuchlinski, Jr.
*Assistant Examiner*—Ed Pipala
*Attorney, Agent, or Firm*—Pillsbury Madison & Sutro LLP

[57] ABSTRACT

A CPU 30 first receives data of accelerations Gx and Gy applied respectively along a longitudinal axis and a lateral axis of a vehicle (S20). The CPU 30 then calculates an arithmetic value fx from the acceleration Gx in the longitudinal direction according to specified arithmetic operations, and calculates an arithmetic value fy from the acceleration Gy in the lateral direction according to specified arithmetic operations (S22). The CPU 30 subsequently projects vectors based on the arithmetic values fx and fy in a preset direction a to yield projective components of the vectors, and determines a sum fa of the projective components (S24). The CPU 30 compares the projective component fa with a threshold value fth(a) previously set for the direction a, and determines whether or not the projective component fa is greater than the threshold value fth(a) (S26). When determining that the projective component fa is greater than the threshold value fth(a), the CPU 30 generates an activation signal to activate air bag units 60 to 66 (S28). The structure of the present invention does not require the calculation of the magnitude or the direction of a composite vector, thereby being free from complicated and time-consuming arithmetic operations. No division is included in the required arithmetic operations, so that the result of calculation does not diverge.

10 Claims, 37 Drawing Sheets

Fig. 4

| No | ARITHMETIC VALUES | MAGNITUDE OF COMPOSITE VECTOR | DIRECTION OF COMPOSITE VECTOR | REMARKS |
|---|---|---|---|---|
| 1 | Gx, Gy | $\sqrt{Gx^2+Gy^2}$ | $\tan^{-1}\dfrac{Gy}{Gx}$ | |
| 2 | Vx, Vy | $\sqrt{Vx^2+Vy^2}$ | $\tan^{-1}\dfrac{Vy}{Vx}$ | $V=\int G\,dt$ |
| 3 | Sx, Sy | $\sqrt{Sx^2+Sy^2}$ | $\tan^{-1}\dfrac{Sy}{Sx}$ | $S=\int\int G\,dt$ |
| ⋮ | ⋮ | ⋮ | ⋮ | ⋮ |
| n | fx, fy | $\sqrt{fx^2+fy^2}$ | $\tan^{-1}\dfrac{fy}{fx}$ | $f=f(G)$ |

$v\alpha = Vx\cos\alpha + Vy\sin\alpha$

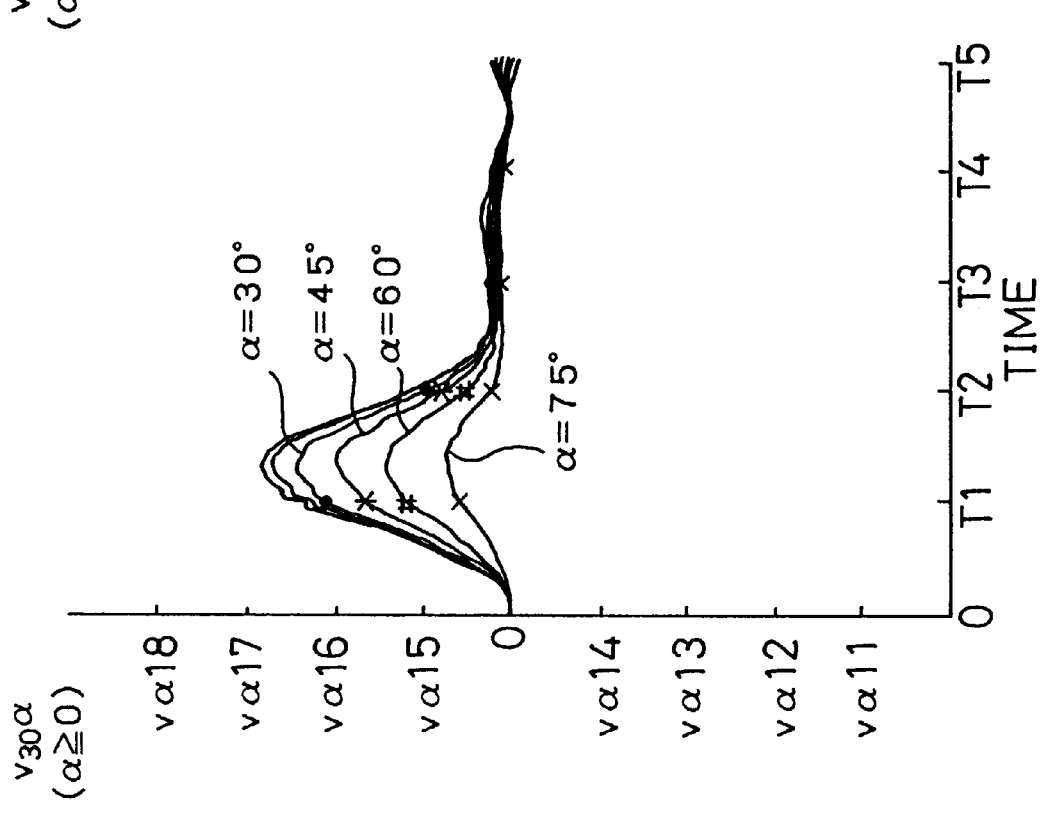
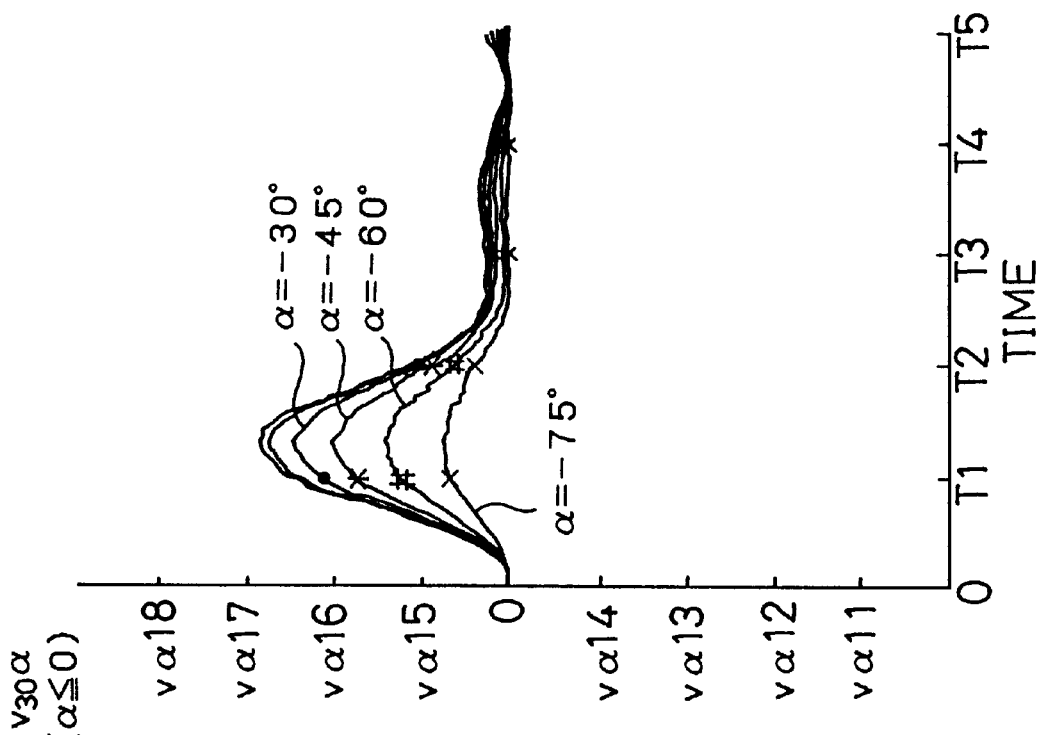

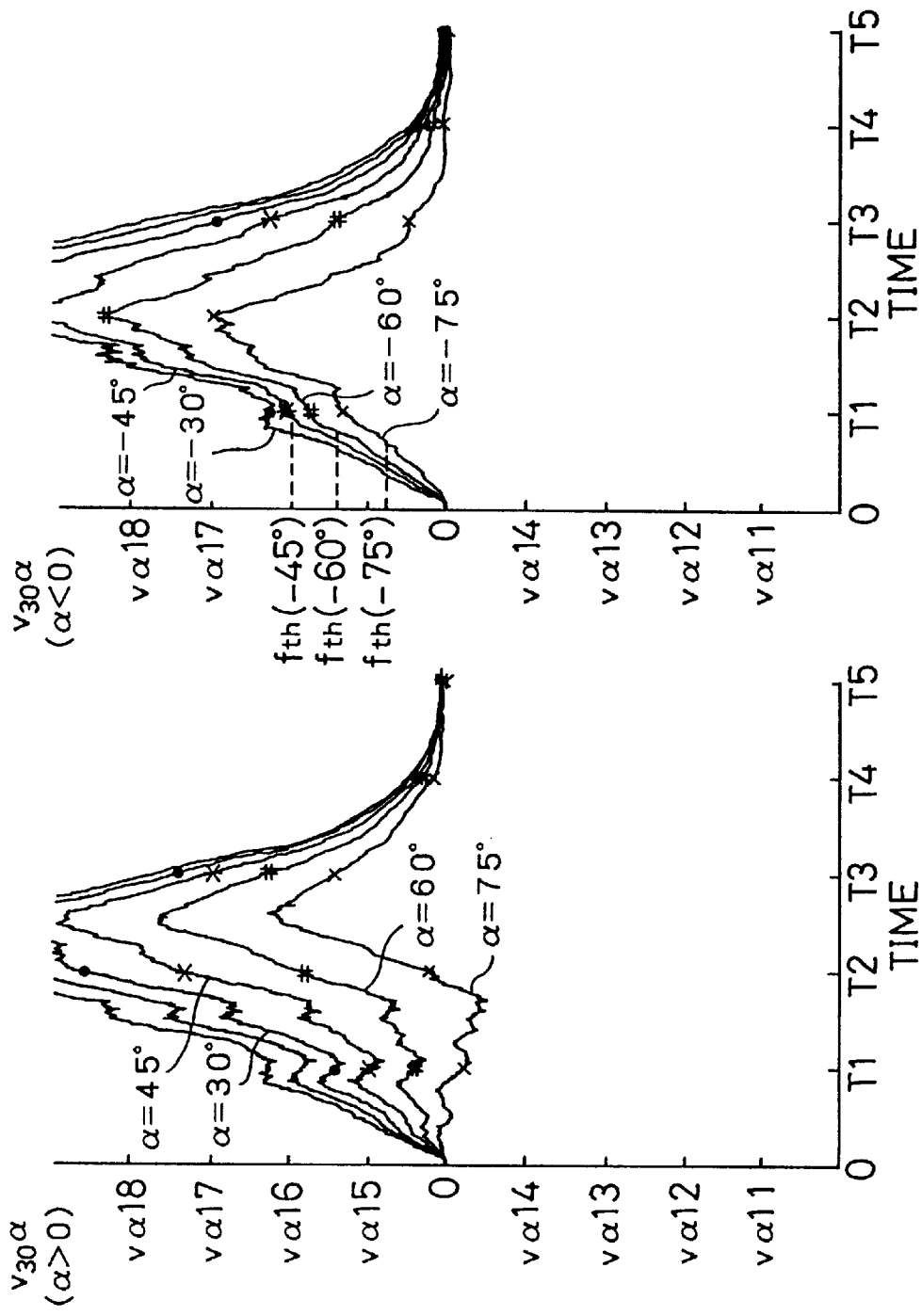

Fig. 23(a)

| $\alpha_m (\geq 0)$ | $\cos\alpha_m$ | $(\cos\alpha_m)'$ | ERRORS |
|---|---|---|---|
| 0° | 1 | 1 | 0 |
| 15° | 0.9659 | 247/256=0.9648 | 0.0011 |
| 30° | 0.8660 | 222/256=0.8672 | 0.0012 |
| 45° | 0.7071 | 181/256=0.7070 | 0.0001 |
| 60° | 0.5 | 1/2 =0.5 | 0 |
| 75° | 0.2588 | 66/256=0.2578 | 0.001 |

Fig. 23(b)

| $\alpha_m (\geq 0)$ | $\sin\alpha_m$ | $(\sin\alpha_m)'$ | ERRORS |
|---|---|---|---|
| 0° | 0 | 0 | 0 |
| 15° | 0.2588 | 66/256=0.2578 | 0.0010 |
| 30° | 0.5 | 1/2 =0.5 | 0 |
| 45° | 0.7071 | 181/256=0.7070 | 0.0001 |
| 60° | 0.8660 | 222/256=0.8672 | 0.0012 |
| 75° | 0.9659 | 247/256=0.9648 | 0.0011 |

Fig. 24

| $(\cos\alpha_m)', (\sin\alpha_m)'$ | DECOMPOSITION | SUM OF (1/2) POWERS |
|---|---|---|
| 1 | 1 | 1 |
| 247/256 | $\frac{1}{2}+\frac{1}{4}+\frac{1}{8}+\frac{1}{16}+\frac{1}{64}+\frac{1}{128}+\frac{1}{256}$ | $\left(\frac{1}{2}\right)^1+\left(\frac{1}{2}\right)^2+\left(\frac{1}{2}\right)^3+\left(\frac{1}{2}\right)^4+\left(\frac{1}{2}\right)^6+\left(\frac{1}{2}\right)^7+\left(\frac{1}{2}\right)^8$ |
| 222/256 | $\frac{1}{2}+\frac{1}{4}+\frac{1}{16}+\frac{1}{32}+\frac{1}{64}+\frac{1}{128}$ | $\left(\frac{1}{2}\right)^1+\left(\frac{1}{2}\right)^2+\left(\frac{1}{2}\right)^4+\left(\frac{1}{2}\right)^5+\left(\frac{1}{2}\right)^6+\left(\frac{1}{2}\right)^7$ |
| 181/256 | $\frac{1}{2}+\frac{1}{8}+\frac{1}{16}+\frac{1}{64}+\frac{1}{256}$ | $\left(\frac{1}{2}\right)^1+\left(\frac{1}{2}\right)^3+\left(\frac{1}{2}\right)^4+\left(\frac{1}{2}\right)^6+\left(\frac{1}{2}\right)^8$ |
| 1/2 | $\frac{1}{2}$ | $\left(\frac{1}{2}\right)^1$ |
| 66/256 | $\frac{1}{4}+\frac{1}{128}$ | $\left(\frac{1}{2}\right)^2+\left(\frac{1}{2}\right)^7$ |
| 0 | 0 | 0 |

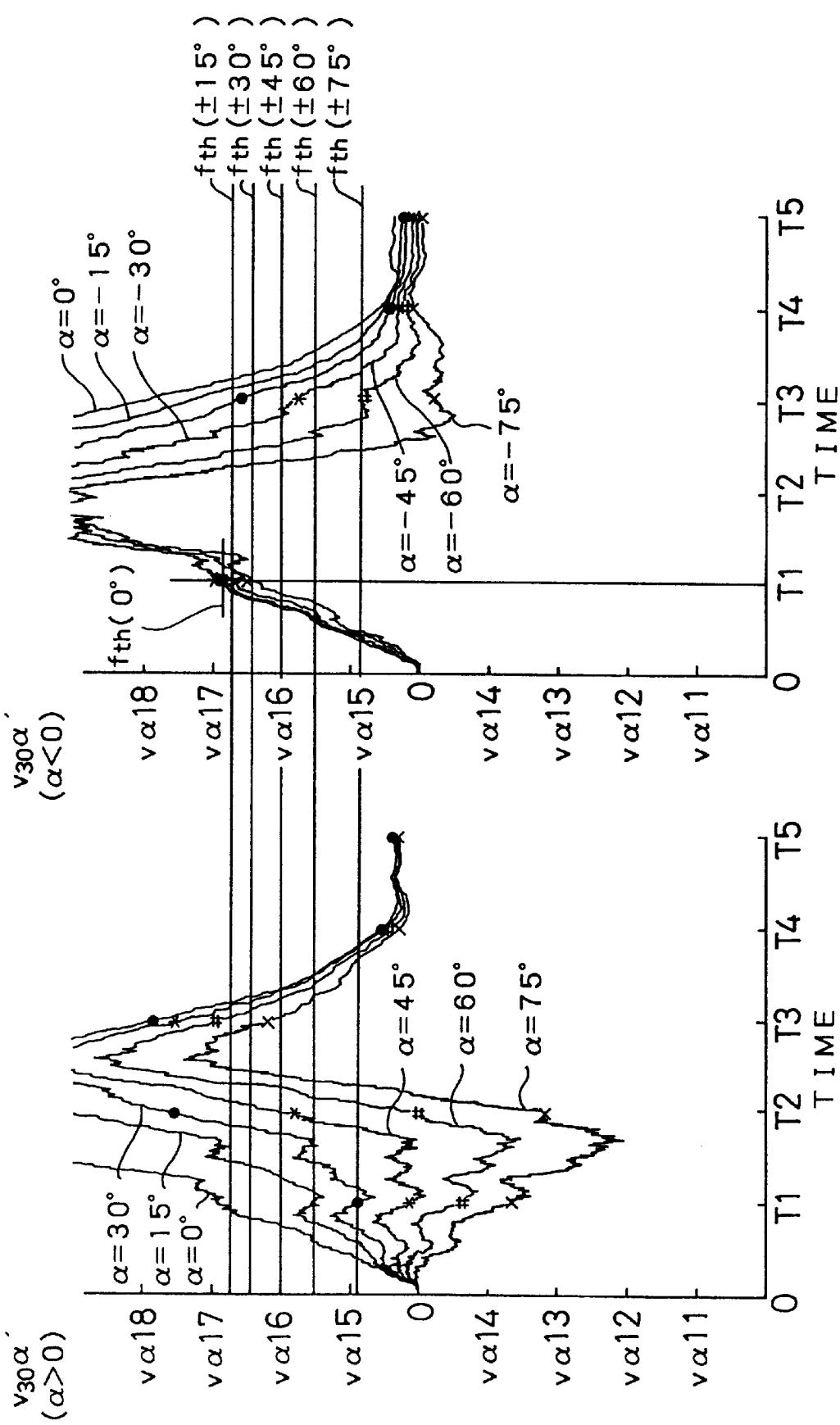

| $\beta_n$ \ $\alpha_m$ | -90° | -45° | 0° | 45° | 90° |
|---|---|---|---|---|---|
| -90° | $a_{22}$ | $a_{21}$ | $a_{20}$ | $a_{21}$ | $a_{22}$ |
| -45° | $a_{12}$ | $a_{11}$ | $a_{10}$ | $a_{11}$ | $a_{12}$ |
| 0° | $a_{02}$ | $a_{01}$ | $a_{00}$ | $a_{01}$ | $a_{02}$ |
| 45° | $a_{12}$ | $a_{11}$ | $a_{10}$ | $a_{11}$ | $a_{12}$ |
| 90° | $a_{22}$ | $a_{21}$ | $a_{20}$ | $a_{21}$ | $a_{22}$ |

APPARATUS FOR AND METHOD OF CONTROLLING ACTIVATION OF PASSIVE RESTRAINT

BACKGROUND OF THE INVENTION

1. Field of the Invention

The present invention relates to a passive restraint, such as an air bag unit, used for protecting a driver and passengers in a vehicle when the vehicle crashes. More specifically, the invention pertains to an apparatus for controlling activation of such a passive restraint as well as to a method of the same.

2. Description of the Prior Art

One example of known apparatuses for controlling activation of passive restraints is an apparatus for controlling ignition of a squib included in an air bag unit. In the air bag unit, a gas-generating agent is ignited with a squib in an inflator to evolve a gas from the inflator, and a bag is then inflated with the gas in order to protect a driver or a passenger from the impact of collision.

Conventional apparatuses for controlling ignition of squibs in such air bag units generally measure an acceleration applied to the vehicle and carries out the ignition control of the squibs based on the measured acceleration. The acceleration applied to the vehicle that is in a collision, however, often includes not only a longitudinal component along the longitudinal axis of the vehicle but a lateral component along the lateral axis of the vehicle. It is accordingly more effective to control ignition of squibs based on both the measured accelerations acting along the longitudinal axis and the lateral axis of the vehicle.

A proposed activation control apparatus, for example, as disclosed in JAPANESE PATENT LAIED-OPEN GAZETTE No. 6-56000, controls ignition of squibs based on measured accelerations acting along the longitudinal axis and the lateral axis of a vehicle.

The prior art apparatus specified above has a longitudinal acceleration sensor (longitudinal G sensor) for measuring an acceleration along the longitudinal axis of a vehicle and a lateral acceleration sensor (lateral G sensor) for measuring an acceleration along the lateral axis of the vehicle. The prior art apparatus first calculates an arithmetic value fx for the longitudinal direction (direction X) from the acceleration in the longitudinal direction and an arithmetic value fy for the lateral direction (direction Y) from the acceleration in the lateral direction. The apparatus then derives a composite vector F based on these arithmetic values, and calculates a magnitude f and a direction θ of the composite vector F according to Equations (1) and (2) given below, wherein the direction θ is given as an angle relative to 0 degree, which represents the front center of the vehicle along the longitudinal axis thereof:

$$f = \sqrt{fx^2 + fy^2} \quad (1)$$

$$\theta = \tan^{-1}\left(\frac{fy}{fx}\right) \quad (2)$$

The magnitude f of the composite vector F is compared with a threshold value fTh (θ) previously set for the direction θ. When the magnitude f is greater than the threshold value fTh(θ), the gas-generating agent is ignited with squibs.

This prior art apparatus controls the ignition of squibs and thereby controls the activation of air bag units by taking into account the magnitude of the acceleration applied to the vehicle as well as the direction of the acceleration. This structure realizes appropriate activation control, irrespective of the direction of the acceleration applied to the vehicle.

In the proposed apparatus, whenever some acceleration is applied to the vehicle, the magnitude f and the direction θ of the composite vector F are calculated according to Equations (1) and (2) given above. These arithmetic operations, however, include rather complicated and time-consuming calculations, such as second power, square root, division, and arc tangent. This means that rather complicated and time-consuming arithmetic operations are required to determine the magnitude f and the direction θ of the composite vector F. Equation (2) includes a division of fy/fx. When fx is approximately equal to zero, the value of the direction θ diverges and can not be determined.

The threshold value fTh(θ) should be set for the direction θ, in order to determine whether or not ignition with squibs is to be carried out. For the determination of the threshold value fTh(θ), it is required to set appropriate equations and execute complicated and time-consuming arithmetic operations.

SUMMARY OF THE INVENTION

The object of the present invention is thus to provide an apparatus for controlling activation of a passive restraint based on relatively simple arithmetic operations, as well as a method of the same.

At least part of the object is realized by a first activation control apparatus for controlling activation of a passive restraint mounted on a vehicle. The first activation control apparatus includes: acceleration measuring means for measuring a first acceleration acting in a first direction of the vehicle and a second acceleration acting in a second direction of the vehicle, which is different from the first direction; first arithmetic and logic means for calculating a first arithmetic value from the first acceleration according to a specified arithmetic operation; second arithmetic and logic means for calculating a second arithmetic value from the second acceleration according to a specified arithmetic operation; projective component deriving means for setting a first vector that is along the first direction and based on the first arithmetic value and a second vector that is along the second direction and based on the second arithmetic value, deriving projective components of the first vector and the second vector in a specified projecting direction in a plane including the first vector and the second vector, and summing up the projective components thus derived; and activation means for activating the passive restraint based on the sum of the projective components.

In the first activation control apparatus of the present invention, the projective component deriving means derives projective components of a first vector that is along the first direction and based on the first arithmetic value and a second vector that is along the second direction and based on the second arithmetic value, in a specified projecting direction, and sums up the derived projective components. The sum of the projective components determined in this manner represents a projective component of a composite vector, which is obtained by combining the first vector with the second vector, in the specified projecting direction. The activation means activates the passive restraint when the sum of the projective components exceeds a preset threshold value.

The first apparatus activates the passive restraint, based on the sum of the projective components, for example, when the sum of the projective components exceeds a preset threshold value. The term of 'when exceeding a preset threshold value' implies a specific instant at which the sum of the projective components actually exceeds the threshold value as well as a time point after a predetermined time has elapsed since the specific instant. This is also true in the discussion of any apparatus and method according to the present invention.

The first apparatus of the present invention previously sets an appropriate direction, derives a projective component of a composite vector (which is obtained by combining the first vector with the second vector) in the preset direction, and compares the projective component with a specified threshold value for the direction to determine whether or not the passive restraint is to be activated. Since the projecting direction is set in advance, the threshold value can be set previously for the projecting direction, and any complicated and time-consuming arithmetic operations are thereby not required for the determination of the threshold value.

In this first apparatus, the projective component of the composite vector is obtained as the sum of the projective components of the first vector and the second vector. This structure does not require the calculation of the magnitude or the direction of a composite vector, thereby being free from any complicated and time-consuming arithmetic operations. No division is included in the required arithmetic operations, so that the result of calculation does not diverge.

In accordance with another aspect, the present invention provides a second activation control apparatus for controlling activation of a passive restraint mounted on a vehicle. The second activation control apparatus includes: acceleration measuring means for measuring a first acceleration acting in a first direction of the vehicle, a second acceleration acting in a second direction of the vehicle, and a third acceleration acting in a third direction of the vehicle, the first direction, the second direction, and the third direction being different from one another; first arithmetic and logic means for calculating a first arithmetic value from the first acceleration according to a specified arithmetic operation; second arithmetic and logic means for calculating a second arithmetic value from the second acceleration according to a specified arithmetic operation; third arithmetic and logic means for calculating a third arithmetic value from the third acceleration according to a specified arithmetic operation; first projective component deriving means for setting a first vector that is along the first direction and based on the first arithmetic value and a second vector that is along the second direction and based on the second arithmetic value, deriving projective components of the first vector and the second vector in a specified first projecting direction in a plane including the first vector and the second vector, and summing up the projective components thus derived to yield a fourth arithmetic value; second projective component deriving means for setting a third vector that is along the third direction and based on the third arithmetic value and a fourth vector that is along the first projecting direction and based on the fourth arithmetic value, deriving projective components of the third vector and the fourth vector in a specified second projecting direction in a plane including the third vector and the fourth vector, and summing up the projective components thus derived; and activation means for activating the passive restraint based on the sum of the projective components given by the second projective component deriving means.

The sum of the projective components given by the second projective component deriving means represents a projective component of a composite vector, which is obtained by combining the third vector with the fourth vector, in the specified second projecting direction. The magnitude of the composite vector of the third and the fourth vectors coincides with a projective component of a composite vector, which is obtained by combining the first, the second, and the third vectors, in a plane including the third and the fourth vectors.

The structure of the second activation control apparatus controls activation of the passive restraint based on the accelerations in the three directions, thereby realizing the more precise and accurate activation control. The system of the second apparatus does not require the calculation of the magnitude or direction of the three-dimensional composite vector based on the first through the third arithmetic values, thus being free from any complicated and time-consuming arithmetic operations and attaining the effective activation control based on the three-dimensional information.

The present invention is also directed to a first method of controlling activation of a passive restraint mounted on a vehicle. The first method includes the steps of:

(a) measuring a first acceleration acting in a first direction of the vehicle and a second acceleration acting in a second direction of the vehicle, which is different from the first direction;

(b) calculating a first arithmetic value from the first acceleration according to a specified arithmetic operation, and calculating a second arithmetic value from the second acceleration according to a specified arithmetic operation;

(c) setting a first vector that is along the first direction and based on the first arithmetic value and a second vector that is along the second direction and based on the second arithmetic value, deriving projective components of the first vector and the second vector in a specified projecting direction in a plane including the first vector and the second vector, and summing up the projective components thus derived; and (d) activating the passive restraint based on the sum of the projective components.

In the first method of the present invention, since the projecting direction is set in advance, the threshold value can be set previously for the projecting direction, and any complicated and time-consuming arithmetic operations are thereby not required for the determination of the threshold value. The projective component of the composite vector is obtained as the sum of the projective components of the first vector and the second vector. This method is accordingly free from any complicated and time-consuming arithmetic operations. No division is included in the required arithmetic operations, so that the result of calculation does not diverge.

In accordance with still another aspect, the present invention provides a second method of controlling activation of a passive restraint mounted on a vehicle. The second method includes the steps of:

(a) measuring a first acceleration acting in a first direction of the vehicle, a second acceleration acting in a second direction of the vehicle, and a third acceleration acting in a third direction of the vehicle, the first direction, the second direction, and the third direction being different from one another;

(b) calculating a first arithmetic value from the first acceleration according to a specified arithmetic operation, calculating a second arithmetic value from the second acceleration according to a specified arithmetic operation, and calculating a third arithmetic value from the third acceleration according to a specified arithmetic operation;

(c) setting a first vector that is along the first direction and based on the first arithmetic value and a second vector that is along the second direction and based on the second arithmetic value, deriving projective components of the first vector and the second vector in a specified first projecting direction in a plane including the first vector and the second vector, and summing up the projective components thus derived to yield a fourth arithmetic value;

(d) setting a third vector that is along the third direction and based on the third arithmetic value and a fourth vector that is along the first projecting direction and based on the fourth arithmetic value, deriving projective components of the third vector and the fourth vector in a specified second projecting direction in a plane including the third vector and the fourth vector, and summing up the projective components thus derived; and (e) activating the passive restraint based on the sum of the projective components given in the step (d).

The second method of the present invention controls activation of the passive restraint based on the accelerations in the three directions, thereby realizing the more precise and accurate activation control. This method does not require the calculation of the magnitude or direction of the three-dimensional composite vector based on the first through the third arithmetic values, thus being free from any complicated and time-consuming arithmetic operations and attaining the effective activation control based on the three-dimensional information.

These and other objects, features, aspects, and advantages of the present invention will become more apparent from the following detailed description of the preferred embodiments with the accompanying drawings.

BRIEF DESCRIPTION OF THE DRAWINGS

FIG. 4 shows arithmetic values calculated from accelerations Gx and Gy as well as magnitudes and directions of composite vectors for the respective sets of arithmetic values;

FIGS. 16(a) and 16(b) are characteristic charts showing time-based variations in projective components $v_{30}\alpha$ of the composite vector based on the arithmetic values $V_{30}x$ and $V_{30}y$ of FIG. 15 in the directions $\alpha_1$ to $\alpha_{11}$;

FIGS. 22(a) and 22(b) are characteristic charts showing time-based variations in projective components $v_{30}\alpha$ of the composite vector based on the arithmetic values $V_{30}x$ and $V_{30}y$ of FIG. 21 in the directions $\alpha_1$ to $\alpha_{11}$;

FIGS. 23(a) and 23(b) are tables showing the values of $\cos\alpha_m$ and $\sin\alpha_m$ with their corresponding approximate values $(\cos\alpha_m)'$ and $(\sin\alpha_m)'$, respectively;

FIG. 24 shows the approximate values $(\cos\alpha_m)'$ and $(\sin\alpha_m)'$ with their corresponding sums of ½ powers;

FIGS. 29(a) and 29(b) are characteristic charts showing time-based variations in projective components $v_{30}\alpha'$ of the composite vector in the directions $\alpha_1$ to $\alpha_{11}$ when the vehicle 70 obliquely collides on its left side at a medium speed;

FIGS. 30(a) and 30(b) are characteristic charts showing time-based variations in projective components $v_{30}\alpha'$ of the composite vector in the directions $\alpha_1$ to $\alpha_{11}$ when the vehicle 70 obliquely collides on its left side at a high speed;

DESCRIPTION OF THE PREFERRED EMBODIMENTS

Figure 1A:
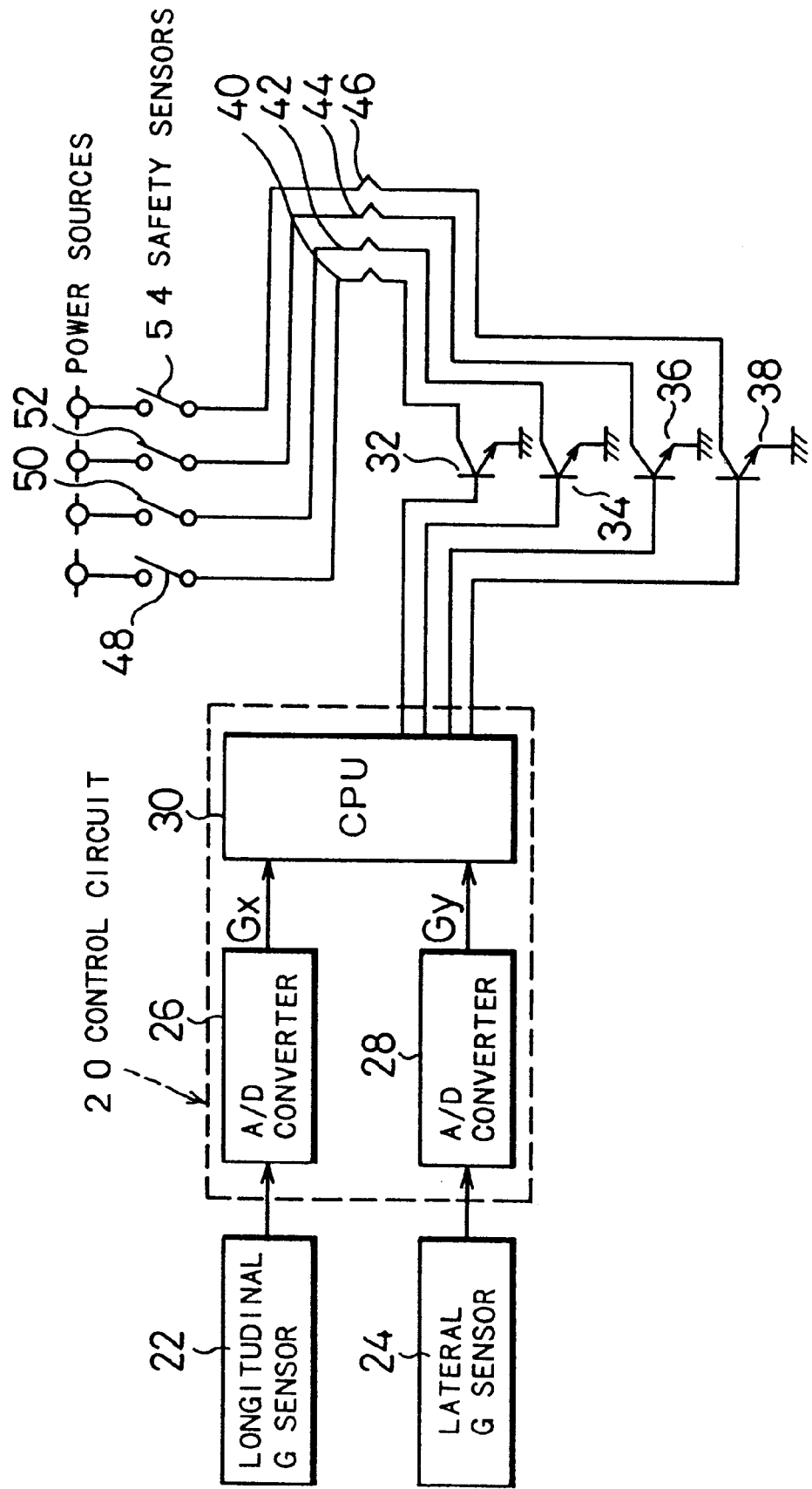
FIG. 1AB is a block diagram showing various functions of the CPU 30 included in the activation control apparatus of FIG. 1B.
Figure 1B:
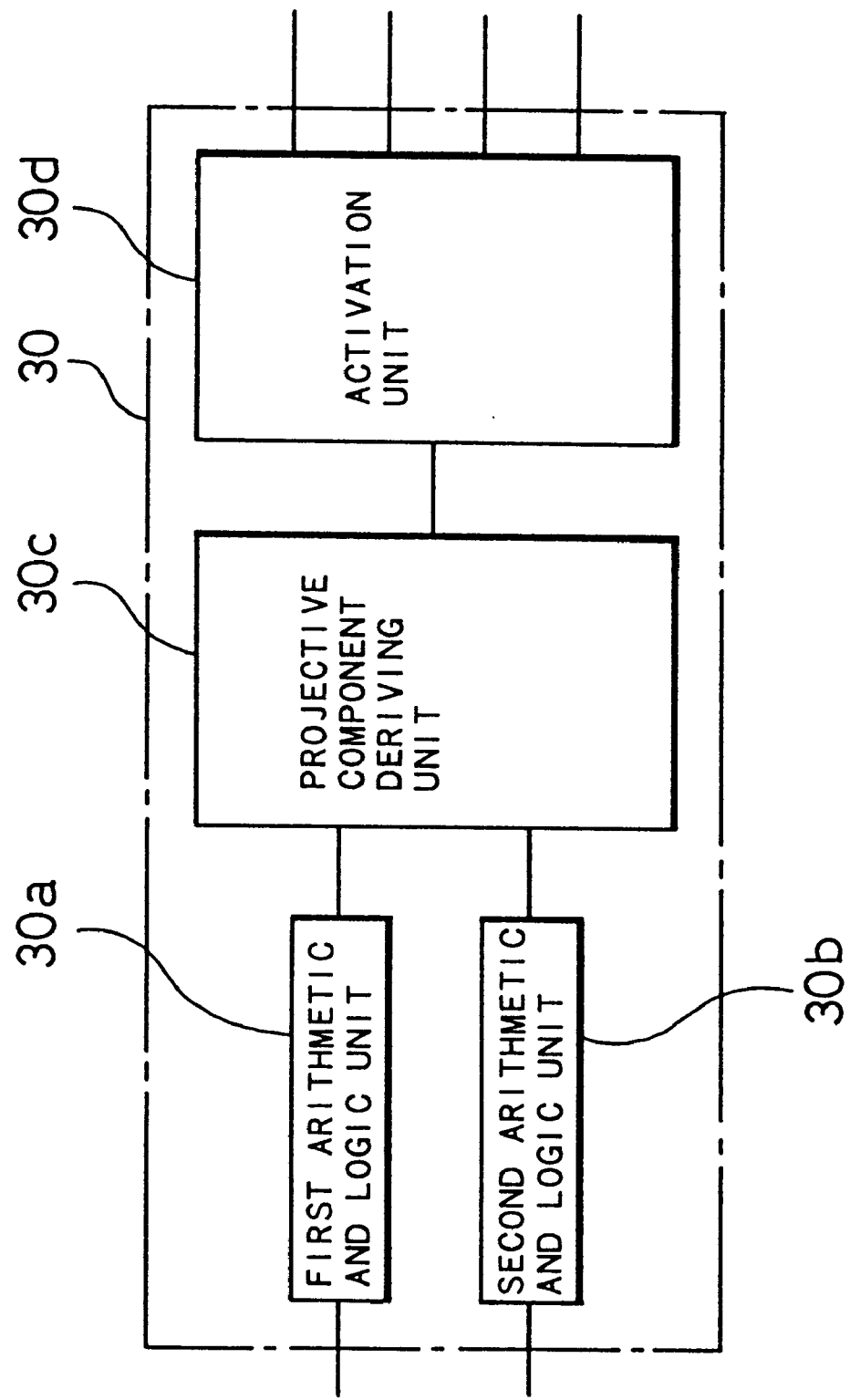
FIG. 1B is a block diagram illustrating an activation control apparatus for controlling activation of air bag units, as a first embodiment according to the present invention.

The following describes several modes of carrying out the present invention as preferred embodiments. FIG. 1A is a block diagram illustrating an activation control apparatus for controlling activation of air bag units, as a first embodiment according to the present invention, FIG. 1B is a block diagram showing various functions of the CPU 30 included in the activation control apparatus of FIG. 1A, and FIG. 2 shows a typical arrangement of air bag units and the activation control apparatus of the first embodiment mounted on a vehicle.

Figure 2:
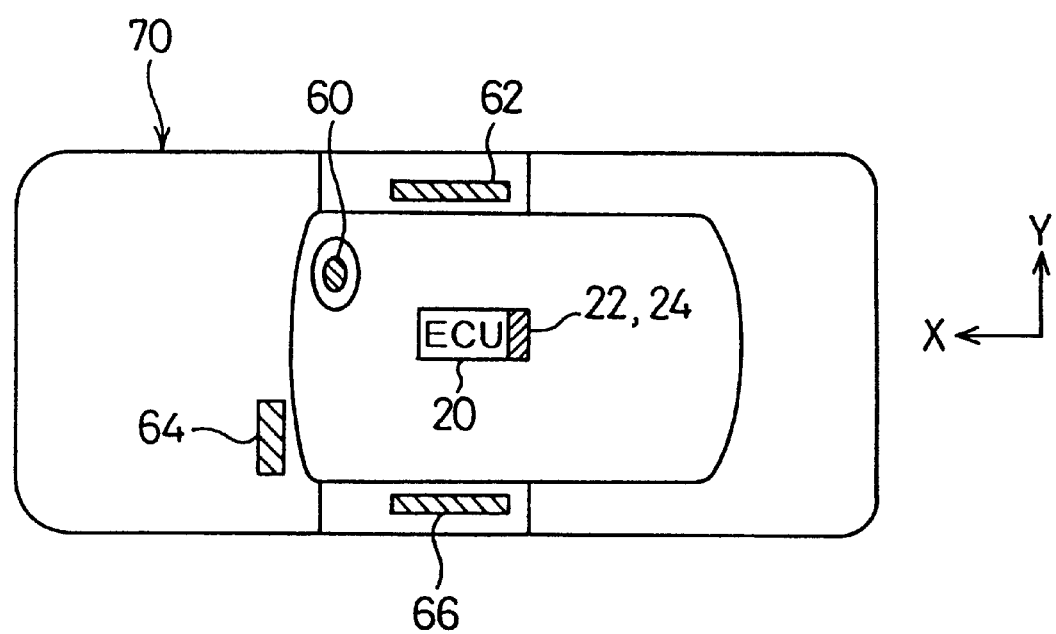
FIG. 2 shows a typical arrangement of air bag units and the activation control apparatus of the first embodiment mounted on a vehicle.

Referring to FIG. 2, a plurality of air bag units 60 to 66 and an activation control apparatus for controlling activation of the air bag units are mounted on a vehicle 70. The first through the fourth air bag units 60 to 66, which respectively include a bag and an inflator, are arranged in the vicinity of a driver's seat and a passenger's seat. The first air bag unit 60 is disposed in a center pad of a steering wheel in front of the driver's seat, and the second air bag unit 62 is in a door inner panel beside the driver's seat. The third air bag unit 64 is disposed in an instrument panel in front of the passenger's seat, and the fourth air bag unit 66 is in a door inner panel beside the passenger's seat.

The activation control apparatus includes a control circuit (ECU, electronic control unit) 20 and a pair of acceleration sensors (G sensors) 22 and 24, and is disposed below a center console located on the substantial center of the body. Referring to FIG. 1A, the first G sensor 22 is a longitudinal G sensor for measuring an acceleration acting in one direction along a longitudinal axis of the vehicle 70 (hereinafter referred to as direction X), and the second G sensor 24 is a lateral G sensor for measuring an acceleration acting in another direction along a lateral axis of the vehicle 70 (hereinafter referred to as direction Y, which is different from the direction X). The control circuit 20 further includes a pair of analog-to-digital converters (A/D converters) 26 and 28 and a central processing unit (CPU) 30. The longitudinal G sensor 22 and the lateral G sensor 24 are connected to the CPU 30 respectively via the first A/D converter 26 and the second A/D converter 28.

An acceleration Gx in the longitudinal direction or direction X measured by the longitudinal G sensor 22 is input as an analog signal into the first A/D converter 26, converted to a digital signal by the A/D converter 26, and transmitted to the CPU 30. An acceleration Gy in the lateral direction or direction Y measured by the lateral G sensor 24 is input as an analog signal into the second A/D converter 28, converted to a digital signal by the A/D converter 28, and transmitted to the CPU 30.

The CPU 30 carries out a variety of processing operations for controlling activation of the air bag units 60 to 66 based on the input accelerations Gx and Gy, according to programs stored in a ROM (not shown) and the like elements. The CPU 30 generates an activation signal to activate the air bag units 60 to 66.

Referring to FIG. 1B, the CPU 30 includes a first arithmetic and logic unit 30a for calculating an arithmetic value fx from the acceleration Gx in the longitudinal direction by specified arithmetic operations, a second arithmetic and logic unit 30b for calculating an arithmetic value fy from the acceleration Gy in the lateral direction by specified arithmetic operations, a projective component deriving unit 30c for deriving a projective component of a composite vector (described later) from the arithmetic values fx and fy, and an activation unit 30d for activating the air bag units 60 to 66 based on the derived projective component.

Referring back to FIG. 1A, the CPU 30 is connected with squibs 40 to 46 arranged in the respective inflators of the air bag units 60 to 66, via switching elements 32 to 38, which are respectively included in driving circuits of the air bag units 60 and 66. Each of the squibs 40 to 46 functions as means for igniting a gas-generating agent in each inflator as described previously.

The squibs 40 to 46 are respectively connected to a power source via safety sensors 48 to 54. The safety sensors 48 to 54 are mechanical sensors, each being constructed, for example, by combining a spring with an inertia body, and close the respective contacts when a retardation exceeding a preset value is applied to the vehicle 70.

In case that the retardation applied to the vehicle has a magnitude sufficient to close the respective contacts of the safety sensors 48 to 54, the CPU 30 outputs an activation signal as discussed above to turn ON the switching elements 32 to 38 and make a fixed current flow through the squibs 40 to 46. Each of the squibs 40 to 46 then ignites a gas-generating agent to evolve a gas from an inflator and inflate a bag with the gas thus generated.

The safety sensors 48 to 54 are incorporated in the driving circuits of the air bag units 60 to 66, since such mechanical sensors can prevent the air bag units 60 to 66 from being mistakenly activated by some malfunction or erroneous operation of an electric circuit system.

Figure 3:
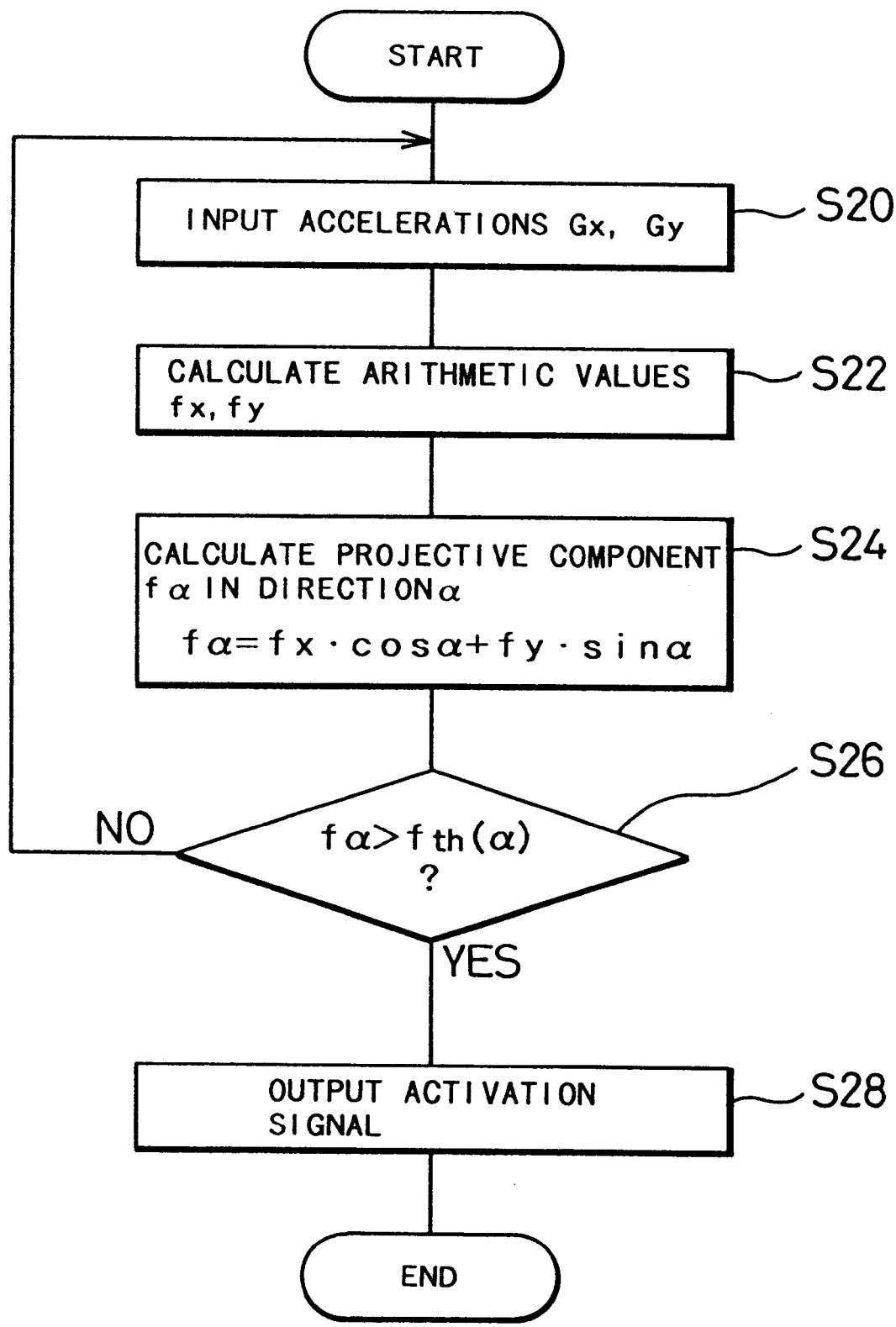
FIG. 3 is a flowchart showing a control routine of the first embodiment executed by the CPU 30 shown in FIG. 1B.

The following describes an activation control procedure of the embodiment. FIG. 3 is a flowchart showing a control routine of the first embodiment executed by the CPU 30 shown in FIG. 1B. When the program enters the control routine, the accelerations Gx and Gy are input at step S20. In accordance with a concrete procedure, the CPU 30 reads the acceleration Gx in the longitudinal direction measured by the longitudinal G sensor 22 and the acceleration Gy in the lateral direction measured by the lateral G sensor 24 at step S20.

The CPU 30 then carries out specified arithmetic operations to calculate the arithmetic values fx and fy from the acceleration Gx in the longitudinal direction and the acceleration Gy in the lateral direction thus measured at step S22.

The values used as criteria for determination of whether or not the air bag units 60 to 66 are to be activated may be the accelerations Gx and Gy acting on the vehicle 70, although not restricted thereto. Any other values may be used for the determination as long as they practically reflect the accelerations Gx and Gy. By way of example, integral values Vx and Vy obtained by integrating the accelerations Gx and Gy, second integral values Sx and Sy obtained by integrating the accelerations Gx and Gy twice, and n-order integral values obtained by integrating the accelerations Gx and Gy n times as shown in FIG. 4 may also be used as the criteria for determining the activation timing. The arithmetic values fx and fy calculated from the accelerations Gx and Gy according to the specified arithmetic operations are values reflecting the accelerations Gx and Gy.

At step S22, the specified arithmetic operations are carried out to give the arithmetic values fx and fy reflecting the accelerations Gx and Gy. In case that the accelerations Gx and Gy themselves are used as the arithmetic values fx and fy, the specified arithmetic operations multiply the accelerations Gx and Gy by a coefficient '1'.

The program then proceeds to step S24 in the flowchart of FIG. 3, at which the CPU 30 projects vectors based on the arithmetic values fx and fy in a direction α to yield a sum fα of the projective components. Prior to describing a concrete procedure of this operation, the following describes the difference between the prior art technique and the technique of the present invention.

The prior art technique derives a composite vector F=(fx, fy) from the following two vectors: a vector Fx, which is based on the arithmetic value fx, extends in the direction X (that is, along the longitudinal axis of the vehicle 70), and has an x component equal to fx and a y component equal to zero; and a vector Fy, which is based on the arithmetic value fy, extends in the direction Y (that is, along the lateral axis of the vehicle 70), and has an x component equal to zero and a y component equal to fy. A magnitude f and a direction θ of the composite vector F are then determined according to Equations (1) and (2) given above. The magnitude f is compared with a threshold value fTh(θ) corresponding to the direction θ, and the result of comparison is used to determine whether or not the air bag units are to be activated. Rather complicated and time-consuming arithmetic operations are, however, required to determine the threshold value fTh(θ) corresponding to the direction θ as discussed previously. The magnitude and the direction of the composite vector for each set of arithmetic values are specified in FIG. 4.

The technique of the present invention, on the other hand, previously sets an appropriate direction α (the direction α is given as an angle relative to 0 degree representing the front center of the vehicle 70 along the longitudinal axis thereof), projects the composite vector F in the preset direction α to yield a projective vector Fα, and calculates a magnitude fα of the projective vector Fα (that is, a projective component of the composite vector F). The magnitude fα is compared with a threshold value fth(α) corresponding to the direction α, and the result of comparison is used to determine whether or not the air bag units are to be activated. Since the direction α is set in advance, the threshold value fth(α) corresponding to the direction α can also be determined in advance. Any complicated arithmetic operations are accordingly not required for the calculation of the threshold value fth(α). An experimentally obtained value regarding the direction α to activate the air bag units may be used for the threshold value fth(α).

The magnitude fα of the projective vector Fα (that is, the projective component of the composite vector F) is generally expressed as:

$$f\alpha = f\cos(\theta - \alpha) \qquad (3)$$

As clearly understood from Equation (3), it is required to determine the magnitude f and the direction θ of the composite vector F according to Equations (1) and (2) given above, prior to calculating the projective component fα of the composite vector F. As discussed previously, however, these arithmetic operations include rather complicated and time-consuming calculations, such as second power, square root, division, and arc tangent. This means that rather complicated and time-consuming arithmetic operations are required to determine the magnitude f and the direction θ of the composite vector F.

In the system of the present invention, on the other hand, Equation (3) is rewritten as Equation (4) given below by taking advantage of the addition theorem of trigonometric functions, and the projective component fα of the composite vector F is determined according to Equation (4):

$$\begin{aligned}f\alpha &= f \cdot \cos(\theta - \alpha) \\ &= f \cdot (\cos\theta \cdot \cos\alpha + \sin\theta \cdot \sin\alpha) \\ &= f \cdot \cos\theta \cdot \cos\alpha + f \cdot \sin\theta \cdot \sin\alpha \\ &= fx \cdot \cos\alpha + fy \cdot \sin\alpha \end{aligned} \qquad (4)$$

$$\because fx = f \cdot \cos\theta,\; fy = f \cdot \sin\theta$$

In Equation (4), the first term of the left side, fx·cosα, represents a projective component of the vector Fx in the direction α and the second term of the left side, fy·sinα, represents a projective component of the vector Fy in the direction α. The projective component fα of the composite vector F is accordingly expressed as the sum of the projective component of the vector Fx and the projective component of the vector Fy. This is clearly seen in FIG. 6. The vector of one-dot chain line is obtained by parallel displacement of the vector Fy and is thus identical with the vector Fy.

The technique of the present invention determines the projective component fα of the composite vector F according to Equation (4), and does not require the complicated arithmetic operations conventionally carried out to obtain the magnitude f or the direction θ of the composite vector F. No division is included in Equation (4), so that the result of calculation does not diverge.

In this embodiment, at step S24 in the flowchart of FIG. 3, the projective component fα of the composite vector F in the direction α is obtained as the sum fx·cosα+fy·sinα of the projective components of the vectors Fx and Fy based on the arithmetic values fx and fy in the direction α as described previously.

The projective component fα thus obtained is compared with a threshold value fth(α) preset for the direction α at step S26. When it is determined that the projective component fα is equal to or smaller than the threshold value fth($\alpha$) (f$\alpha \leq$fth($\alpha$)) at step S26, there is no need to activate the air bag units 60 to 66 and the program thus returns to step S20 to repeat the processing of step S20 and the subsequent steps.

When it is determined that the projective component f$\alpha$ is greater than the threshold value fth($\alpha$) (f$\alpha$>fth($\alpha$)) at step S26, on the contrary, the program proceeds to step S28 at which the CPU 30 generates an activation signal in order to activate the air bag units 60 to 66. The CPU 30 outputs the activation signal to the switching elements 32 to 38, which are accordingly turned ON to make a fixed current flow through the squibs 40 to 46 and ignite the gas-generating agents in the respective inflators of the air bag units 60 to 66.

As discussed above, the structure of the embodiment can arbitrarily set a specified direction $\alpha$ and determine the threshold value fth($\alpha$) in the direction $\alpha$ without any complicated and time-consuming arithmetic operations, before the CPU 30 executes the control routine shown in the flowchart of FIG. 3. The method of the embodiment does not require the calculation of the magnitude f and the direction $\theta$ of the composite vector F based on the arithmetic values fx and fy, thereby being free from any complicated and time-consuming arithmetic operations and preventing the resulting value from diverging.

In this embodiment, the four air bag units 60 to 66 are arranged in front of and beside the driver's seat and the passenger's seat in the vehicle 70 as shown in FIG. 2. When the vehicle crashes and an external force is applied to the side of the driver's seat in the vehicle 70, for example, there may be no need to activate the air bag unit 66 disposed beside the passenger's seat.

When it is assumed that the direction $\theta$ of the composite vector F calculated from the arithmetic values fx and fy practically represents the direction of the external force applied to the vehicle 70, which of the four air bag units 60 to 66 should be activated can be determined readily by calculating the direction $\theta$.

In accordance with one preferable application of the embodiment, at step S28 of the control routine shown in FIG. 3, the CPU 30 may output an activation signal to only some of the switching elements 32 to 38 selected correspondingly to the direction $\theta$ and ignite only the corresponding squibs, instead of outputting the activation signal to all the switching elements 32 to 38 and igniting all the squibs 40 to 46.

As discussed previously, however, the structure of the embodiment does not calculate the direction $\theta$ of the composite vector F, while determining the projective component f$\alpha$ of the composite vector F in the direction $\alpha$. The method of the embodiment thus can not select the air bag units to be activated, directly based on the direction $\theta$.

Instead of determining the direction $\theta$ of the composite vector F, the method of the embodiment presets a plurality of directions $\alpha$ in which the composite vector F is projected, determines projective components of the composite vector F in the respective preset directions, and selects the air bag units to be activated, based on the projective components thus obtained.

Figure 7:
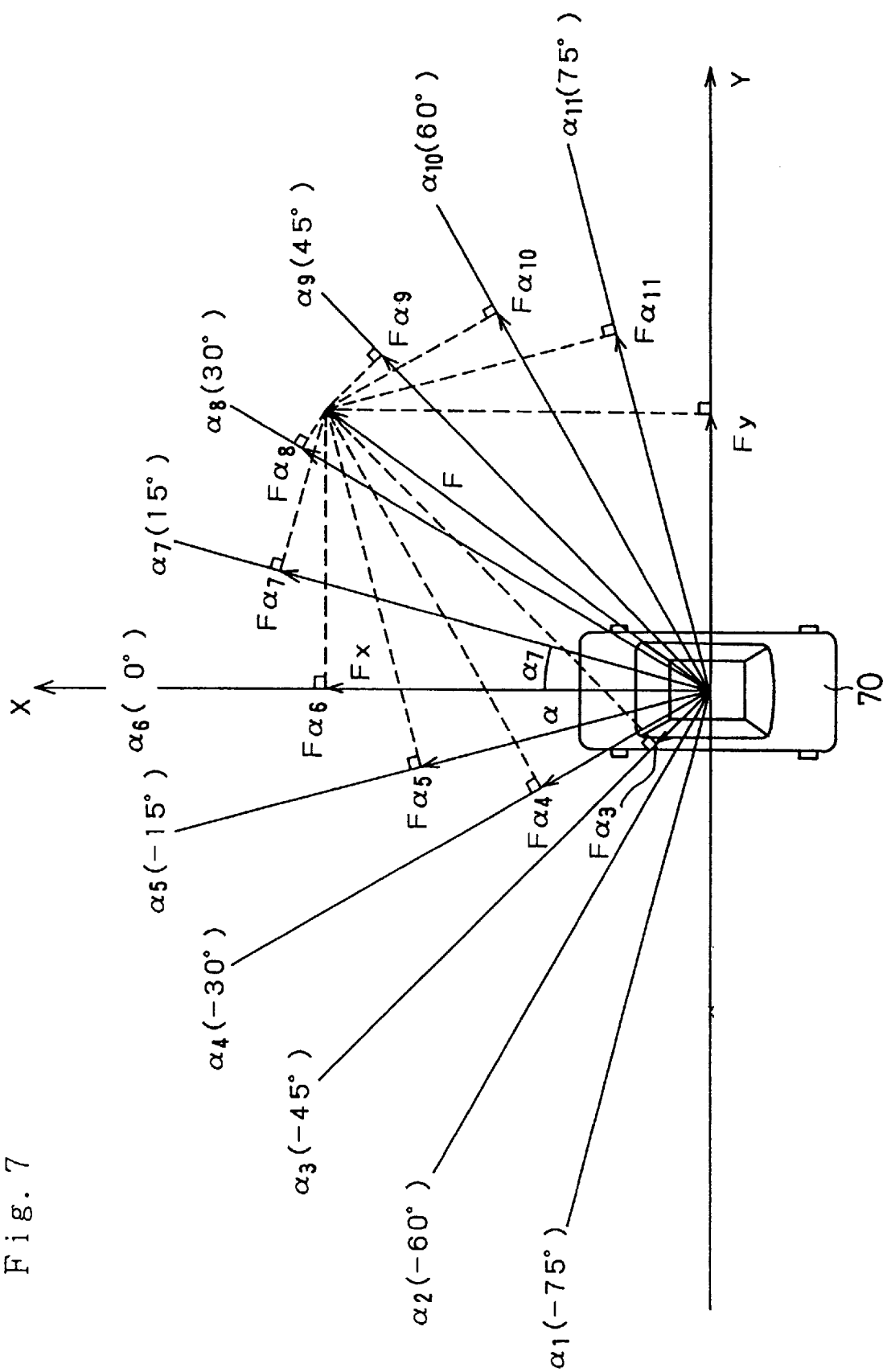
FIG. 7 shows projective vectors $F\alpha_m$ of the composite vector F in a plurality of directions $\alpha_m$.
Figure 8:
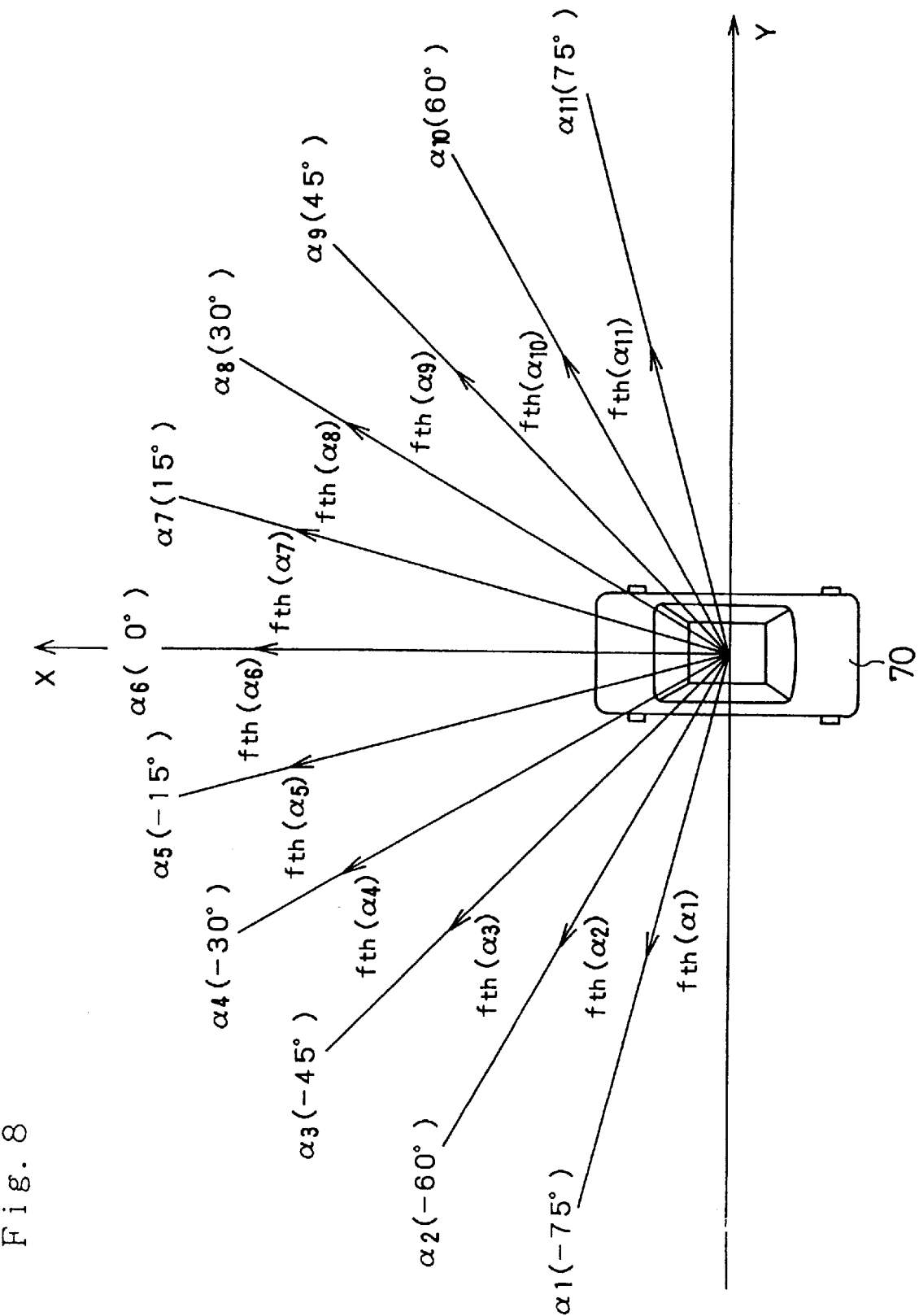
FIG. 8 shows threshold values $fth(\alpha_m)$ previously set for the respective directions $\alpha_m$.

By way of example, as shown in FIG. 7, eleven different directions $\alpha$ (hereinafter referred to as $\alpha_1$ to $\alpha_{11}$ or $\alpha_m$) ranging from $\alpha$=−75° to $\alpha$=75° at intervals of 15° are set as the directions in which the composite vector F is projected. Projective components f$\alpha_m$ of the composite vector F in the respective directions $\alpha_m$ (that is, the magnitudes of projective vectors F$\alpha_m$) are determined and compared with threshold values fth($\alpha_m$) previously set for the respective directions $\alpha_m$ as shown in FIG. 8. When the results of comparison show that the projective component f$\alpha_m$ is greater than the threshold value fth($\alpha_m$) (f$\alpha_m$>fth($\alpha_m$)) in a certain direction $\alpha_m$, the air bag units corresponding to the direction $\alpha_m$ are selected and activated. The projective components f$\alpha_m$ in the respective directions $\alpha_m$ are calculated according to Equation (4) given above.

As discussed above, the preferable structure of the embodiment presets a plurality of projecting directions and determines projective components of the composite vector for the respective projecting directions. This enables only the required ones among the plurality of air bag units disposed in the vehicle to be selectively activated corresponding to the direction in which the external force applied to the vehicle.

Figures 9A, 9B:
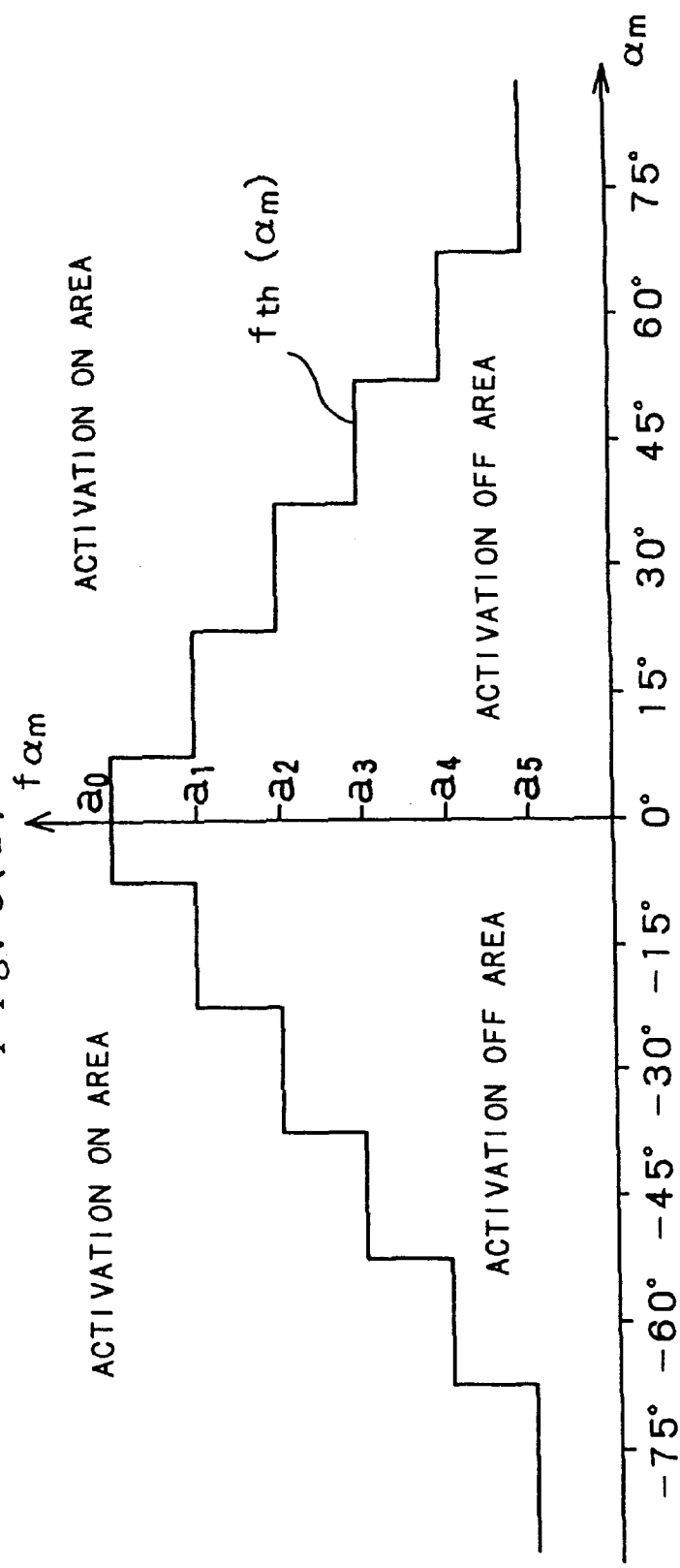
FIG. 9 shows the threshold values $fth(\alpha_m)$ for the respective directions $\alpha_m$, as well as an activation ON area and an activation OFF area of the air bag units separated from each other by the threshold values $fth(\alpha_m)$.

FIG. 9 shows the threshold values fth($\alpha_m$) for the respective directions $\alpha_m$, as well as an activation ON area and an activation OFF area of the air bag units separated from each other by the threshold values fth($\alpha_m$). By way of example, it is assumed that the threshold values fth($\alpha_m$) are set in advance for the respective directions $\alpha_m$ as shown in FIG. 9(a). FIG. 9(b) shows the threshold values fth($\alpha_m$) in the two-dimensional plane with projective component f$\alpha_m$ as ordinate and direction $\alpha_m$ as abscissa, upon this assumption. Referring to FIG. 9(b), the air bag units 60 to 66 are not activated when the projective component f$\alpha_m$ is in a lower area (activation OFF area) among the two areas separated from each other by the threshold values fth($\alpha_m$). At least some of the air bag units 60 to 66 are activated, on the other hand, when the projective component f$\alpha_m$ is in an upper area (activation ON area).

As clearly seen from FIGS. 8 and 9, the threshold value fth ($\alpha_m$) decreases with an increase in absolute value of the direction $\alpha_m$. This is because the air bag units 60 to 66 should be activated even with the relatively small magnitude of the external force, in case that the external force is applied to the side of the vehicle 70.

In this embodiment, the eleven directions a ranging from $\alpha$=−75° to $\alpha$=75° at intervals of 15° are set as the directions in which the composite vector F is projected. The projecting directions are, however, not restricted to the above values; for example, thirteen directions ranging from $\alpha$=−90° to $\alpha$=90° at intervals of 15° may be set as the projecting directions, or the interval may be set equal to 10°, 20°, 30°, or 45° instead of 15°.

Figure 10:
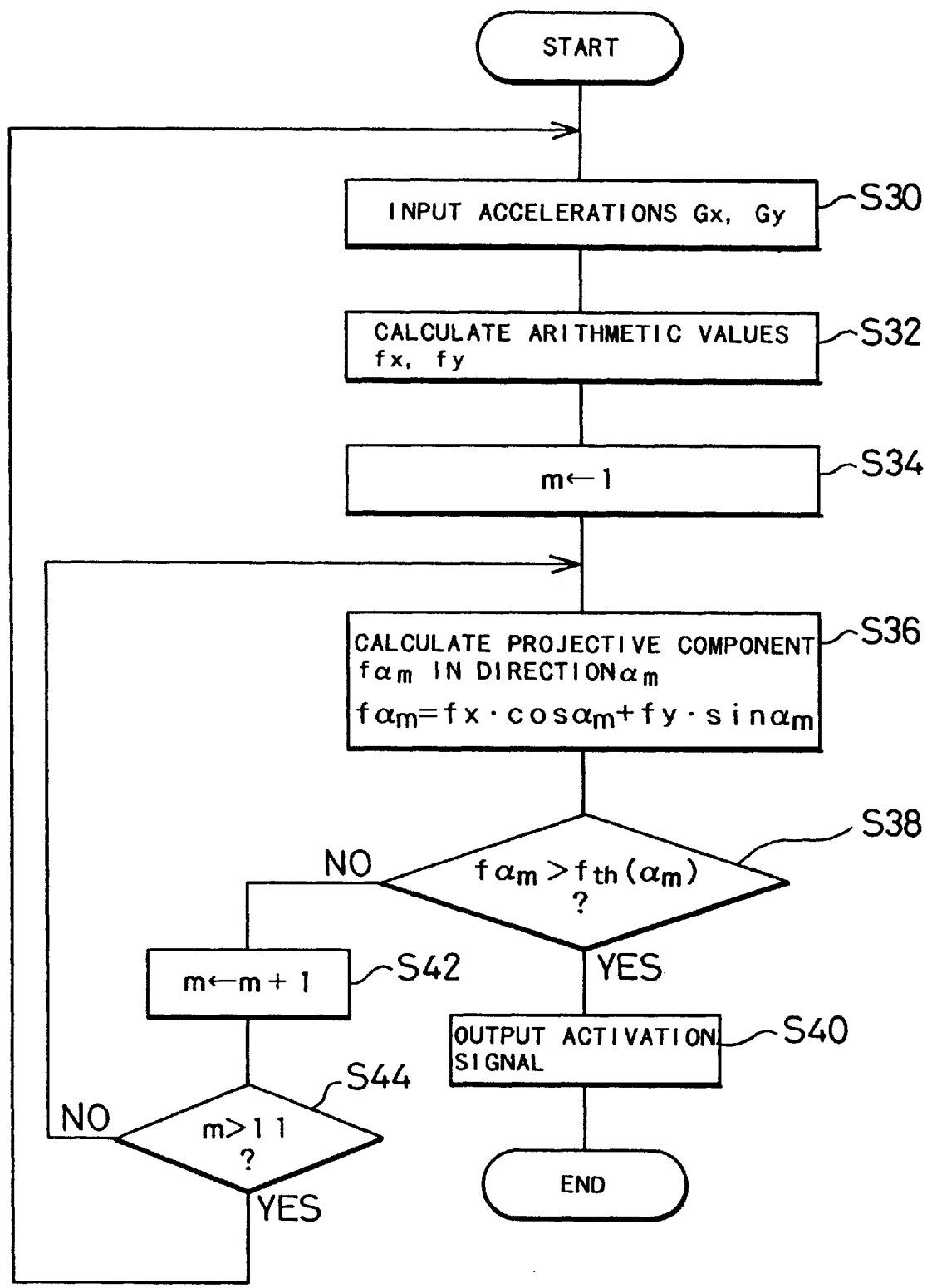
FIG. 10 is a flowchart showing a control routine executed by the CPU 30 of FIG. 1B that controls activation of the air bag units based on the results of comparison between the projective components and the threshold values for a plurality of directions.

FIG. 10 is a flowchart showing a control routine executed by the CPU 30 of FIG. 1B that controls activation of the air bag units based on the results of comparison between the projective components and the threshold values for a plurality of directions. When the program enters this processing routine, the CPU 30 first carries out steps S30 and S32, which are identical with steps S20 and S22 in the flowchart of FIG. 3 and are thus not specifically described here.

In order to execute the processing for a direction $\alpha_1$ among the plurality of preset directions $\alpha_m$, a variable 'm' representing the subscript of $\alpha_m$ is set equal to a value '1' at step S34. The CPU 30 then projects vectors based on the arithmetic values fx and fy in a direction $\alpha_m$ and calculates the sum f$\alpha_m$ of the projective components (that is, the projective component of the composite vector F) at step S36. The calculation according to Equation (4) is carried out for the direction $\alpha_m$ at step S36 in the flowchart of FIG. 10, while the same is carried out for the direction $\alpha$ at step S24 in the flowchart of FIG. 3.

The projective component f$\alpha_m$ obtained at step S36 is then compared with a threshold value fth(($\alpha_m$) previously set for the direction $\alpha_m$ at step S38. When it is determined that the projective component f$\alpha_m$ is equal to or smaller than the threshold value fth($\alpha_m$) (f$\alpha_m \leq$fth($\alpha_m$)) at step S38, the program goes to step S42 to increment the variable 'm' by one and then to step S44 to compare the variable 'm' with a value '11'. When the variable 'm' is greater than the value '11', the program determines that the processing has been completed for all the directions $\alpha_m$, and accordingly returns to step S30 to receive new data of accelerations Gx and Gy at a next time point. When the variable 'm' is not greater than '11', on the other hand, the program determines that some of the directions $\alpha_m$ still remain unprocessed, and returns to step S36 to carry out the processing for a next direction (that is, the direction $\alpha_m$ defined by incrementing the variable 'm' by one).

When it is determined that the projective component f$\alpha_m$ is greater than the threshold value fth($\alpha_m$) (f$\alpha_m >$fth(($\alpha_m$)) in a certain direction $\alpha_m$ at step S38, on the contrary, the program proceeds to step S40 at which the CPU 30 outputs an activation signal to only the corresponding ones of the four switching elements 32 to 38, in order to activate only the required ones among the four air bag units 60 to 66 corresponding to the direction $\alpha_m$. Which of the four air bag units 60 to 66 should be activated is previously set for each direction $\alpha_m$.

As discussed above, the control routine shown in the flowchart of FIG. 10 enables only the required ones among the four air bag units 60 to 66 to be activated when the projective component f$\alpha_m$ of the composite vector F is greater than the threshold value fth($\alpha_m$) for a certain direction $\alpha_m$ among the directions $\alpha_1$ to $\alpha_{11}$.

The following describes the time-based variations of accelerations, arithmetic values, magnitude and direction of a composite vector, and projective component of the composite vector, in one case that the external force applied to the vehicle 70 is not sufficiently large to require the activation of the air bag units 60 to 66 and in another case that the external force applied is sufficiently large to require the activation of the air bag units 60 to 66.

Figure 11:
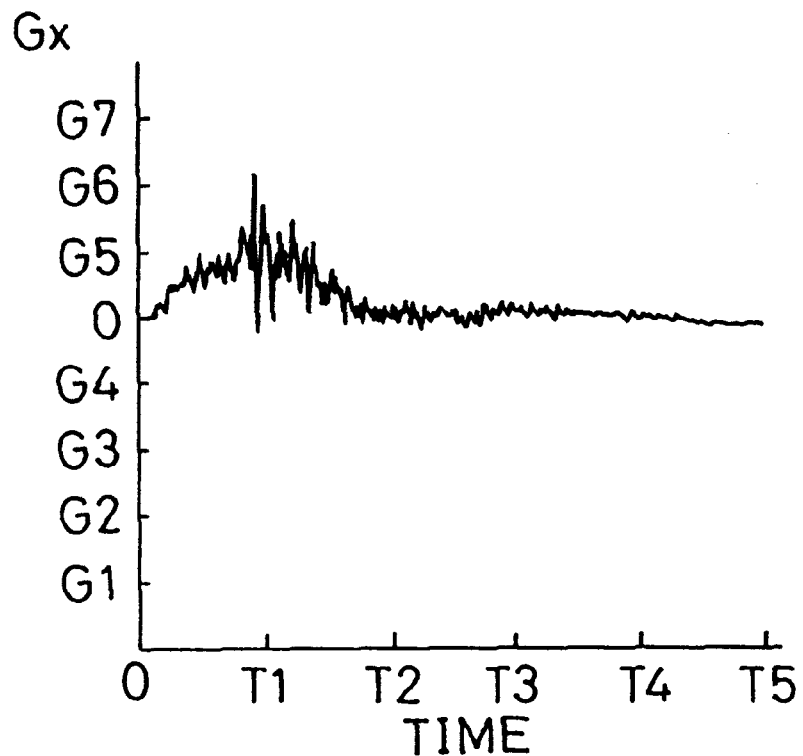
FIGS. 11(a) and 11(b) are characteristic charts showing time-based variations in accelerations Gx and Gy detected in case that the external force applied to the vehicle 70 is not sufficiently large to require the activation of the air bag units 60 to 66.
Figure 11:
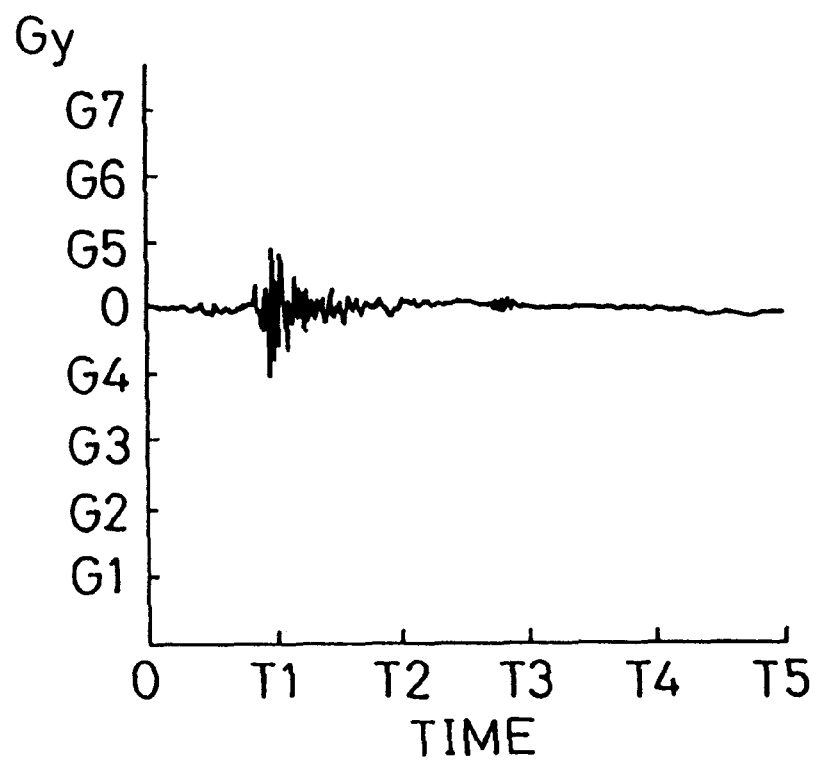

FIGS. 11(a) and 11(b) are characteristic charts showing time-based variations in accelerations Gx and Gy detected in case that the external force applied to the vehicle 70 is not sufficiently large to require the activation of the air bag units 60 to 66. FIGS. 12(a) and 12(b) are characteristic charts showing time-based variations in arithmetic values Vx and Vy obtained by integrating the accelerations Gx and Gy shown in FIG. 11. The values Vx and Vy are obtained by integrating the accelerations Gx and Gy once since the onset of application of the external force, and are used for the arithmetic values fx and fy in the control routine shown in the flowchart of FIG. 10.

Figure 12:
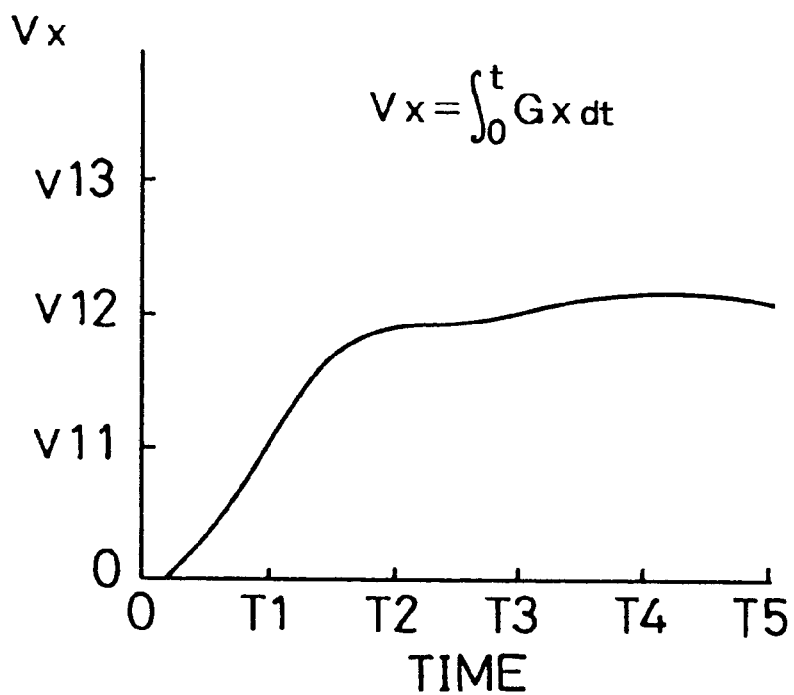
FIGS. 12(a) and 12(b) are characteristic charts showing time-based variations in arithmetic values Vx and Vy obtained by integrating the accelerations Gx and Gy shown in FIG. 11.
Figure 12:
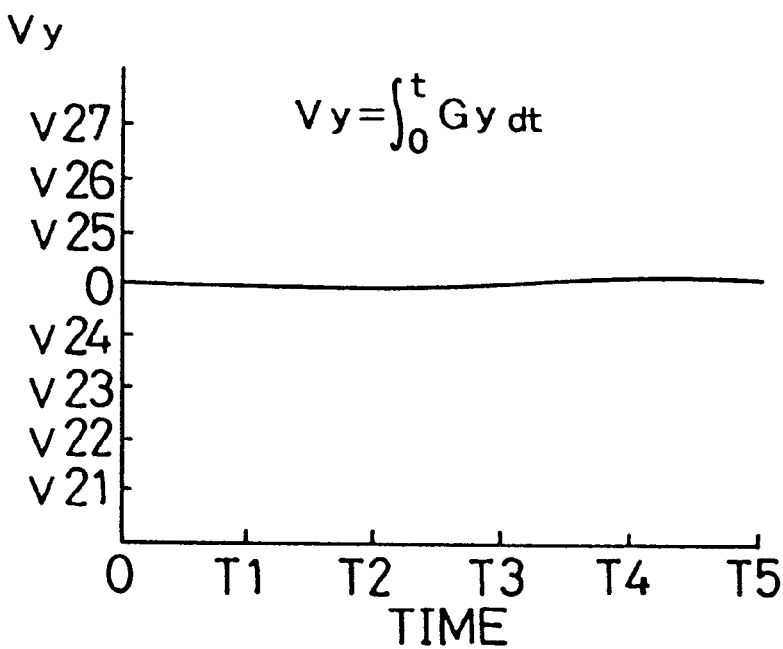
Figure 13:
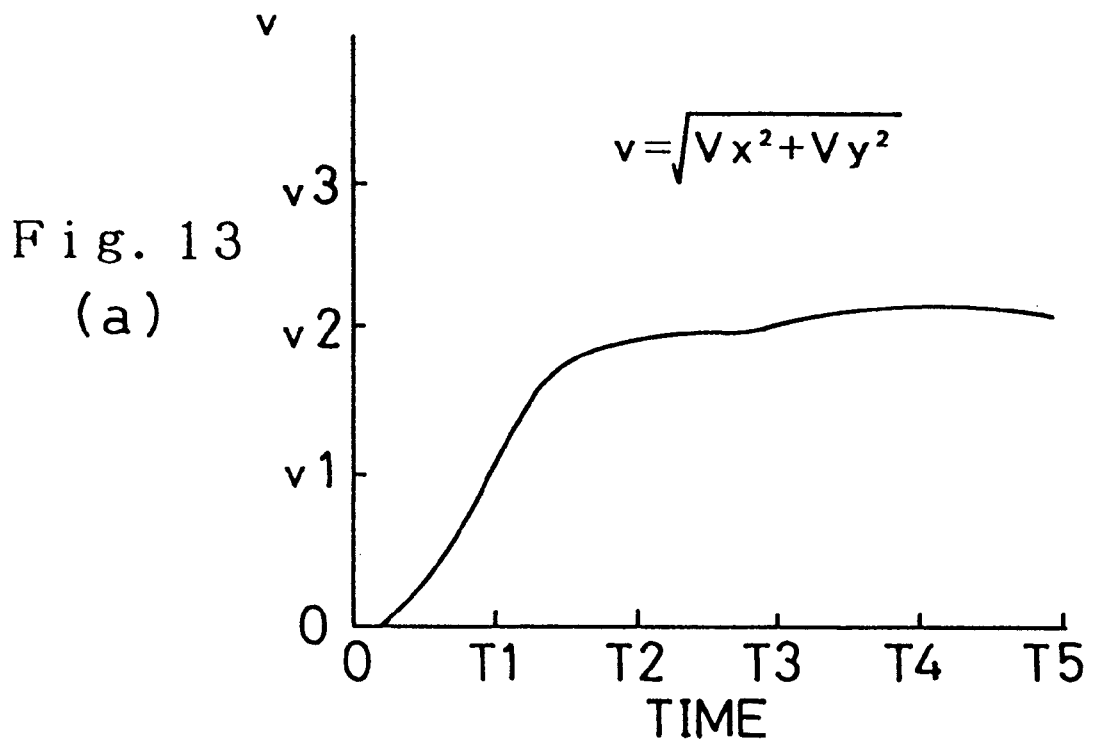
FIGS. 13(a) and 13(b) are characteristic charts showing time-based variations in magnitude v and direction θ of a composite vector based on the arithmetic values Vx and Vy of FIG. 12.
Figure 13:
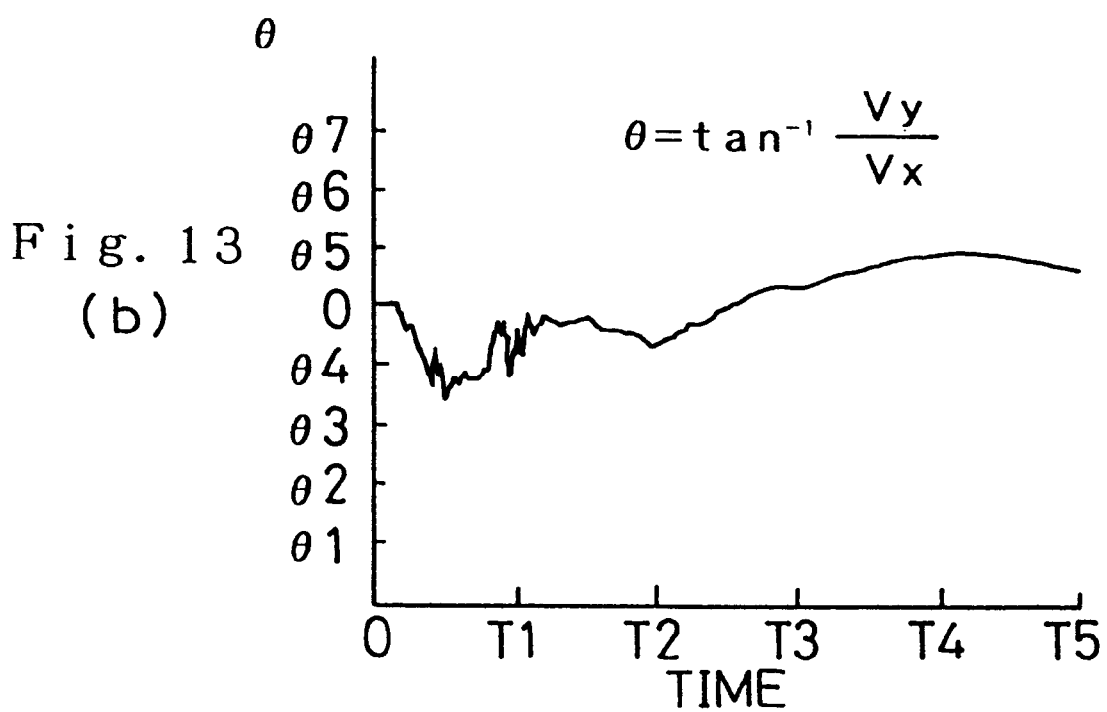
Figures 14A, 14B:
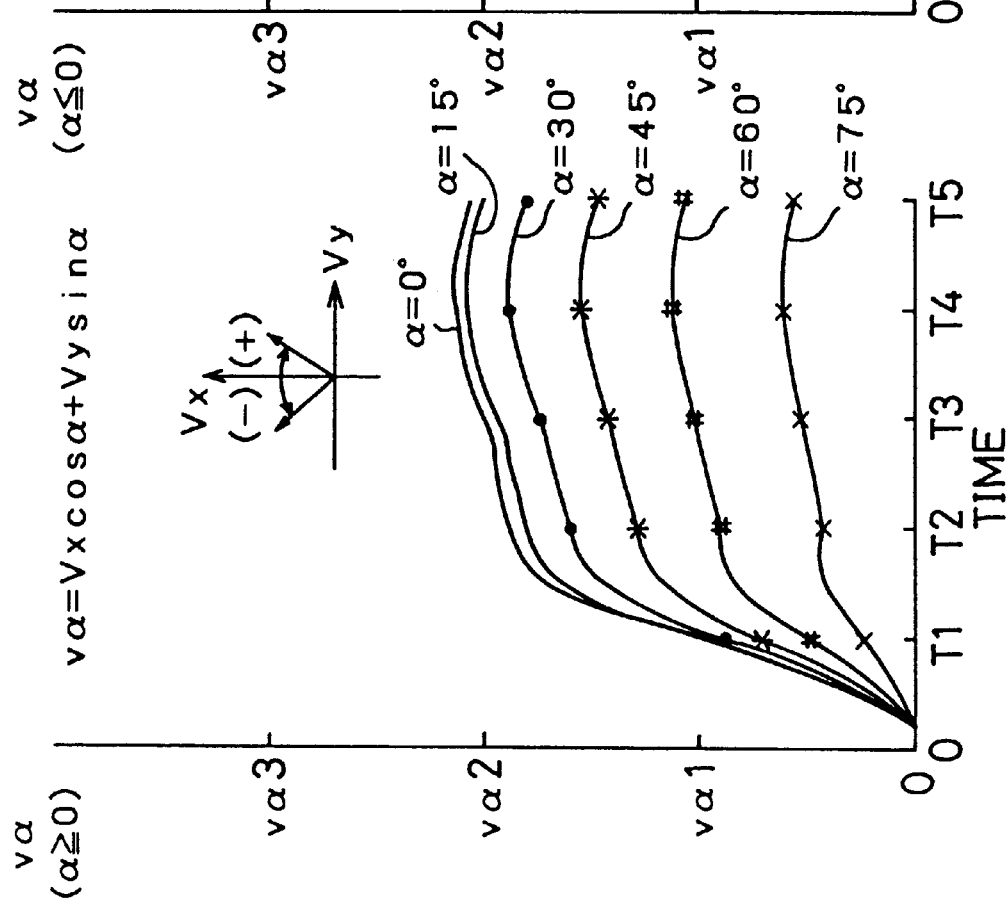
FIGS. 14(a) and 14(b) are characteristic charts showing time-based variations in projective components vα of the composite vector based on the arithmetic values Vx and Vy of FIG. 12 in the directions $\alpha_1$ to $\alpha_{11}$.

FIGS. 13(a) and 13(b) are characteristic charts showing time-based variations in magnitude v and direction $\theta$ of a composite vector based on the arithmetic values Vx and Vy of FIG. 12. FIGS. 14(a) and 14(b) are characteristic charts showing time-based variations in projective components v$\alpha$ of the composite vector based on the arithmetic values Vx and Vy of FIG. 12 in the directions $\alpha_1$ to $\alpha_{11}$. FIGS. 14(a) and 14(b) respectively correspond to the cases of $\alpha \geq 0$ and $\alpha \leq 0$.

In order to prevent any of the air bag units 60 to 66 from being activated in case that the external force applied to the vehicle 70 is not sufficiently large to require the activation of the air bag units 60 to 66, it is required to set all the threshold values fth($\alpha_m$) for the respective directions $\alpha_1$ to $\alpha_{11}$ to be greater than the projective components v$\alpha$ shown in FIG. 14.

The values obtained by integrating the accelerations Gx and Gy on an interval of fixed time period may be substituted for the arithmetic values Vx and Vy obtained by directly integrating the accelerations Gx and Gy. Such integration on the interval gives arithmetic values that do not reflect the high-frequency components of the accelerations Gx and Gy, thereby improving the stability of the resulting arithmetic values. The integration on the interval also gives arithmetic values that significantly reflect short-term variations in accelerations Gx and Gy, thereby improving the response of the resulting arithmetic values.

FIGS. 15(a) and 15(b) are characteristic charts showing time-based variations in magnitude $v_{30}$ and direction $\theta_{30}$ of a composite vector based on arithmetic values $V_{30}$x and $V_{30}$y, which are obtained by integrating the accelerations Gx and Gy shown in FIG. 11 on an interval of 30 ms. The arithmetic values $V_{30}$x and $V_{30}$y are calculated according to the following equations:

$$V_{30}x = \int_{t-30}^{t} Gx\,dt \quad (5)$$

$$V_{30}y = \int_{t-30}^{t} Gy\,dt \quad (6)$$

Figure 15:
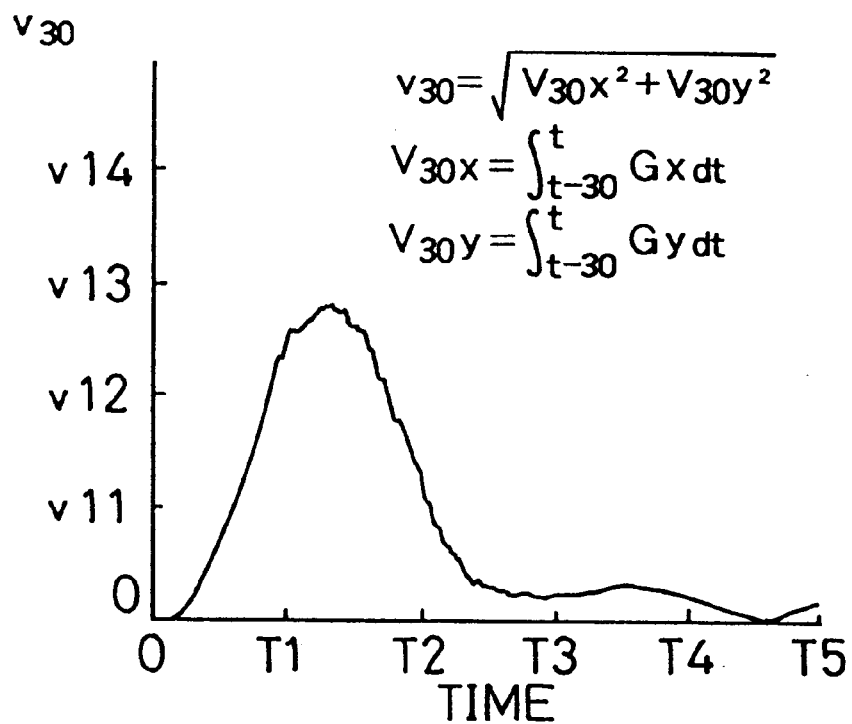
FIGS. 15(a) and 15(b) are characteristic charts showing time-based variations in magnitude $v_{30}$ and direction $\theta_{30}$ of a composite vector based on arithmetic values $V_{30}x$ and $V_{30}y$, which are obtained by integrating the accelerations Gx and Gy shown in FIG. 11 on an interval of 30 ms.
Figure 15:
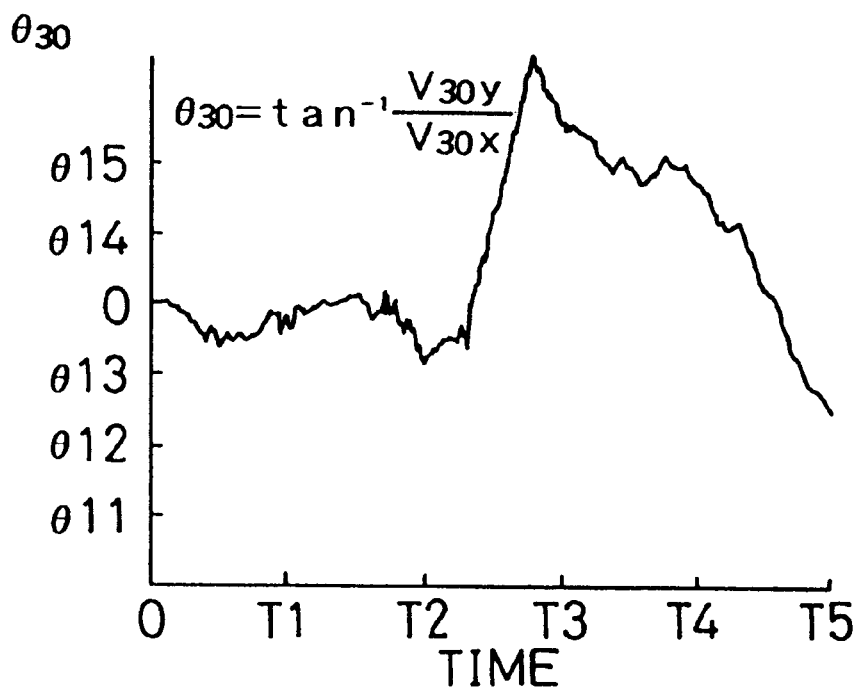

FIGS. 16(a) and 16(b) are characteristic charts showing time-based variations in projective components $v_{30}\alpha$ of the composite vector based on the arithmetic values $V_{30}$x and $V_{30}$y of FIG. 15 in the directions $\alpha_1$ to $\alpha_{11}$. FIGS. 16(a) and 16(b) respectively correspond to the cases of $\alpha \geq 0$ and $\alpha \leq 0$. In order to carry out the determination of whether or not the air bag units 60 to 66 are to be activated, based on the projective components $v_{30}\alpha$, it is required to set all the threshold values fth($\alpha_m$) for the respective directions $\alpha_1$ to $\alpha_{11}$ to be greater than the projective components $v_{30}\alpha$ shown in FIG. 16.

Figure 17:
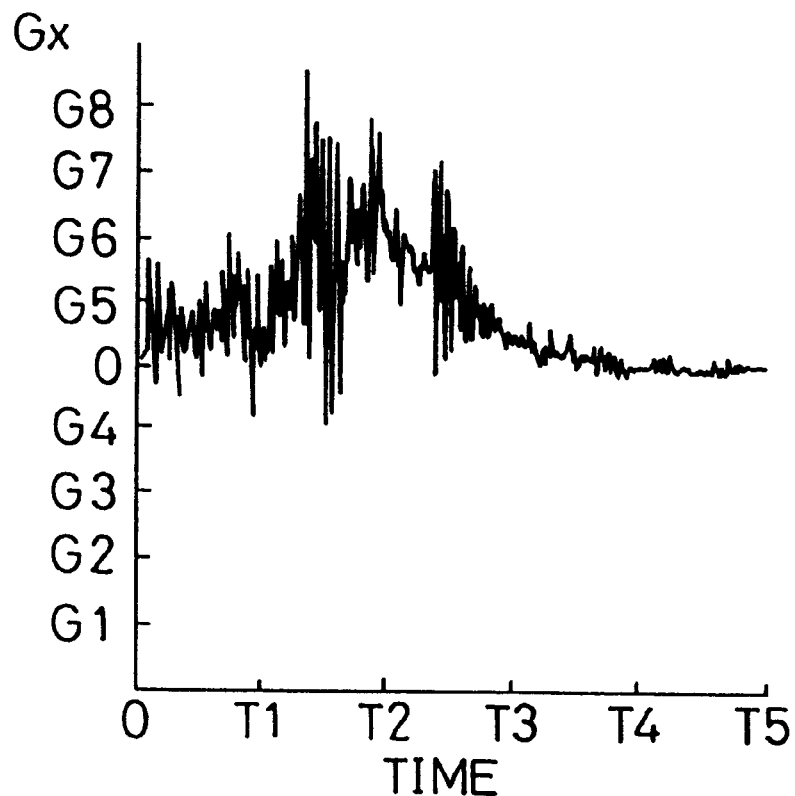
FIGS. 17(a) and 17(b) are characteristic charts showing time-based variations in accelerations Gx and Gy detected in case that the external force applied to the vehicle 70 is sufficiently large to require the activation of the air bag units 60 to 66.
Figure 17:
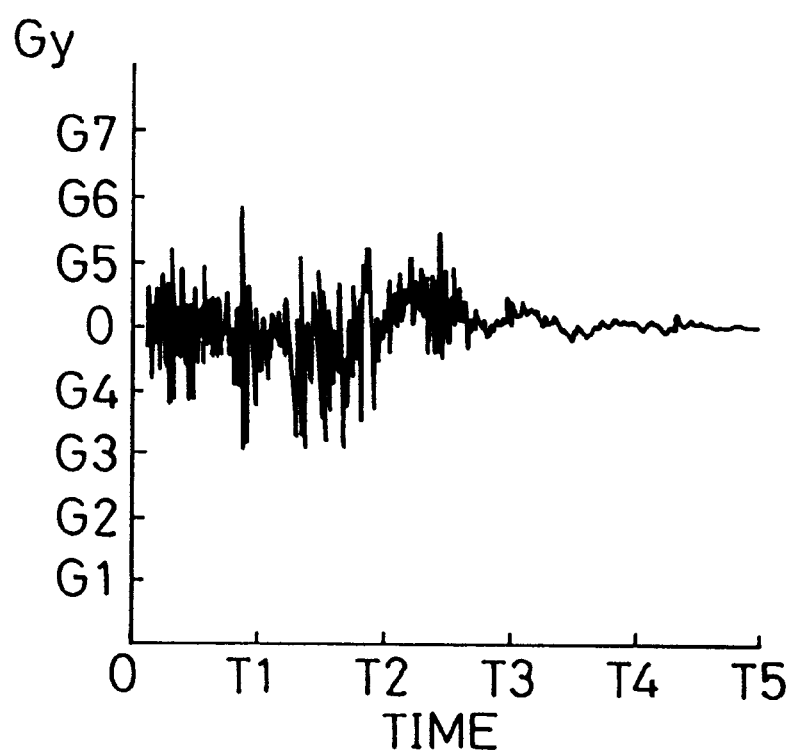
Figure 18:
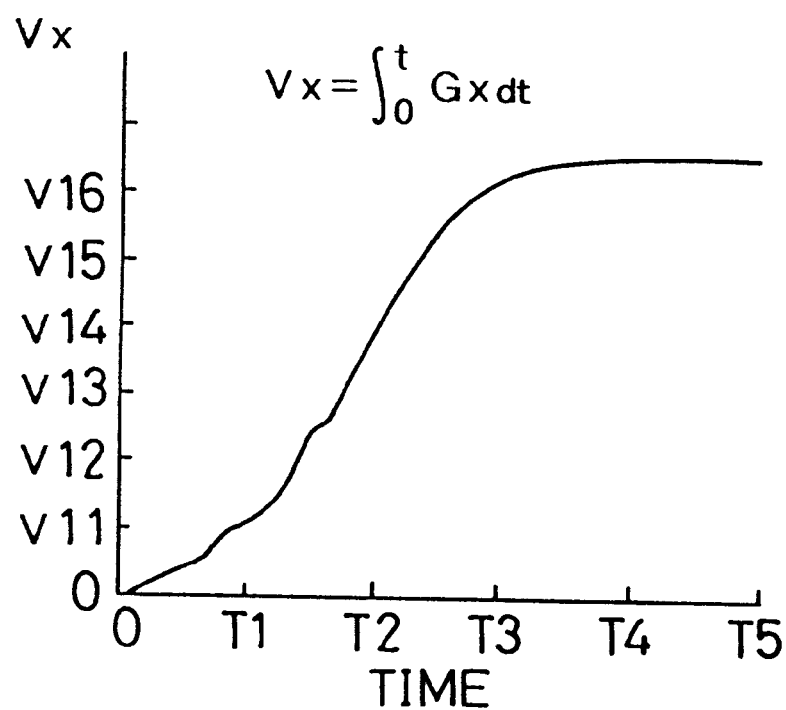
FIGS. 18(a) and 18(b) are characteristic charts showing time-based variations in arithmetic values Vx and Vy obtained by integrating the accelerations Gx and Gy shown in FIG. 17.
Figure 18:
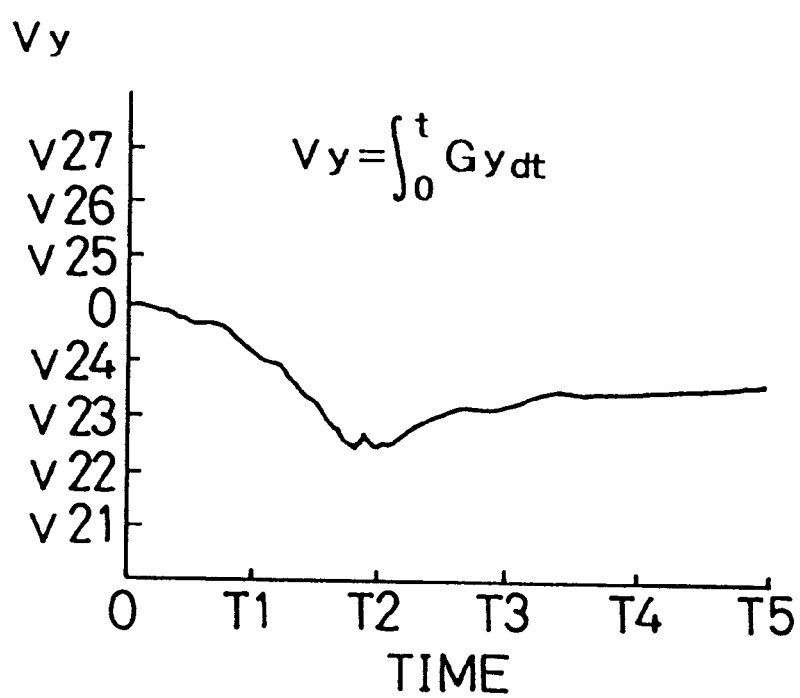
Figure 19:
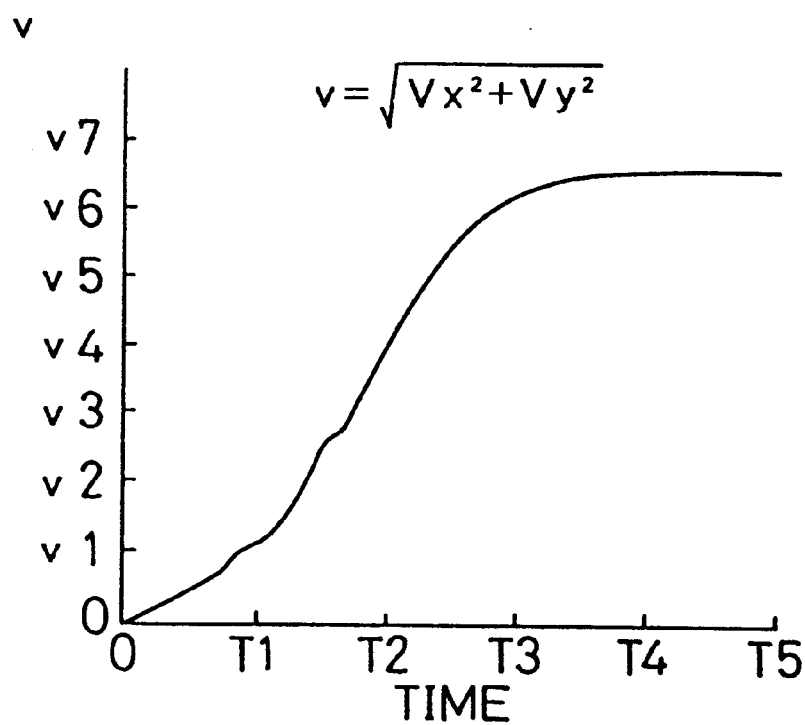
FIGS. 19(a) and 19(b) are characteristic charts showing time-based variations in magnitude v and direction θ of a composite vector based on the arithmetic values Vx and Vy of FIG. 18.
Figure 19:
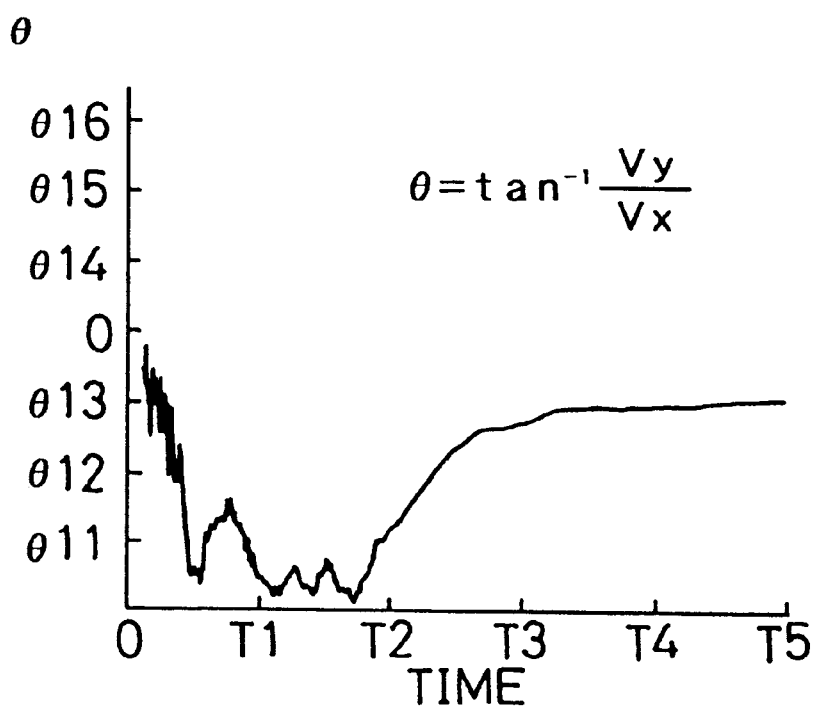
Figures 20A, 20B:
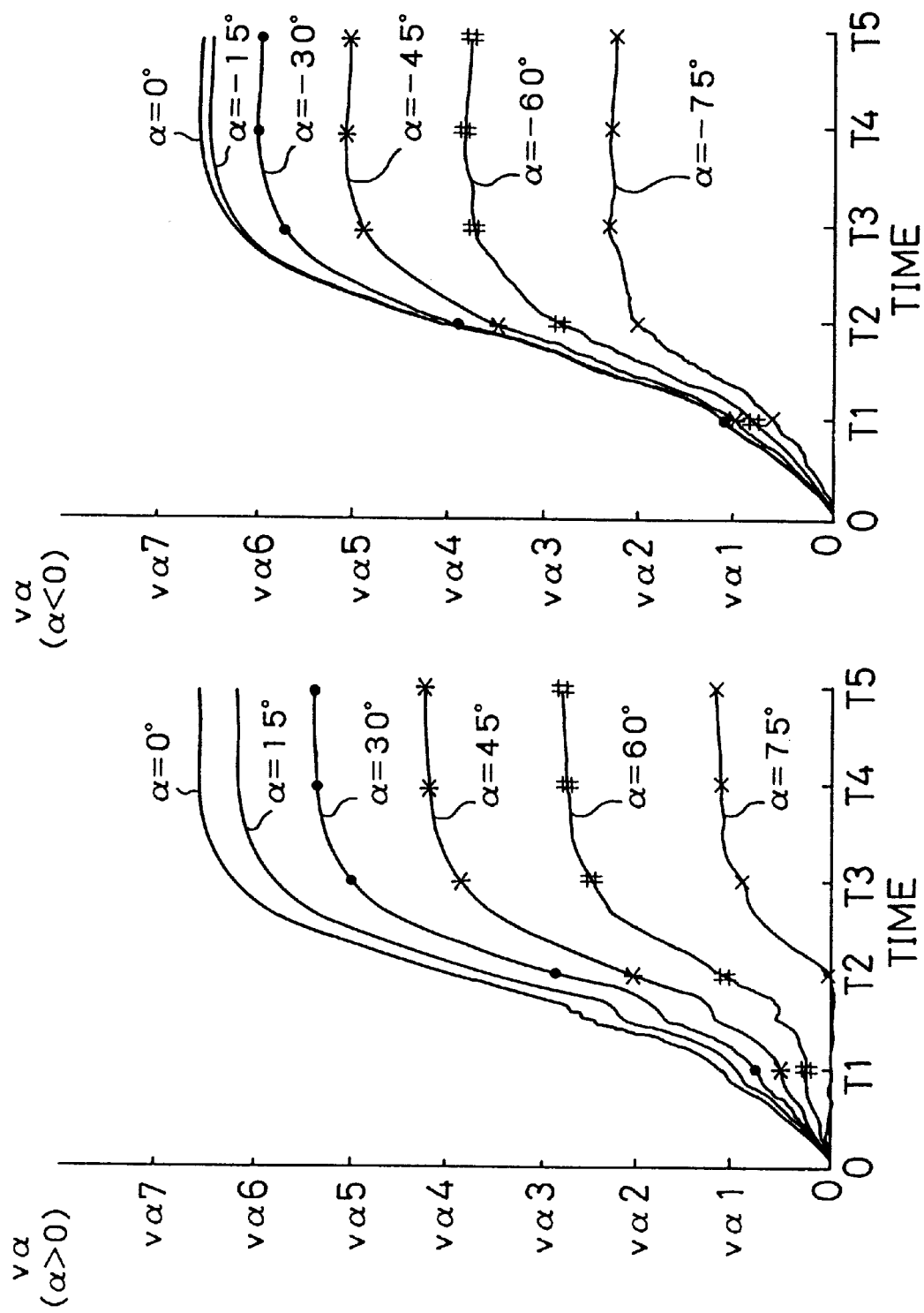
FIGS. 20(a) and 20(b) are characteristic charts showing time-based variations in projective components vα of the composite vector based on the arithmetic values Vx and Vy of FIG. 18 in the directions $\alpha_1$ to $\alpha_{11}$.

FIGS. 17(a) and 17(b) are characteristic charts showing time-based variations in accelerations Gx and Gy detected in case that the external force applied to the vehicle 70 is sufficiently large to require the activation of the air bag units 60 to 66. Namely the characteristic charts of FIG. 17 show the time-based variations observed, for example, when the vehicle 70 crashes obliquely on its left corner at a high speed. FIGS. 18(a) and 18(b) are characteristic charts showing time-based variations in arithmetic values Vx and Vy obtained by integrating the accelerations Gx and Gy shown in FIG. 17. FIGS. 19(a) and 19(b) are characteristic charts showing time-based variations in magnitude v and direction $\theta$ of a composite vector based on the arithmetic values Vx and Vy of FIG. 18. FIGS. 20(a) and 20(b) are characteristic charts showing time-based variations in projective components v$\alpha$ of the composite vector based on the arithmetic values Vx and Vy of FIG. 18 in the directions $\alpha_1$ to $\alpha_{11}$. FIGS. 20(a) and 20(b) respectively correspond to the cases of $\alpha \geq 0$ and $\alpha \leq 0$.

Figure 21:
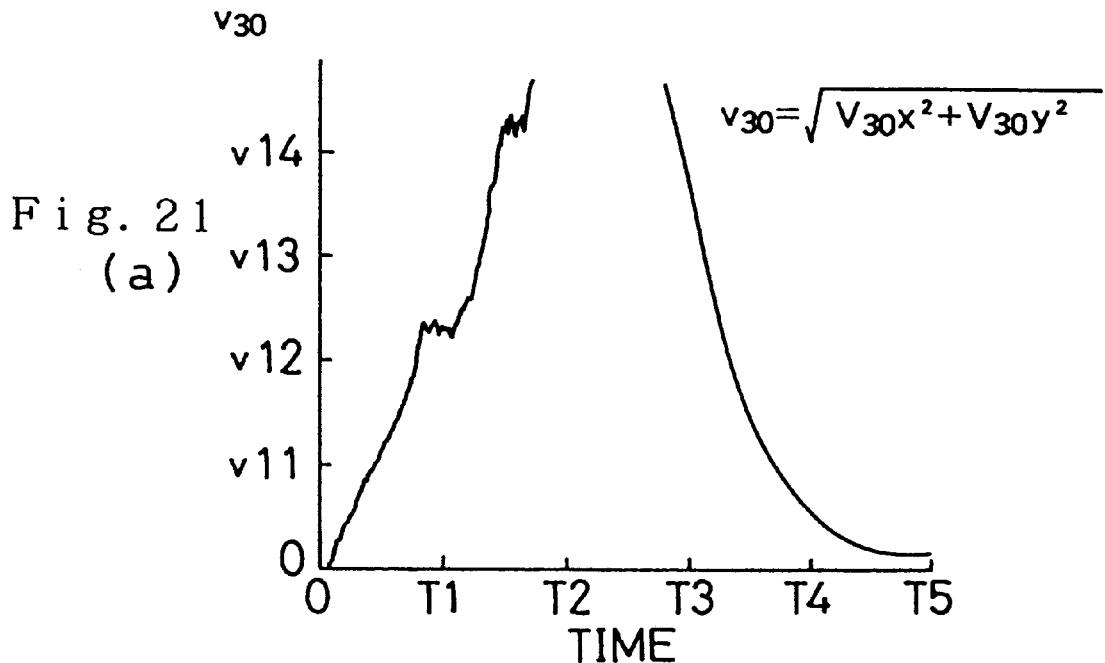
FIGS. 21(a) and 21(b) are characteristic charts showing time-based variations in magnitude $v_{30}$ and direction $\theta_{30}$ of a composite vector based on arithmetic values $V_{30}x$ and $V_{30}y$, which are obtained by integrating the accelerations Gx and Gy shown in FIG. 17 on an interval of 30 ms.
Figure 21:
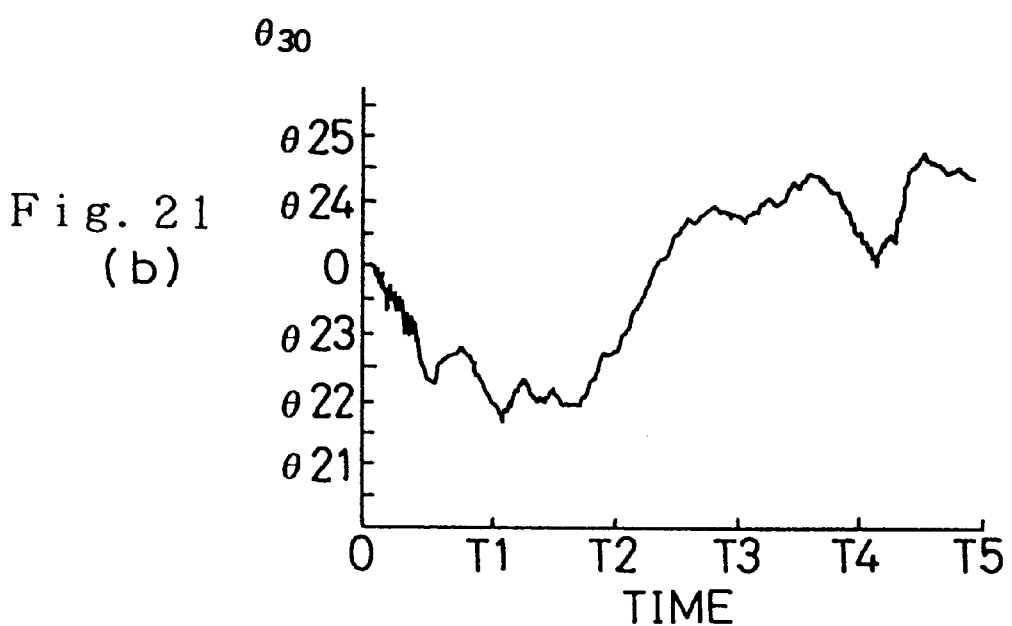

FIGS. 21(a) and 21(b) are characteristic charts showing time-based variations in magnitude $v_{30}$ and direction $\theta_{30}$ of a composite vector based on arithmetic values $V_{30}$ x and $V_{30}$ y, which are obtained by integrating the accelerations Gx and Gy shown in FIG. 17 on an interval of 30 ms. FIGS. 22(a) and 22(b) are characteristic charts showing time-based variations in projective components $v_{30}\alpha$ of the composite vector based on the arithmetic values $V_{30}$x and $V_{30}$y of FIG. 21 in the directions $\alpha_1$ to $\alpha_{11}$. FIGS. 22(a) and 22(b) respectively correspond to the cases of $\alpha \geq 0$ and $\alpha \leq 0$.

In order to enable some of the four air bag units 60 to 66 corresponding to a certain direction among all the directions $\alpha_1$ to $\alpha_{11}$ to be activated in case that the external force applied to the vehicle 70 in the certain direction is sufficiently large to require the activation of the air bag units 60 to 66, it is required to set the threshold values fth($\alpha_m$) in such a manner that allows the projective component $v_{30}\alpha$ shown in FIG. 22 to be greater than the threshold value fth($\alpha_m$) for the certain direction.

When the vehicle 70 crashes and receives an external force, the vehicle 70 tends to spin due to the external force unless the external force applied to the vehicle 70 acts in the direction of 0 degree (that is, along the longitudinal axis of the vehicle 70). This happens, for example, when the vehicle 70 crashes obliquely. The greater external force applied to the vehicle causes the severer spinning behavior of the vehicle 70.

In case that the external force applied to the vehicle 70 is sufficiently large to require the activation of the air bag units 60 to 66, the vehicle 70 is subjected to a severe spinning behavior due to the external force. In case that the external force applied to the vehicle 70 is not sufficiently large to require the activation of the air bag units 60 to 66, on the contrary, substantially no spinning force is caused by the external force.

When the external force applied to the vehicle 70 is relatively small and does not require the activation of the air bag units 60 to 66, the projective components $v_{30}\alpha$ in the positive directions $\alpha$ are not significantly different from those in the negative directions $\alpha$, as clearly seen by the comparison between FIGS. 16(*a*) and 16(*b*). when the external force applied to the vehicle 70 is rather large and requires the activation of the air bag units 60 to 66, on the other hand, the projective components $v_{30}\alpha$ in the positive directions $\alpha$ are significantly different from those in the negative directions $\alpha$, as clearly seen by the comparison between FIGS. 22(*a*) and 22(*b*).

These phenomena imply that the relatively small external force applied to the vehicle 70 causes the retardation to rise at a substantially equal rate of variation in any direction $\alpha$, while the relatively large external force applied to the vehicle 70 causes the retardation on the left side of the vehicle 70 to rise at a different rate of variation from the same on the right side of the vehicle 70. Namely, in the latter case, the variation rate of retardation rises quite abruptly on either the left side or the right side of the vehicle 70.

In this embodiment, for example, the threshold values fth($\alpha_m$) are set to be a little greater than the respective maximum values of the projective components $v_{30}\alpha$ obtained in FIG. 16 for all the directions $\alpha_1$ to $\alpha_{11}$. Under such a condition, the projective component $v_{30}\alpha$ obtained in FIG. 22 exceeds the preset threshold value fth($\alpha_m$) ($v_{30}\alpha$>fth($\alpha_m$)) in the directions of $\alpha$=−75, −60, and −45 degrees, before a time T1 [ms] has elapsed since the onset of application of the external force.

In the control routine shown in the flowchart of FIG. 10, when the projective component $v_{30}\alpha$ exceeds the threshold value fth($\alpha_m$) ($v_{30}\alpha$>fth($\alpha_m$)) in a certain direction among the directions $\alpha_1$ to $\alpha_{11}$, it is determined that the air bag units corresponding to the certain direction are to be activated. The CPU 30 can accordingly realize a quick determination in this control routine by taking advantage of the spinning behavior of the vehicle 70 due to the external force.

In this manner, the structure of the embodiment realizes a quick response to a variation in behavior of the vehicle 70 and thus attains an adequate activation control of the air bag units 60 to 66.

As discussed previously, the embodiment calculates the projective component f$\alpha$ of the composite vector F, which is based on the arithmetic values fx and fy, in the direction $\alpha$ according to Equation (4) given above. Unlike the equations used in the conventional method, Equation (4) does not include any complicated calculations, such as second power, square root, division, or arc tangent. The method of the embodiment accordingly does not require the execution of complicated and time-consuming arithmetic operations. Equation (4), however, still includes trigonometric functions, such as cos$\alpha$ and sin$\alpha$, which make the calculations a little complicated. In accordance with one preferable application of the embodiment, a technique discussed below is taken to further simplify the calculations. In the description below, by way of example, as shown in FIG. 7 the projective component f$\alpha_m$ of the composite vector F is calculated for each direction $\alpha_m$ out of the eleven directions $\alpha_1$ to $\alpha_{11}$ ranging from $\alpha$=−75° to $\alpha$=75° at intervals of 15°.

The values of cos$\alpha_m$ and sin$\alpha_m$ are determined in advance for the respective directions $\alpha_m$ (that is, $\alpha_1$ to $\alpha_{11}$). This step does not directly calculate the values of cos$\alpha_m$ and sin$\alpha_m$ themselves, but determines approximate values (cos$\alpha_m$)' and (sin$\alpha_m$)' that can be expressed as 8-bit digital data. The approximate values expressible as 8-bit digital data are given in the form of a/256, wherein 'a' denotes an integer equal to or smaller than 256.

FIGS. 23(*a*) and 23(*b*) are tables showing the values of cos$\alpha_m$ and sin$\alpha_m$ with their corresponding approximate values (cos$\alpha_m$)' and (sin$\alpha_m$)', respectively. The tables of FIG. 23 show data only for the positive directions $\alpha_m$. Figures in the 'error' column represent the differences between the proper values and approximate values.

As clearly shown in FIGS. 23(*a*) and 23(*b*), the errors are all smaller than 0.2%, so that the approximate values (cos$\alpha_m$)' and (sin$\alpha_m$)' can be substituted for cos$\alpha_m$ and sin$\alpha_m$ in arithmetic operations without lowering the accuracy of the operations.

Each of the approximate values (cos$\alpha_m$)' and (sin$\alpha_m$)' thus obtained is then decomposed and transformed to the sum of ½ powers. FIG. 24 shows the approximate values (cos$\alpha_m$)' and (sin$\alpha_m$)' with their corresponding sums of ½ powers.

The following describes a concrete procedure of calculating the projective component f$\alpha_m$ from the approximate values and the sums of ½ powers. By way of example, the following operations is executed for projective component f$\alpha_m$ in the direction of 30° (that is, $\alpha_8$ or m=8 in FIG. 7).

Equation (4) gives the projective component f$\alpha_8$ in the direction $\alpha_8$ as follows:

$$f\alpha_8 = fx \cdot \cos\alpha_8 + fy \cdot \sin\alpha_8 \qquad (7)$$

$$= fx \cdot \cos 30° + fy \cdot \sin 30° \; (\alpha_8 = 30°)$$

The first term in the right side of Equation (7) can be rewritten as below by using the approximate value (cos$\alpha_m$)' specified in FIG. 23(*a*):

$$fx \cdot \cos 30° \approx fx \times (\cos 30°) = fx \times \frac{222}{256} \qquad (8)$$

The approximate value of Equation (8) can be expressed by the sum of ½ powers as shown in FIG. 24 and is thus rewritten as Equation (9) given below:

$$fx \times \frac{222}{256} = fx \times \left\{ \left(\frac{1}{2}\right)^1 + \left(\frac{1}{2}\right)^2 + \left(\frac{1}{2}\right)^4 + \left(\frac{1}{2}\right)^5 + \left(\frac{1}{2}\right)^6 + \left(\frac{1}{2}\right)^7 \right\} \qquad (9)$$

$$= \left(\frac{1}{2}\right)^1 fx + \left(\frac{1}{2}\right)^2 fx + \left(\frac{1}{2}\right)^4 fx + \left(\frac{1}{2}\right)^5 fx + \left(\frac{1}{2}\right)^6 fx + \left(\frac{1}{2}\right)^7 fx$$

In equation (9), each term of the right side corresponds to $(\frac{1}{2})^n$ of the arithmetic value fx (n=1 to 7). In binary representation, $(\frac{1}{2})^n$ can be expressed as a number having the binary digit '1' only in the n decimal place. Accordingly $fx \times (\frac{1}{2})^n$ can be obtained readily by expressing the arithmetic value fx as digital data (or binary representation) and shifting the bits of the binary representation rightward n times (that is, shifting n figures). For example, $fx \times (\frac{1}{2})^n$ (where fx=5 and n=4) is determined by rewriting the value '5' of fx as '101' in binary representation or digital data and then shifting the bits of the binary representation '101' rightward four times (that is, shifting four figures). The resulting value is '0.0101'.

The respective terms in the right side of Equation (9) are calculated in this manner and then summed up to give the value of $fx \times (222/256)$.

The second term in the right side of Equation (7) can also be rewritten as below by using the approximate value $(\sin\alpha_m)'$ specified in FIG. 23(b) and the sum of ½ powers shown in FIG. 24:

$$fy \cdot \sin 30° \approx fy \times (\sin 30°)' = fx \times \left(\frac{1}{2}\right) = \left(\frac{1}{2}\right)^1 fx \qquad (10)$$

Like Equation (9), the value of $fx \times (\frac{1}{2})$ is easily obtained in Equation (10).

The value obtained in Equation (9) and the value obtained in Equation (10) are then summed up according to Equation (7) to determine the projective component $f\alpha_8$. In a similar manner, the projective component $f\alpha_m$ can be obtained for any other directions $\alpha_m$.

The technique in this preferable application of the embodiment only requires bit-shifting and adding operations without using trigonometric functions, thereby further simplifying the calculation. Especially the bit-shifting operation does not require the multiplication of decimals, thus effectively avoiding the complicated calculation.

Figure 5:
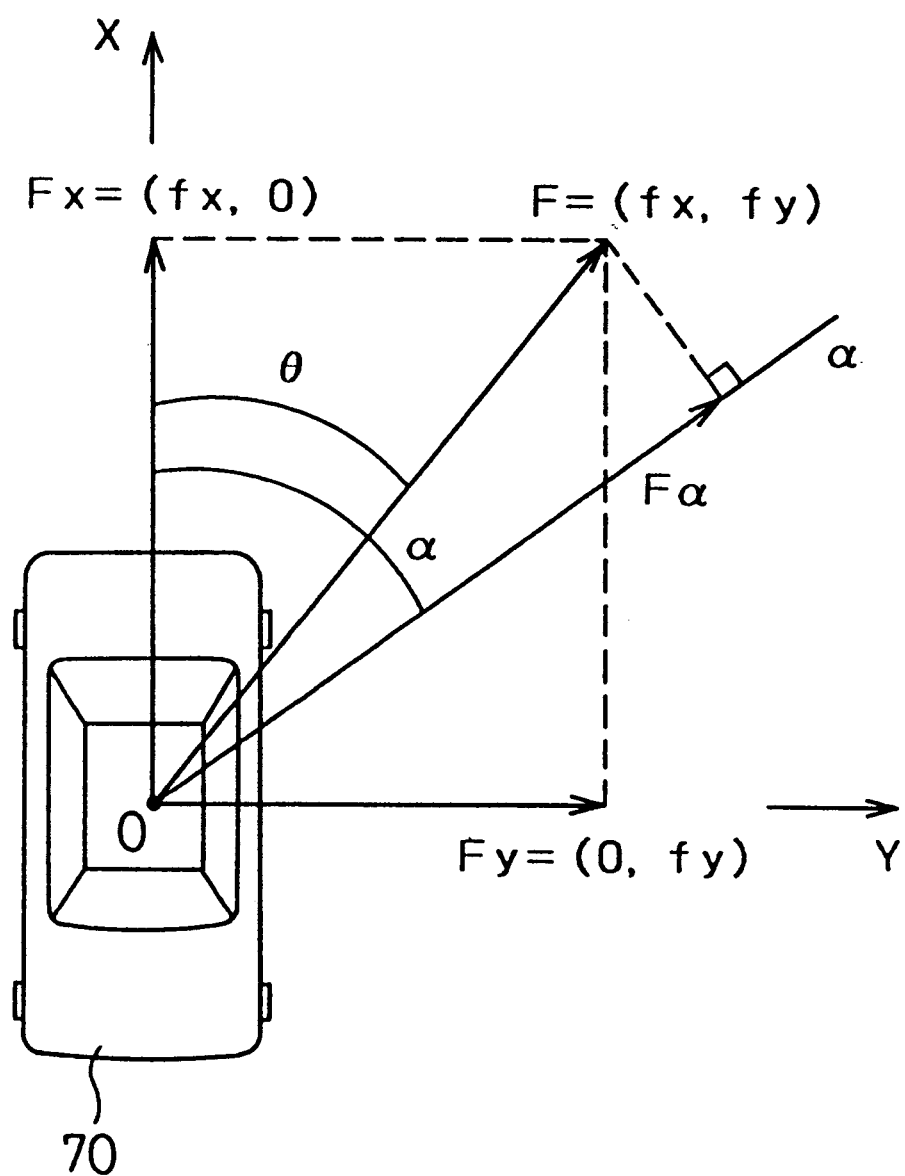
FIG. 5 shows a projective vector Fα of the composite vector F, which is obtained by combining vectors Fx and Fy with each other, in a direction α.
Figure 6:
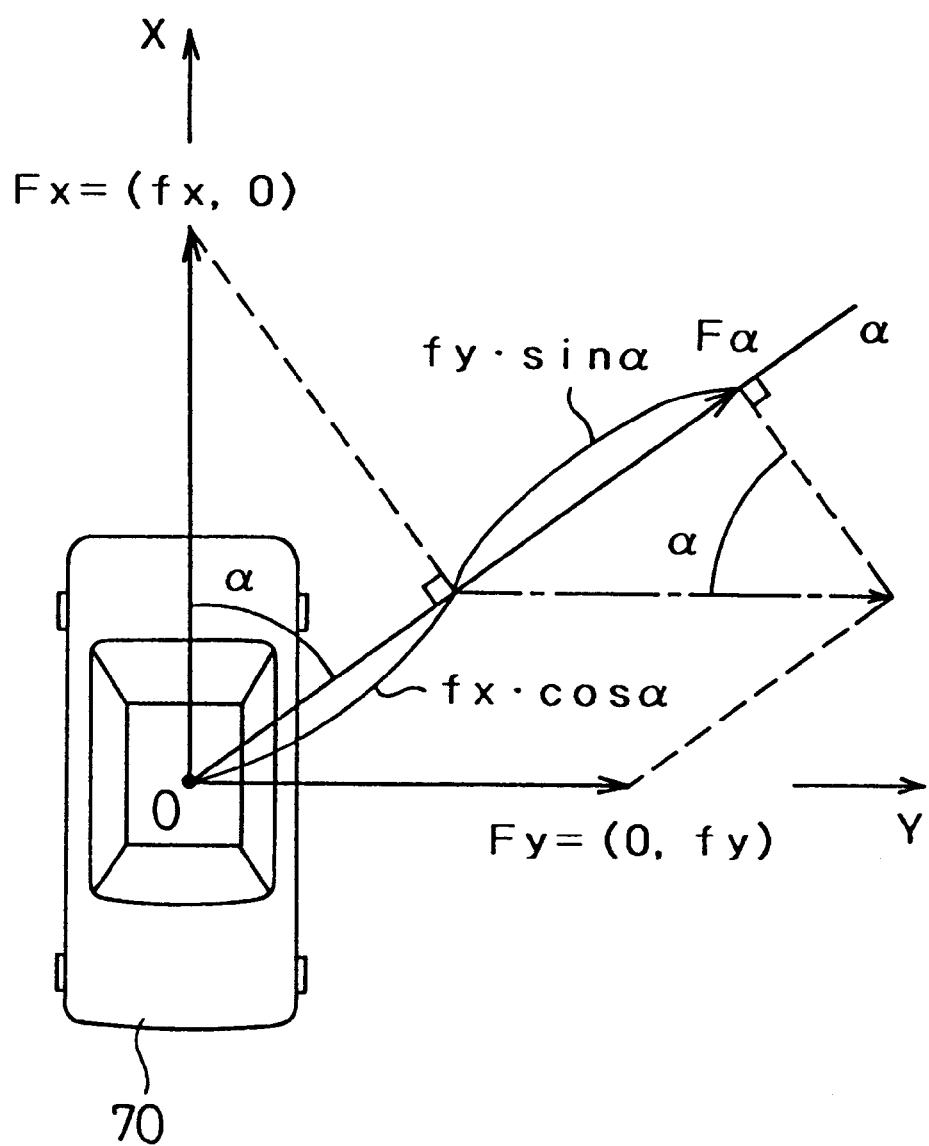
FIG. 6 shows a process of determining a projective component of the composite vector F shown in FIG. 5 (that is, a magnitude of the projective vector Fα)

The following describes a second embodiment according to the present invention. The activation control apparatus of the second embodiment has the same structure as that of the first embodiment shown in FIG. 1A. In the first embodiment, the arithmetic values fx and fy are equally treated as shown in FIG. 5 or 6. The technique of the first embodiment sets the vector Fx having the x component=fx and the y component=0 and the vector Fy having the x component=0 and the y component=fy, determines the projective component $f\alpha$ of the composite vector F=(fx, fy) of these two vectors in the direction $\alpha$, and controls activation of the air bag units based on the projective component $f\alpha$.

Since the arithmetic value fx is generally greater than the arithmetic value fy (fx>fy), however, the technique of equally treating the arithmetic values fx and fy does not enable the arithmetic value fy to effectively affect the activation control.

Figure 25A:
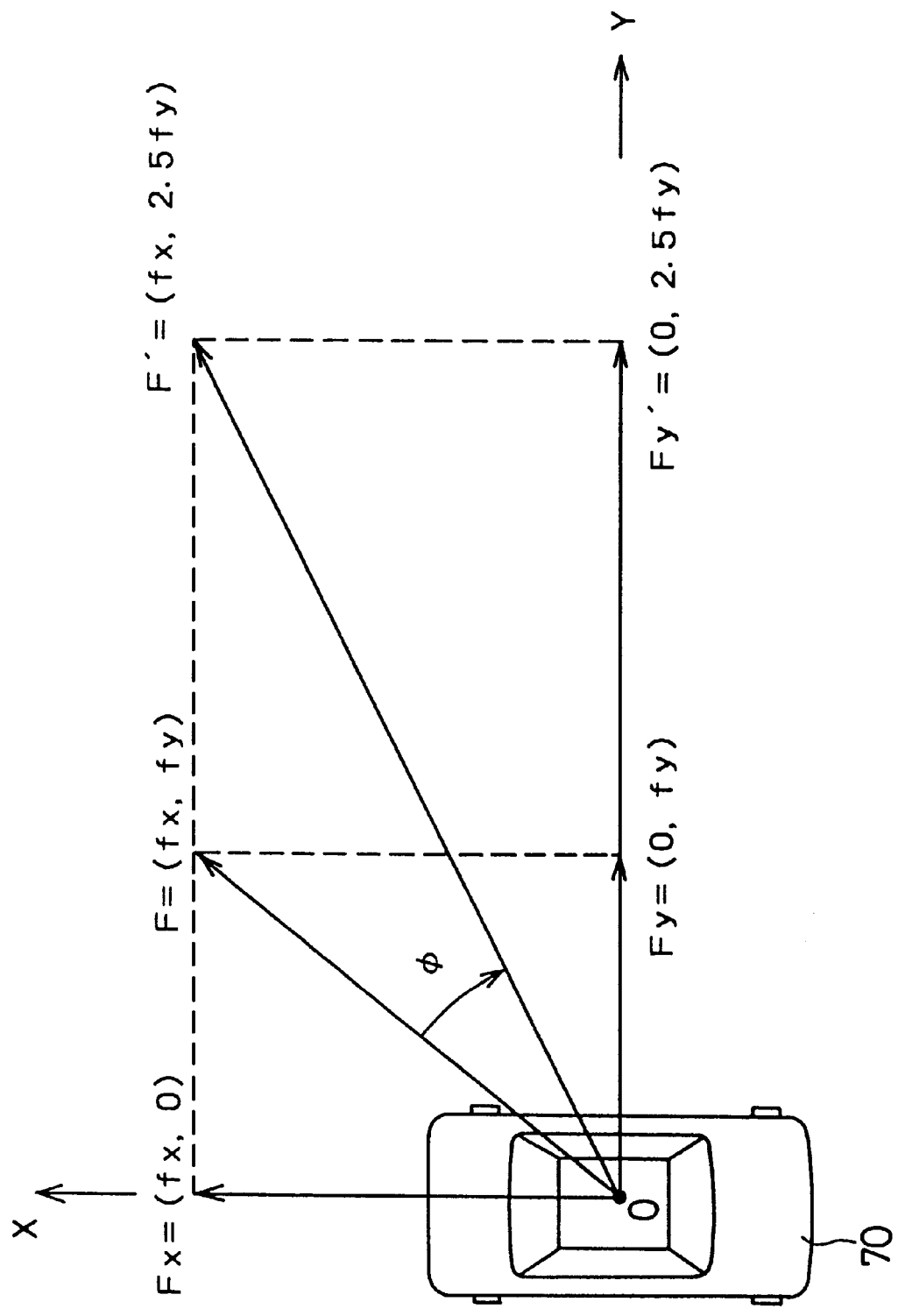
FIG. 25A shows a composite vector F' of the vector Fx and a vector Fy' extended by 2.5 times.

In the second embodiment, in order to enable the arithmetic value fy to affect the activation control more effectively, the greater weight is given to the arithmetic value fy than that to the arithmetic value fx. A concrete procedure adopted in the second embodiment calculates the projective component after multiplying only the arithmetic value fy by a coefficient greater than the value '1'. By way of example, when the coefficient is equal to 2.5, the arithmetic value fy is multiplied to have the magnitude of 2.5 times. Referring to FIG. 25A, the vector Fy is thus extended by 2.5 times to a vector Fy'=(0, 2.5fy). The composite vector F=(fx, fy) of the vectors Fx and Fy is accordingly changed to a composite vector F'=(fx, 2.5fy). The multiplication of the arithmetic value fy by the coefficient extends the vector Fy along the lateral axis of the vehicle 70, and thereby amplifies the rotary component of the composite vector F by the angle $\phi$ as shown in FIG. 25A.

Even when the second arithmetic value (fy) is continuously smaller than the first arithmetic value (fx), the second arithmetic value can sufficiently affect the activation control of the air bag units by varying the ratio of the first arithmetic value to the second arithmetic value and giving the greater weight to the second arithmetic value than to the first arithmetic value.

Figure 25B:
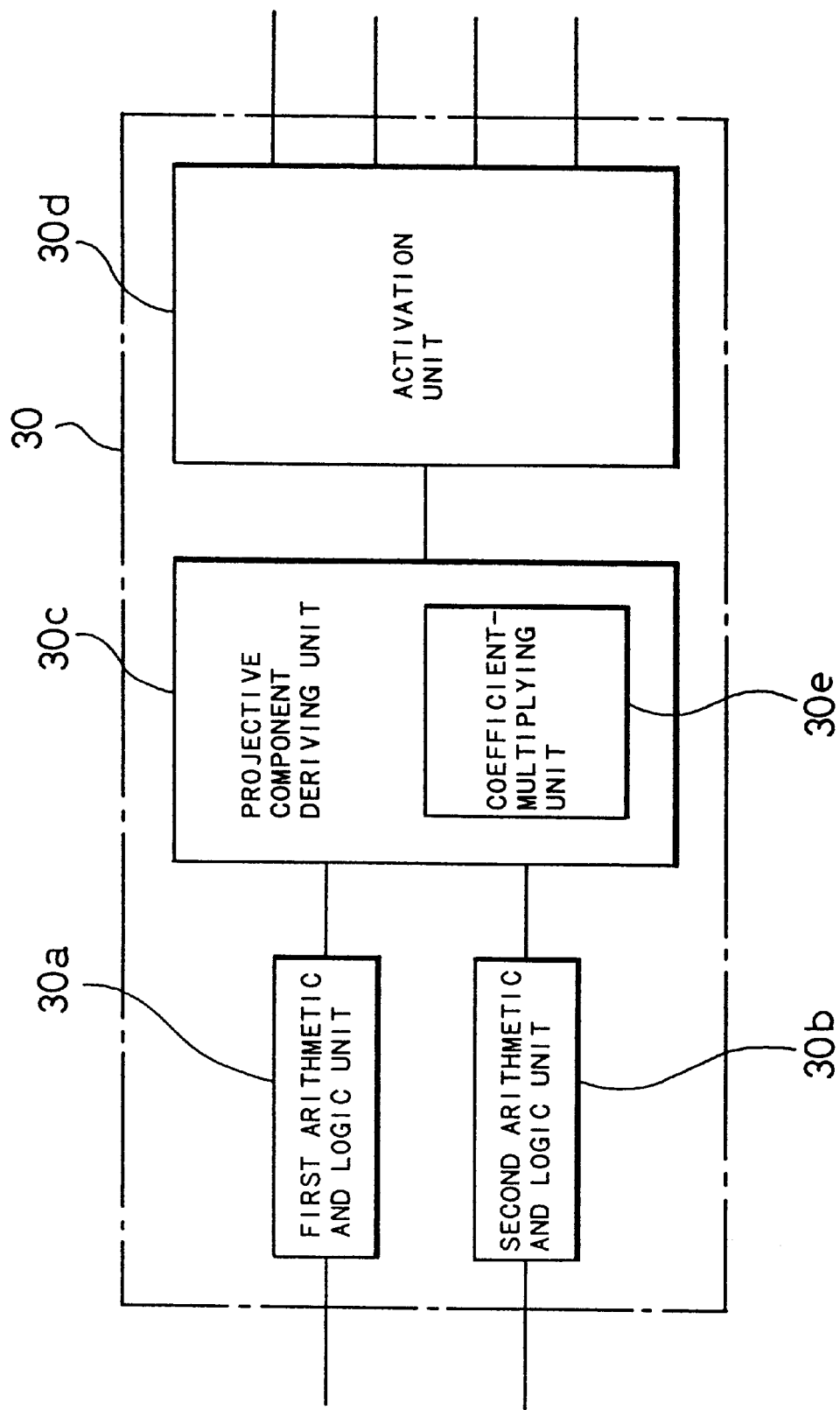
FIG. 25B is a block diagram showing various functions of the CPU 30 in a second embodiment according to the present invention.

FIG. 25B is a block diagram showing various functions of the CPU 30 in the second embodiment. As shown in FIG. 25B, the CPU 30 of the second embodiment further includes a coefficient-multiplying unit 30e in the projective component deriving unit 30c for multiplying only the arithmetic value fy by a coefficient greater than the value '1'.

Figure 26:
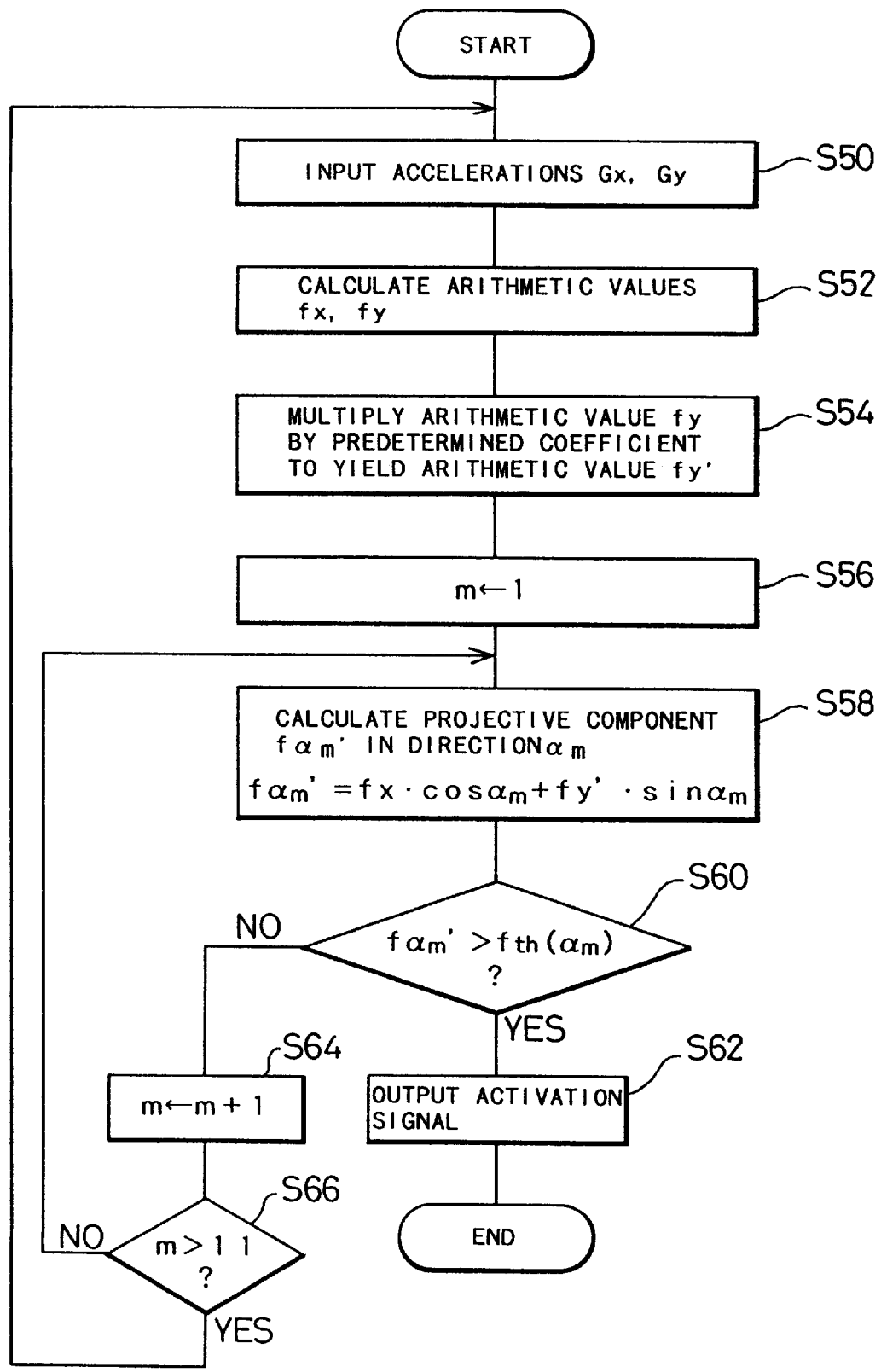
FIG. 26 is a flowchart showing a control routine executed by the CPU 30 in the second embodiment.

FIG. 26 is a flowchart showing a control routine executed by the CPU 30 in the second embodiment. When the program enters the control routine, the CPU 30 successively carries out the processing of steps S50 and S52, which is identical with that of steps S20 and S22 in the flowchart of FIG. 3 and is thus not specifically described here.

At subsequent step S54, the CPU 30 multiplies the arithmetic value fy obtained at step S52 by a predetermined coefficient, for example, '2.5', to yield an arithmetic value fy'. The CPU 30 then sets the variable 'm' representing the subscript of $\alpha_m$ equal to the value '1' at step S56, and projects a vector Fx based on the arithmetic value fx obtained at step S52 and a vector Fy' based on the arithmetic value fy' obtained at step S54 in a direction $\alpha_m$ and calculates the sum $f\alpha_m'$ of the projective components at step S58. This procedure gives the projective component $f\alpha_m'$ of the composite vector F', which is obtained by combining the vector Fx with the vector Fy' extended by 2.5 time, in the direction $\alpha_m$.

The processing of subsequent steps S60 to S66 is identical with that of steps S38 to S44 in the flowchart of FIG. 10 and is thus not specifically described here.

The following describes the time-based variation in projective component $f\alpha_m'$ of the composite vector F' obtained by the control routine discussed above. In the description below, it is assumed that the arithmetic values fx and fy used here are arithmetic values $V_{30}x$ and $V_{30}y$ obtained by integrating the accelerations Gx and Gy on an interval of 30 ms and the arithmetic value $V_{30}y$ is multiplied by the coefficient '2.5'. This gives projective components $v_{30}\alpha'$ of the composite vector, which is based on the arithmetic value $V_{30}x$ and the resulting arithmetic value $V_{30}y'$ multiplied by the coefficient '2.5'.

Figure 27A:
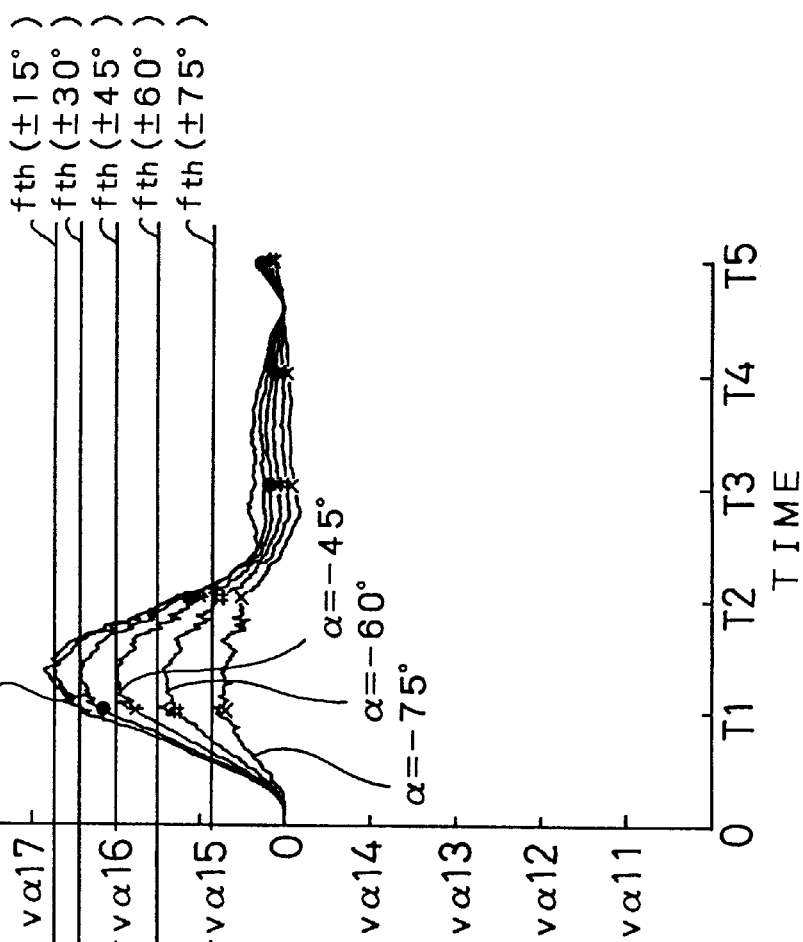
FIGS. 27(a) and 27(b) are characteristic charts showing time-based variations in projective components $v_{30}\alpha'$ of the composite vector in the directions $\alpha_1$ to $\alpha_{11}$ when the external force applied to the vehicle 70 is not sufficiently large to require the activation of the air bag units 60 to 66.
Figure 27B:
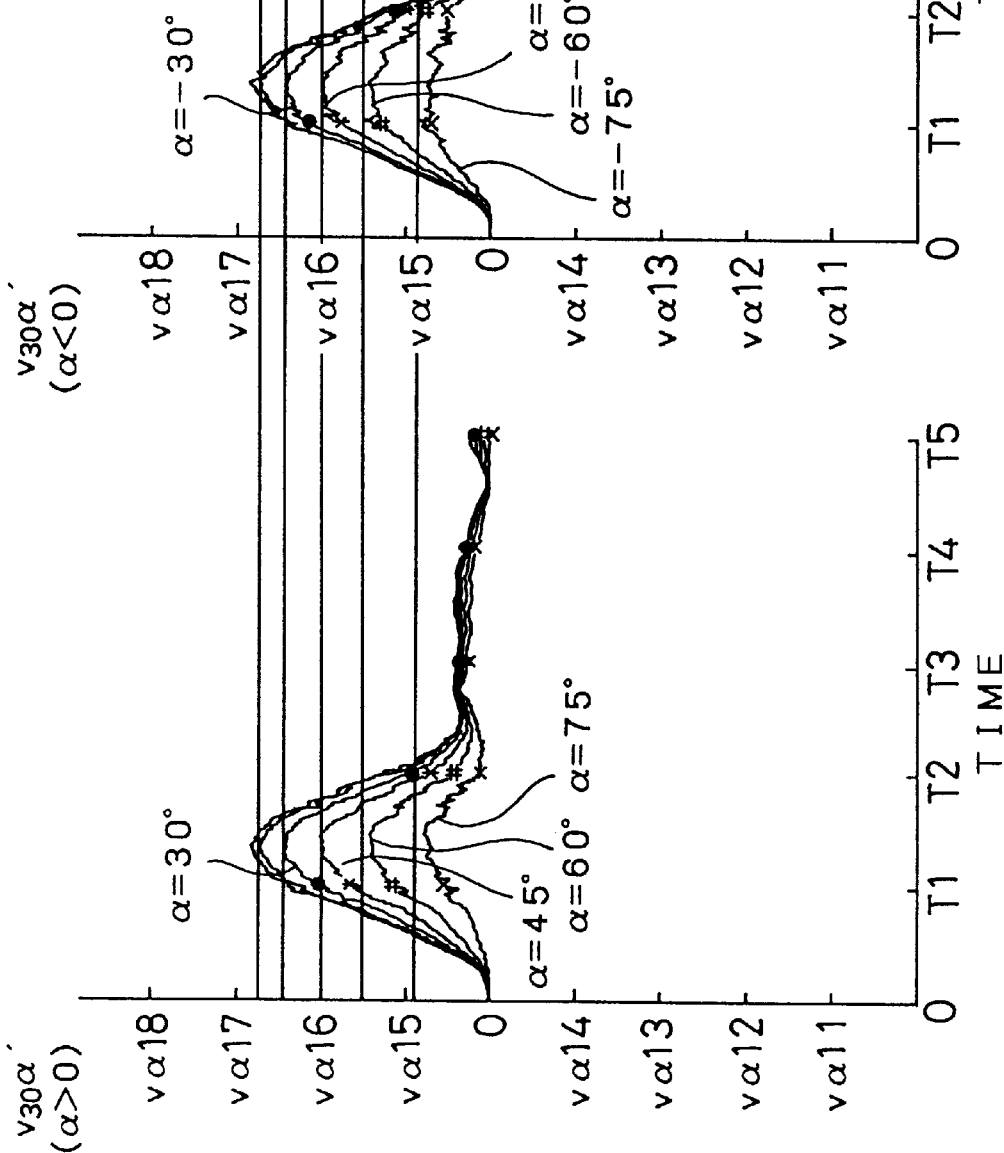

FIGS. 27(a) and 27(b) are characteristic charts showing time-based variations in projective components $v_{30}\alpha'$ of the composite vector in the directions $\alpha_1$ to $\alpha_{11}$ when the external force applied to the vehicle 70 is not sufficiently large to require the activation of the air bag units 60 to 66. FIGS. 27(a) and 27(b) respectively correspond to the cases of $\alpha \geq 0$ and $\alpha \leq 0$. In the second embodiment, in order to carry out the determination of whether or not the air bag units 60 to 66 are to be activated, based on the projective components $v_{30}\alpha'$, it is required to set all the threshold values $fth(\alpha_m)$ for the respective directions $\alpha_1$ to $\alpha_{11}$ to be greater than the projective components $v_{30}\alpha'$ shown in FIG.

27. In this embodiment, the respective maximum values of the projective components $v_{30}\alpha'$ shown in FIG. 27 are set as the threshold values fth($\alpha_m$) for the respective directions $\alpha_1$ to $\alpha_{11}$.

Figure 28A:
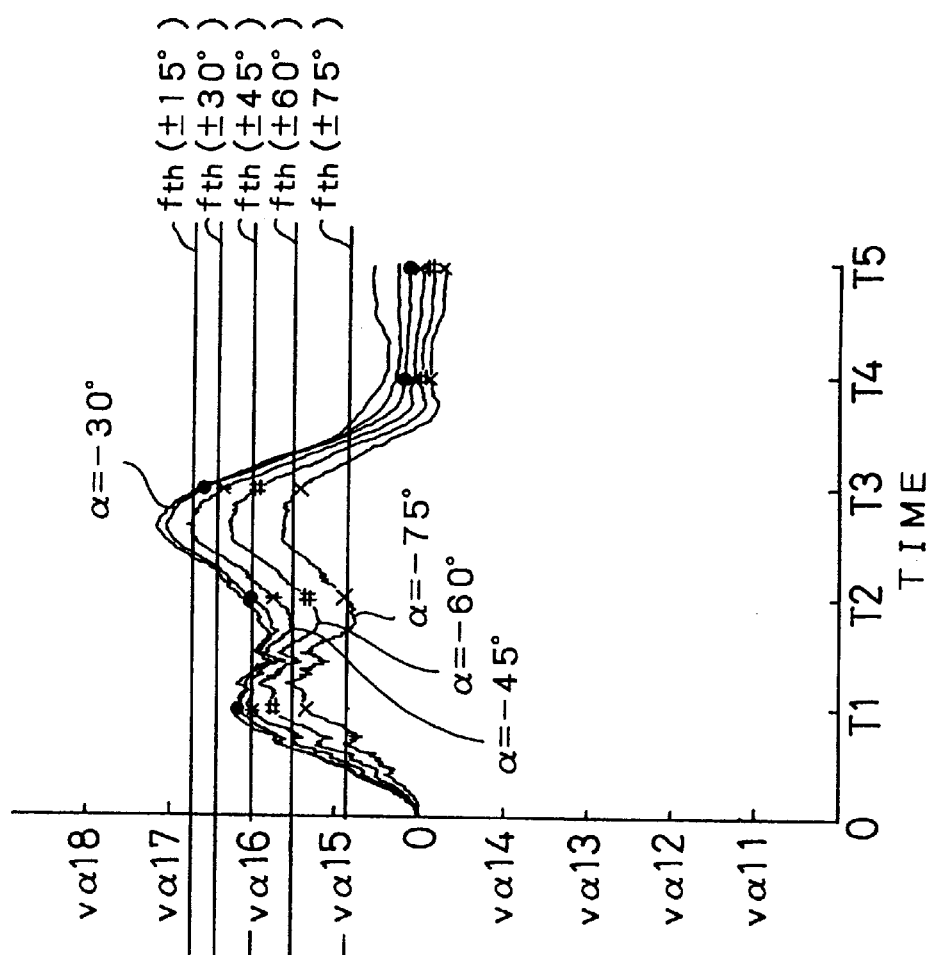
FIGS. 28(a) and 28(b) are characteristic charts showing time-based variations in projective components $v_{30}\alpha'$ of the composite vector in the directions $\alpha_1$ to $\alpha_{11}$ when the vehicle 70 offset-collides on its left side at a medium speed.
Figure 28B:
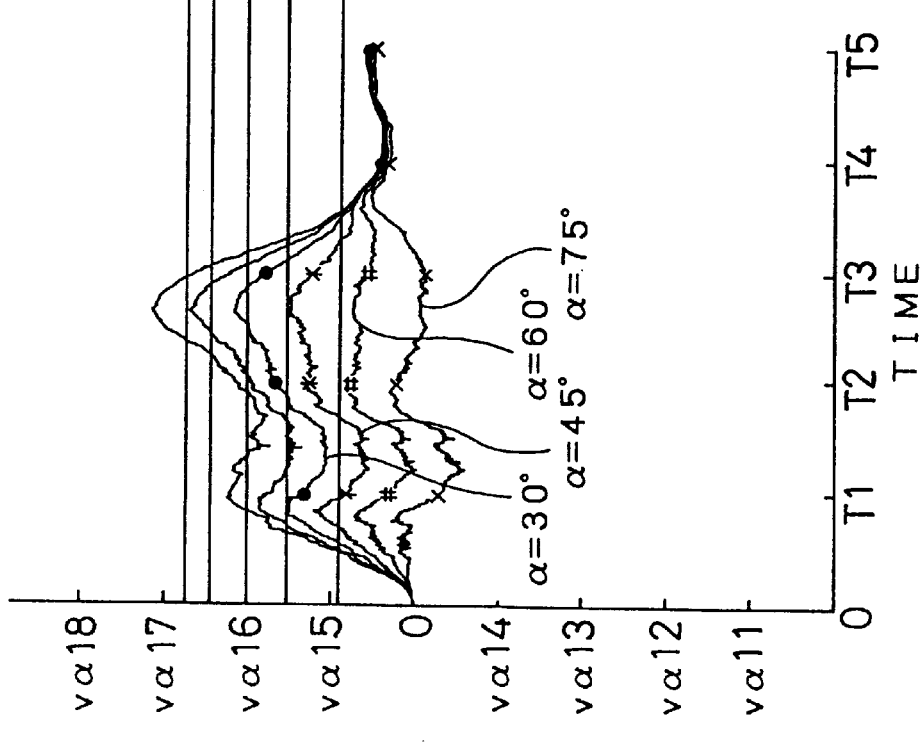
Figures 29A, 29B:
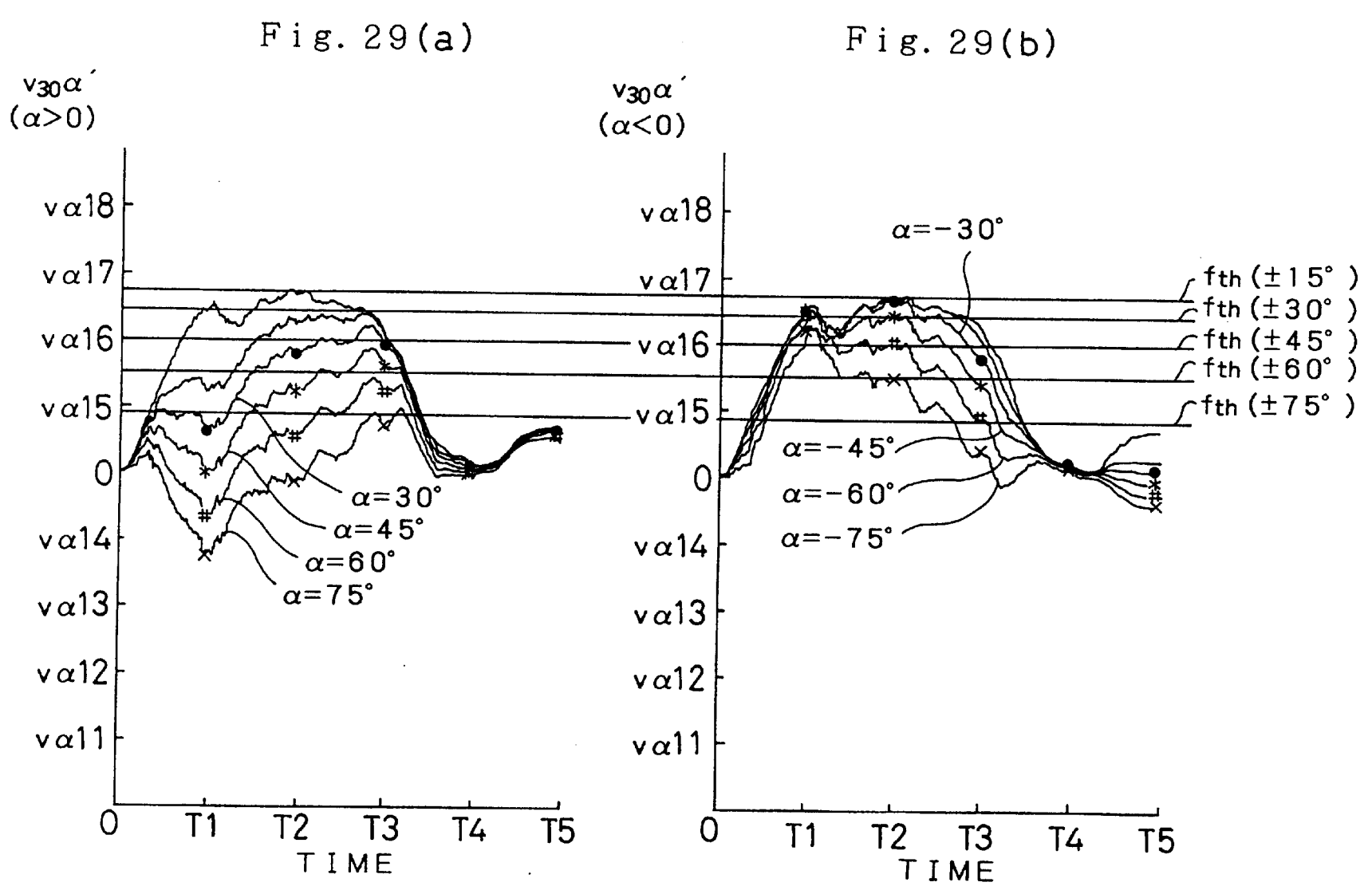

FIGS. 28, 29, and 30 are characteristic charts showing time-based variations in projective components $v_{30}\alpha'$ of the composite vector in the directions $\alpha_1$ to $\alpha_{11}$ when the external force applied to the vehicle 70 is sufficiently large to require the activation of the air bag units 60 to 66. FIGS. 28(a) and 28(b) show the time-based variations when the vehicle 70 offset-collides on its left side at a medium speed; FIGS. 29(a) and 29(b) show the time-based variations when the vehicle 70 obliquely collides on its left side at a medium speed; and FIGS. 30(a) and 30(b) show the time based variations when the vehicle 70 obliquely collides on its left side at a high speed. In these figures, (a) and (b) respectively correspond to the cases of $\alpha \geqq 0$ and $\alpha \leqq 0$.

Referring to FIG. 28, when the vehicle 70 offset-collides on its left side at a medium speed, the projective component $v_{30}\alpha'$ exceeds the preset threshold value fth($\alpha_m$) ($v_{30}\alpha'$>fth($\alpha_m$)) before a time period T1 [ms] has elapsed since the onset of application of the external force in the directions corresponding to the left side of the vehicle 70, that is, -45, -60, and -75 degrees. Referring to FIG. 29, when the vehicle obliquely collides on its left side at a medium speed, the projective component $v_{30}\alpha'$ exceeds the preset threshold value fth(am) before a time period T1 [ms] has elapsed since the onset of application of the external force in the directions corresponding to the left side of the vehicle 70, that is, -45, -60, and -75 degrees. Referring to FIG. 30, when the vehicle obliquely collides on its left side at a high speed, the projective component $v_{30}\alpha'$ exceeds the preset threshold value fth($\alpha_m$) before a time period T1 [ms] has elapsed since the onset of application of the external force in all the directions corresponding to the left side of the vehicle 70, that is, 0, -15, -30, -45, -60, and -75 degrees.

This structure enables the determination of whether or not the air bag units 60 to 66 should be activated to be carried out more effectively when the vehicle 70 comes into a collision which makes the vehicle 70 rotate, such as an offset collision or an oblique collision.

Like the characteristic charts of FIGS. 30(a) and 30(b), the characteristic charts of FIGS. 22(a) and 22(b) discussed above show the time-based variations in projective components when the vehicle 70 obliquely collides on its left side at a high speed. This means that the conditions of collision in FIG. 22 are practically equal to those in FIG. 30. While the arithmetic value fy is used directly in the characteristic charts of FIGS. 22(a) and 22(b), the arithmetic value fy is multiplied by the coefficient '2.5' in the characteristic charts of FIGS. 30(a) and 30(b). The comparison between FIGS. 22 and 30 accordingly clarifies the effect of the second embodiment exerted by multiplying the arithmetic value fy by the predetermined coefficient.

The comparison between FIGS. 22 and 30 shows that multiplication of the arithmetic value by the predetermined coefficient significantly amplifies the projective component $v_{30}\alpha$ in directions $\alpha(<0)$ corresponding to the left side of the vehicle 70. Compared with the curves of FIG. 22, those of FIG. 30 have abrupt rises immediately after the onset of application of the external force. This enables the air bag units 60 to 66 to be activated at a quicker timing.

The procedure of the second embodiment gives the greater weight to the arithmetic value fy than to the arithmetic fx by multiplying only the arithmetic value fy by a coefficient greater than 1. Any other methods are, however, applicable to fundamentally give the greater weight to the arithmetic value fy than to the arithmetic value fx. An alternative process multiplies only the arithmetic value fx by a coefficient smaller than 1, instead of multiplying the arithmetic value fy by a coefficient greater than 1. Another possible process multiplies the arithmetic value fx by a predetermined first coefficient while multiplying the arithmetic value fy by a predetermined second coefficient, which is greater than the first coefficient. This means that the only requirement is to change the ratio of the arithmetic value fx to the arithmetic value fy.

In this embodiment, as shown in FIG. 25B, the CPU 30 includes the coefficient-multiplying unit 30e in the projective component deriving unit 30c, which varies the ratio of the arithmetic value fx to the arithmetic value fy. The coefficient-multiplying unit or a like element may be incorporated in the first arithmetic and logic unit 30a or in the second arithmetic and logic unit 30b, instead of in the projective component deriving unit 30c.

The following describes a third embodiment according to the present invention. The apparatus of the first embodiment discussed above measures the acceleration Gx acting along the longitudinal axis of the vehicle 70 (direction X) with the longitudinal G sensor 22 and the acceleration Gy acting along the lateral axis of the vehicle 70 (direction Y) with the lateral G sensor 24, and controls activation of the air bag units 60 to 66 based on the accelerations Gx and Gy thus measured. In accordance with another preferable application, the apparatus may further measure an acceleration Gz acting along the vertical axis of the vehicle 70 (Z direction) and control activation of the air bag units 60 to 66 based on the accelerations in the three directions.

Figure 31A:
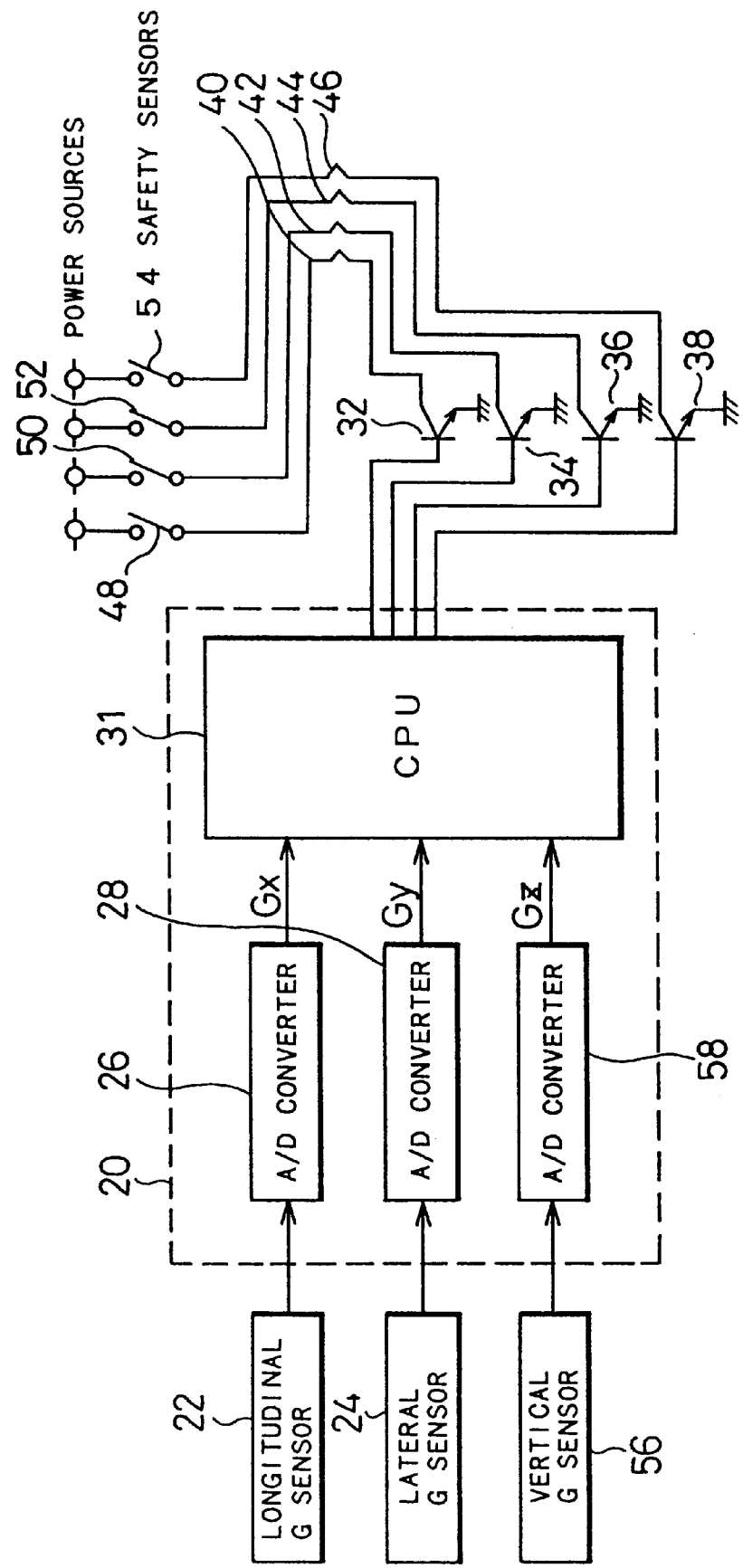
FIG. 31A is a block diagram illustrating an activation control apparatus for controlling activation of air bag units, as a third embodiment according to the present invention.

FIG. 31A is a block diagram illustrating an activation control apparatus for controlling activation of air bag units as a third embodiment according to the present invention. The apparatus of the third embodiment includes three G sensors as shown in FIG. 31A, that is, the longitudinal G sensor 22 and the lateral G sensor 24 as well as a vertical G sensor 56 for measuring the acceleration Gz acting along the vertical axis of the vehicle 70 (Z direction). The acceleration Gz in the vertical direction measured by the vertical G sensor 56 is output as an analog signal, converted to a digital signal by an A/D converter 58, and transmitted to a CPU 31.

The CPU 31 carries out a variety of processing operations to control activation of the air bag units 60 to 66 based on the input accelerations Gx, Gy, and Gz according to programs stored in a ROM (not shown) and the like, and outputs an activation signal to activate the air bag units 60 to 66.

Figure 31B:
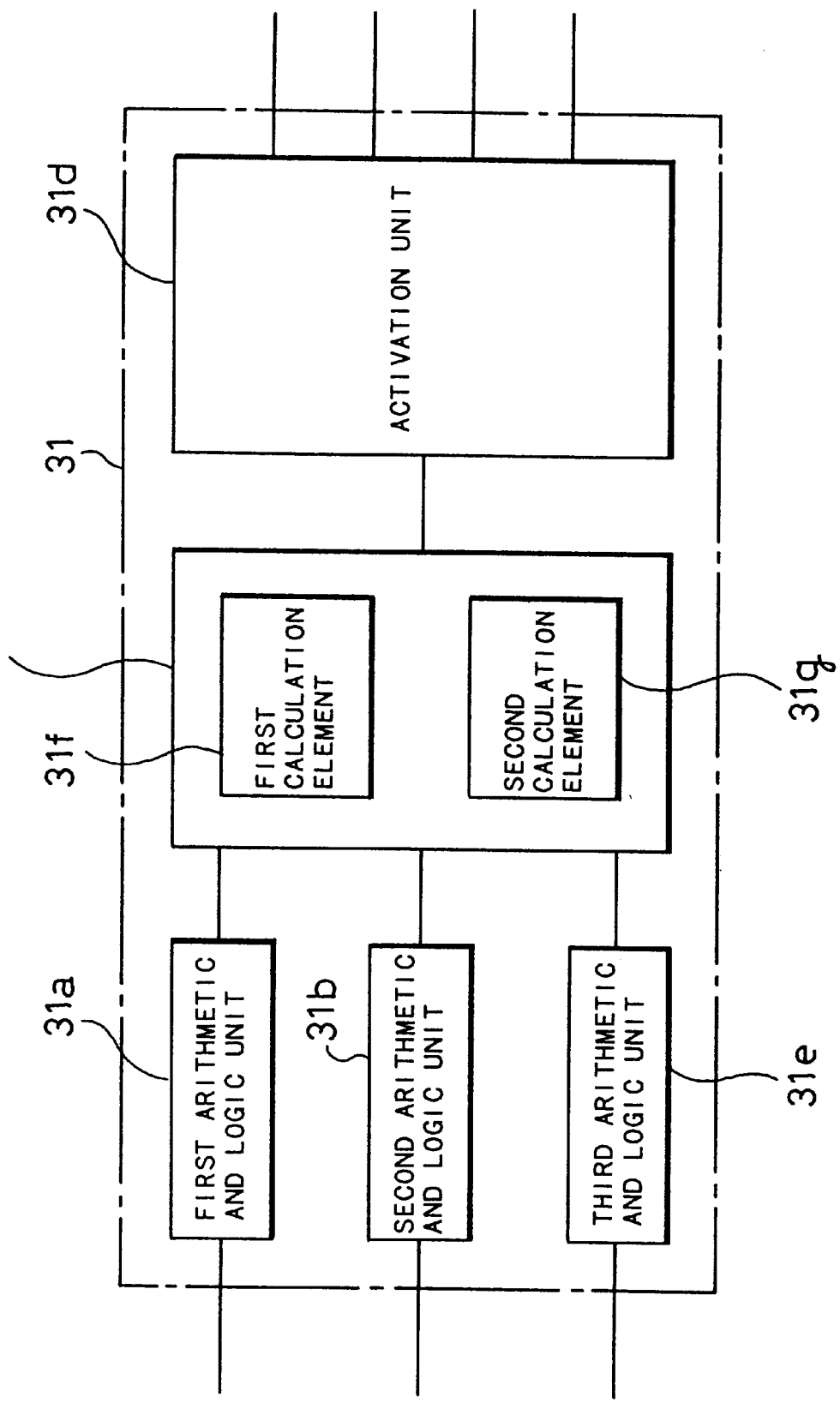
FIG. 31B is a block diagram showing various functions of the CPU 31 included in the activation control apparatus of FIG. 31A.

FIG. 31B is a block diagram illustrating various functions of the CPU 31 included in the activation control apparatus of FIG. 31A. Referring to FIG. 31B, the CPU 31 includes a first arithmetic and logic unit 31a for calculating an arithmetic value fx from the acceleration Gx in the longitudinal direction by specified arithmetic operations, a second arithmetic and logic unit 31b for calculating an arithmetic value fy from the acceleration Gy in the lateral direction by specified arithmetic operations, a third arithmetic and logic unit 31e for calculating an arithmetic value fz from the acceleration Gz in the vertical direction by specified arithmetic operations, a projective component deriving unit 31c for deriving a projective component of a composite vector (described later) from the arithmetic values fx, fy, and fz, and an activation unit 31d for activating the air bag units 60 to 66 based on the derived projective component. The projective component deriving unit 31c further includes a first calculation element 31f and a second calculation element 31g.

The other constituents of the apparatus shown in FIG. 31A are identical with those of FIG. 1A and are thus not specifically described here.

Figure 32:
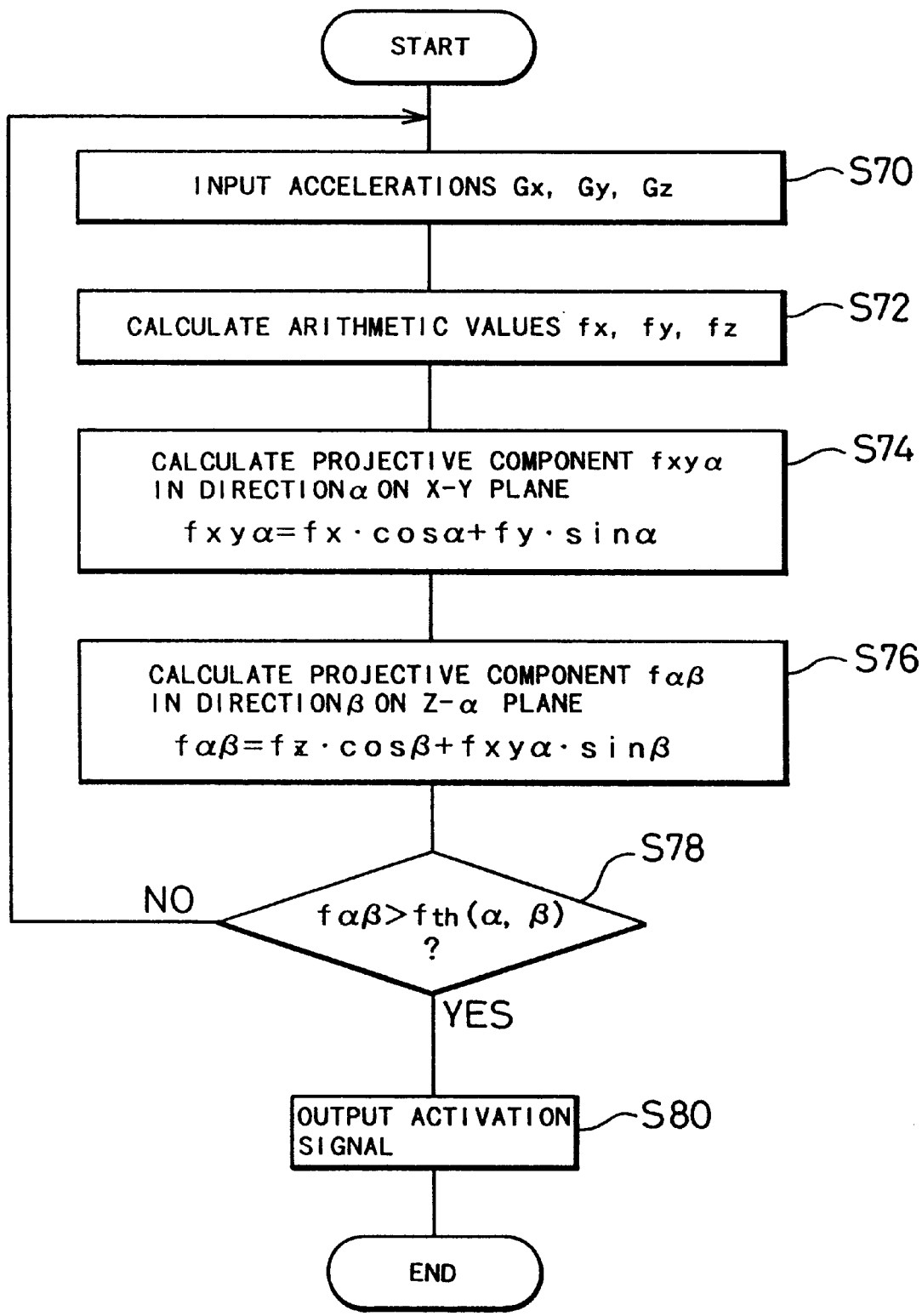
FIG. 32 is a flowchart showing a control routine of the third embodiment executed by the CPU 31 shown in FIG. 31B.

The following describes an activation control procedure of the third embodiment. FIG. 32 is a flowchart showing a control routine of the third embodiment executed by the CPU 31 of FIG. 31B. When the program enters the control routine, the accelerations Gx, Gy, and Gz are input at step S70. In accordance with a concrete procedure, the CPU 31 reads the acceleration Gx in the longitudinal direction measured by the longitudinal G sensor 22, the acceleration Gy in the lateral direction measured by the lateral G sensor 24, and the acceleration Gz in the vertical direction measured by the vertical G sensor 56 at step S70.

The CPU 31 then carries out specified arithmetic operations to calculate the arithmetic values fx, fy, and fz from the acceleration Gx in the longitudinal direction, the acceleration Gy in the lateral direction, and the acceleration Gz in the vertical direction thus measured at step S72.

Figure 33A:
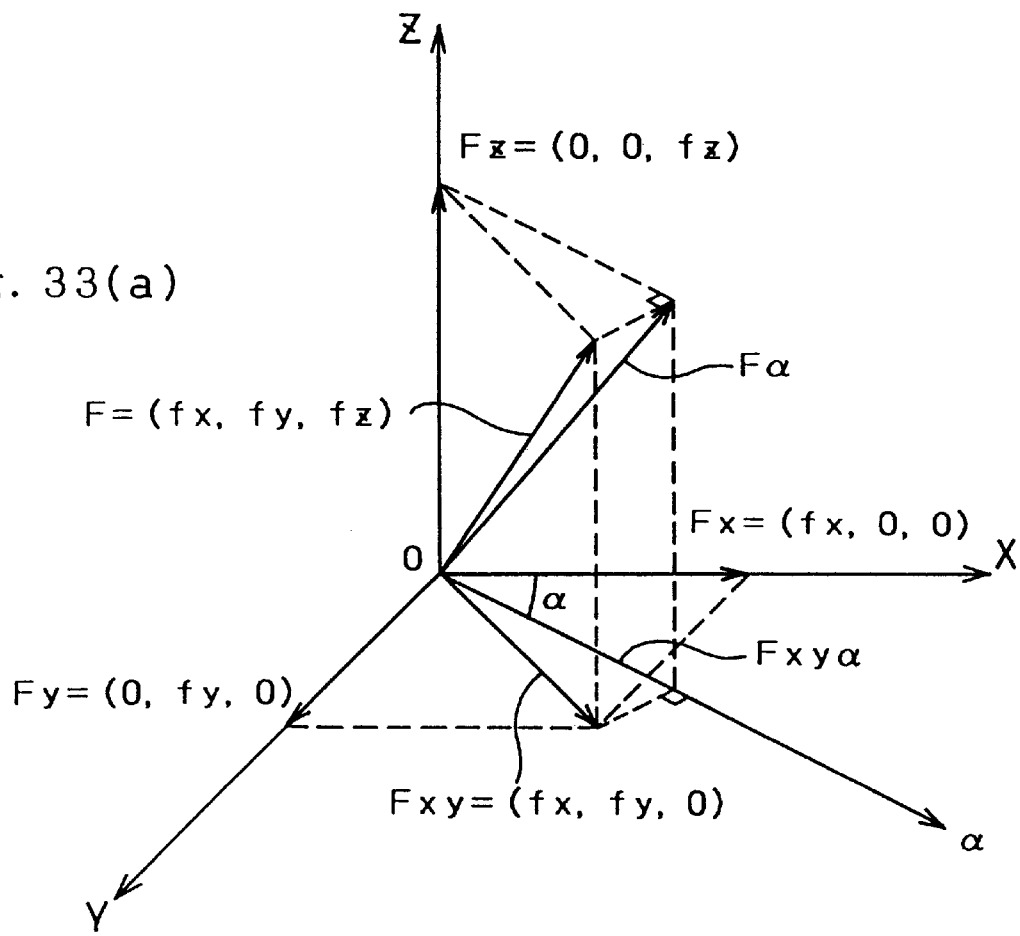
FIGS. 33(a) and 33(b) show a process of determining a projective component in preset directions $\alpha$ and $\beta$.
Figure 33B:
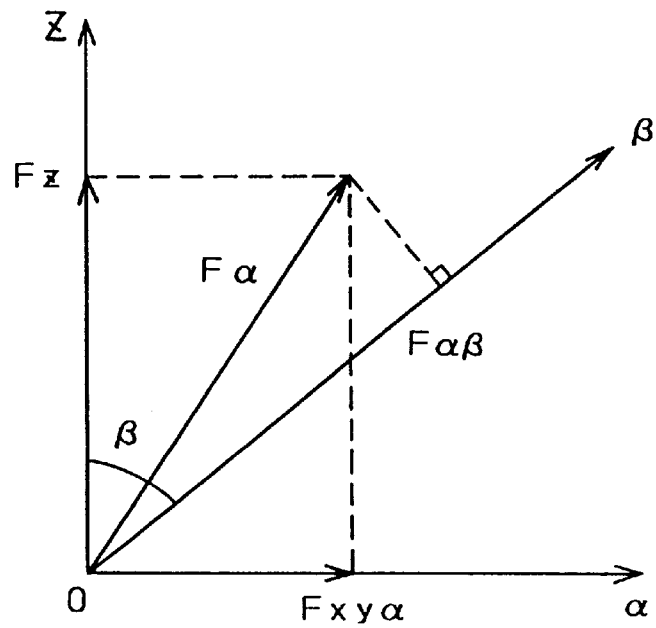

At subsequent steps S74 and S76, a projective component $f\alpha\beta$ in preset directions $\alpha$ and $\beta$ is calculated from the three arithmetic values fx, fy, and fz. FIGS. 33(a) and 33(b) show a process of determining a projective component in the preset directions $\alpha$ and $\beta$. FIG. 33(a) shows the three-dimensional space defined by X, Y, and Z axes and FIG. 33(b) the Z-$\alpha$ plane of FIG. 33(a).

In this embodiment, appropriate directions $\alpha$ and $\beta$ are set in advance, wherein the direction $\alpha$ is given as an angle relative to 0 degree representing the front center of the vehicle 70 along the longitudinal axis thereof, and the direction $\beta$ as an angle relative to 0 degree representing the top center of the vehicle 70 along the vertical axis thereof. Referring to FIG. 33(a), the technique of the third embodiment first derives a composite vector Fxy=(fx, fy, 0) from the following two vectors: a vector Fx, which is based on the arithmetic value fx, extends in the direction X (that is, along the longitudinal axis of the vehicle 70), and has an x component equal to fx and y and z components equal to zero; and a vector Fy, which is based on the arithmetic value fy, extends in the direction Y (that is, along the lateral axis of the vehicle 70), and has a y component equal to fy and x and z components equal to zero. The process then projects the composite vector Fxy in a preset direction $\alpha$ on the X-Y plane to yield a projective vector Fxy$\alpha$, and calculates a magnitude fxy$\alpha$ of the projective vector Fxy (that is, a projective component of the composite vector Fxy). The first calculation element 31f in the projective component deriving unit 31c takes charge of calculation of the projective component fxy$\alpha$.

Further referring to FIG. 33(a), at a next step, the process derives a composite vector F$\alpha$ from the projective vector Fxy$\alpha$ and another vector Fz, which is based on the arithmetic value fz, extends in the direction Z (that is, along the vertical axis of the vehicle 70), and has a z component equal to fz and x and y components equal to zero. The composite vector F$\alpha$ coincides with a projective vector obtained by projecting a composite vector F of the vectors Fx, Fy, and Fz on the Z-$\alpha$ plane. Referring to FIG. 33(b), the process then projects the composite vector F$\alpha$ in a preset direction $\beta$ on the Z-$\alpha$ plane to yield a projective vector F$\alpha\beta$, and calculates a magnitude f$\alpha\beta$ of the projective vector F$\alpha\beta$ (that is, a projective component of the composite vector F$\alpha$). The second calculation element 31g in the projective component deriving unit 31c takes charge of calculation of the projective component f$\alpha\beta$.

In accordance with a concrete procedure, the CPU 31 first calculates the projective component fxy$\alpha$ of the composite vector Fxy in the direction $\alpha$ on the X-Y plane at step S74. The projective component fxy$\alpha$ can be obtained according to Equation (11), which is practically equivalent to Equation (4):

$$fxy\alpha = fx \cdot \cos\alpha + fy \cdot \sin\alpha \qquad (11)$$

At subsequent step S76, the CPU 31 calculates the projective component f$\alpha\beta$ of the composite vector F$\alpha$ in the direction $\beta$ n the Z-$\alpha$ plane. The projective component f$\alpha\beta$ can be calculated from the projective component fxy$\alpha$ obtained at step S74 according to Equation (12), which is practically equivalent to Equation (4):

$$f\alpha\beta = fz \cdot \cos\beta + fxy\alpha \cdot \sin\beta \qquad (12)$$

After determining the projective component f$\alpha\beta$ in the directions $\alpha$ and $\beta$ at steps S74 and S76, the program proceeds to step S78, at which the projective component f$\alpha\beta$ thus obtained is compared with a threshold value fth($\alpha\beta$) preset for the directions $\alpha$ and $\beta$ and it is determined whether the projective component f$\alpha\beta$ is greater than the threshold value fth($\alpha\beta$) (f$\alpha\beta$>fth($\alpha\beta$)).

When the projective component f$\alpha\beta$ is determined to be equal to or less than the threshold value fth($\alpha\beta$) at step S78, there is no need to activate the air bag units 60 to 66 and the program thus returns to step S70 to repeat the processing of step S70 and the subsequent steps. When the projective component f$\alpha\beta$ is determined to be greater than the threshold value fth($\alpha\beta$) at step S78, on the contrary, the program proceeds to step S80 at which the CPU 31 generates an activation signal in order to activate the air bag units 60 to 66.

The structure of the third embodiment additionally measures the acceleration Gz acting along the vertical axis of the vehicle 70 (Z direction) and controls activation of the air bag units 60 to 66 based on the accelerations in the three directions, thereby realizing the more precise and accurate activation control. The system of the third embodiment does not require the calculation of the magnitude or direction of the three-dimensional composite vector F based on the arithmetic values fx, fy, and fz, thus being free from complicated and time-consuming arithmetic operations and attaining the effective activation control based on the three-dimensional information.

Figures 34A, 34B:
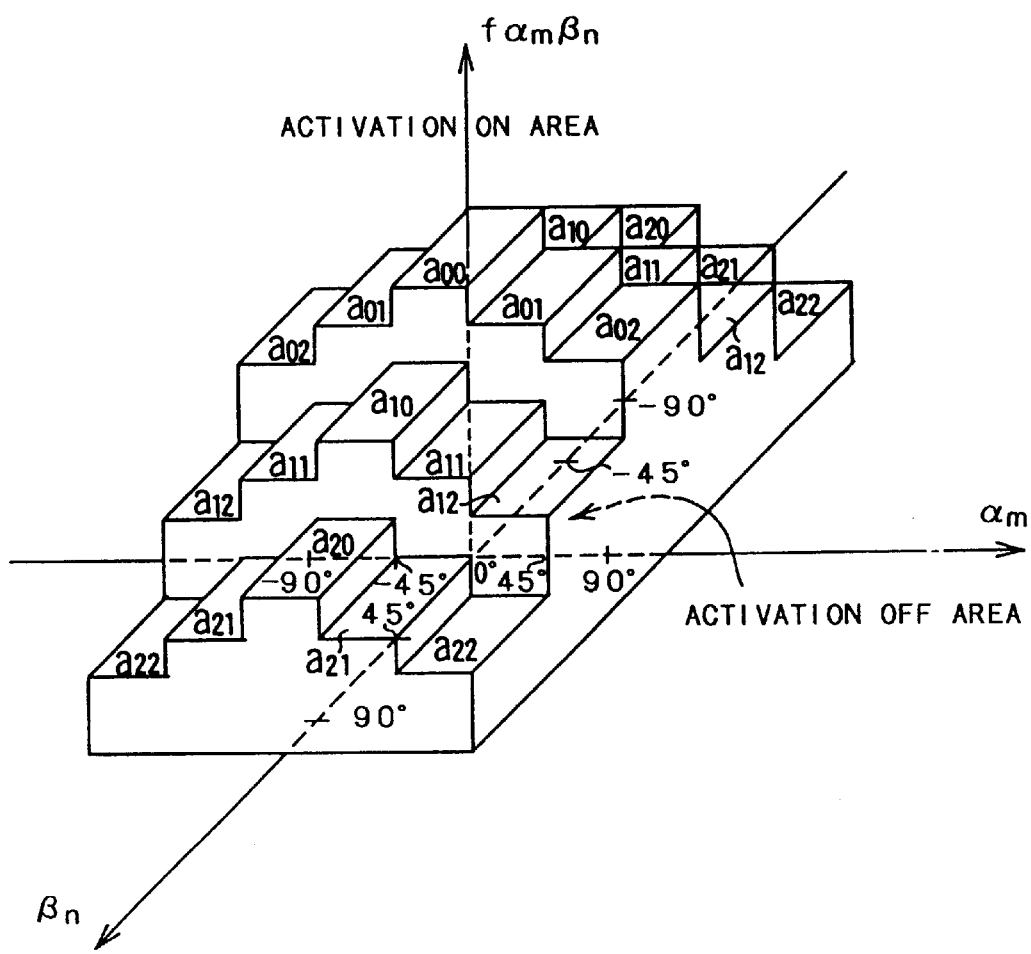
FIGS. 34(a) and 34(b) show threshold values $fth(\alpha_m\beta_n)$ for the respective combinations of directions $\alpha_m$ and $\beta_n$, as well as an activation ON area and an activation OFF area of the air bag units separated from each other by the threshold values $fth(\alpha_m\beta_n)$.

As discussed above with the drawings of FIGS. 7 through 10, in accordance with one preferable application of the embodiment, a plurality of directions $\alpha$ and a plurality of directions $\beta$ are set in advance, and projective components f$\alpha_m\beta_n$ of the composite vector are calculated for the respective combinations of directions $\alpha_m\beta_n$. In this case, threshold values fth($\alpha_m\beta_n$) are preset for the respective combinations of directions $\alpha_m$, $\beta_n$, for example, as shown in FIG. 34. FIGS. 34(a) and 34(b) show threshold values fth($\alpha_m\beta_n$) for the respective combinations of directions $\alpha_m$ and $\beta_n$, as well as an activation ON area and an activation OFF area of the air bag units separated from each other by the threshold values fth($\alpha_m\beta_n$). When the threshold values fth($\alpha_m\beta_n$) are set for the respective combinations of directions $\alpha_m$ and $\beta_n$ as shown in FIG. 34(a), the threshold values fth($\alpha_m\beta_n$) are specified in the three-dimensional coordinate system of the directions $\alpha_m$ and $\beta_n$ and the projective component f$\alpha_m\beta_n$, as shown in FIG. 34(b). In the example of FIG. 34, the composite vector is projected in the twenty five different combinations of directions $\alpha$ and $\beta$, which respectively range from −90° to 90° at intervals of 45°.

Referring to FIG. 34(b), the air bag units 60 to 66 are not activated when the projective component f$\alpha_m\beta_n$ is in a lower area (activation OFF area) among the two areas separated from each other by the threshold values fth($\alpha_m\beta_n$). At least some of the air bag units 60 to 66 are activated, on the other hand, when the projective component $f\alpha_m\beta_n$ is in an upper area (activation ON area). The greater values of $a_{00}$, $a_{01}$, and $a_{02}$ in FIG. 34 deteriorate the sensitivity of activation control with respect to the acceleration Gz acting along the vertical axis of the vehicle 70.

As discussed above, the preferable structure of the embodiment presets a plurality of directions α and a plurality of directions β and determines projective components $f\alpha_m\beta_n$ of the composite vector for the respective combinations of projecting directions $\alpha_m$, $\beta_n$, thereby recognizing the direction of the external force applied to the vehicle in a three-dimensional manner. This enables only the required ones among the plurality of air bag units disposed in the vehicle to be selectively activated corresponding to the direction in which the external force applied to the vehicle.

The present invention is not restricted to the above embodiments or applications, but there may be many modifications, changes, and alterations without departing from the scope and the spirit of the main characteristics of the present invention.

Although all the above embodiments are directed to the air bag units, the principle of the invention may also be applicable to other passive restraints, such as a seat belt with pre-loader. The seat belt with pre-loader acts to further enhance the functions of the normal seat belt, wherein the seat belt is wound up, for example, by means of a gas evolved by an inflator.

All the embodiments discussed above relate to the activation control apparatus for passive restraints. Projective component detection apparatus may be constructed by omitting only the activation means, which compares the sum of the projective components with a preset threshold value to activate the passive restraints, from the activation control apparatus. In this case, the projective component detected by the projective component detection apparatus may be used for various purposes other than the activation control of the passive restraints.

It should be clearly understood that the embodiments discussed above are only illustrative and not restrictive in any sense. The scope and spirit of the present invention are limited only by the terms of the appended claims.

What is claimed is:

1. An activation control apparatus for controlling activation of a passive restraint mounted on a vehicle, said apparatus comprising:

acceleration measuring means for measuring a first acceleration acting in a first direction of said vehicle and a second acceleration acting in a second direction of said vehicle, which is different from said first direction;

first arithmetic and logic means for calculating a first arithmetic value from said first acceleration according to a specified arithmetic operation;

second arithmetic and logic means for calculating a second arithmetic value from said second acceleration according to a specified arithmetic operation;

projective component deriving means for setting a first vector that is along said first direction and based on said first arithmetic value and a second vector that is along said second direction and based on said second arithmetic value, deriving projective components of said first vector and said second vector in a specified projecting direction in a plane including said first vector and said second vector, and summing up the projective components thus derived; and activation means for activating said passive restraint based on the sum of the projective components.

2. An activation control apparatus in accordance with claim 1, wherein said projective component deriving means presets a plurality of projecting directions, derives projective components of said first vector and said second vector in each of said projecting directions, and sums up the projective components for said each projecting direction, said activation means activating said passive restraint based on any one of the sums of the projective components obtained for the respective projecting directions.

3. An activation control apparatus in accordance with either one of claims 1 and 2, wherein at least one of said first arithmetic and logic means, said second arithmetic and logic means, and said projective component deriving means further comprises means for varying a ratio of said first arithmetic value to said second arithmetic value to relatively vary an effect said first arithmetic value and said second arithmetic value have on the sum of said projective components.

4. An activation control apparatus for controlling activation of a passive restraint mounted on a vehicle, said apparatus comprising:

acceleration measuring means for measuring a first acceleration acting in a first direction of said vehicle, a second acceleration acting in a second direction of said vehicle, and a third acceleration acting in a third direction of said vehicle, said first direction, said second direction, and said third direction being different from one another;

first arithmetic and logic means for calculating a first arithmetic value from said first acceleration according to a specified arithmetic operation;

second arithmetic and logic means for calculating a second arithmetic value from said second acceleration according to a specified arithmetic operation;

third arithmetic and logic means for calculating a third arithmetic value from said third acceleration according to a specified arithmetic operation;

first projective component deriving means for setting a first vector that is along said first direction and based on said first arithmetic value and a second vector that is along said second direction and based on said second arithmetic value, deriving projective components of said first vector and said second vector in a specified first projecting direction in a plane including said first vector and said second vector, and summing up the projective components thus derived to yield a fourth arithmetic value;

second projective component deriving means for setting a third vector that is along said third direction and based on said third arithmetic value and a fourth vector that is along said first projecting direction and based on said fourth arithmetic value, deriving projective components of said third vector and said fourth vector in a specified second projecting direction in a plane including said third vector and said fourth vector, and summing up the projective components thus derived; and activation means for activating said passive restraint based on the sum of the projective components given by said second projective component deriving means.

5. An activation control apparatus in accordance with claim 4, wherein said first projective component deriving means presets a plurality of first projecting directions, derives projective components of said first vector and said second vector in each of said first projecting directions, and sums up the projective components to yield a fourth arithmetic value for said each first projecting direction, said second projective component deriving means presets a plurality of second projecting directions, derives projective components of said third vector and said fourth vector in each of said second projecting directions, and sums up the projective components for said each second projecting direction, said activation means activating said passive restraint based on any one of the sums of the projective components obtained for the respective second projecting directions.

6. A method of controlling activation of a passive restraint mounted on a vehicle, said method comprising the steps of:

(a) measuring a first acceleration acting in a first direction of said vehicle and a second acceleration acting in a second direction of said vehicle, which is different from said first direction;

(b) calculating a first arithmetic value from said first acceleration according to a specified arithmetic operation, and calculating a second arithmetic value from said second acceleration according to a specified arithmetic operation;

(c) setting a first vector that is along said first direction and based on said first arithmetic value and a second vector that is along said second direction and based on said second arithmetic value, deriving projective components of said first vector and said second vector in a specified projecting direction in a plane including said first vector and said second vector, and summing up the projective components thus derived; and (d) activating said passive restraint based on the sum of the projective components.

7. A method in accordance with claim 6, wherein said step (c) further comprises the steps of: presetting a plurality of projecting directions, deriving projective components of said first vector and said second vector in each of said projecting directions, and summing up the projective components for said each projecting direction, said step (d) further comprising the step of: activating said passive restraint based on any one of the sums of the projective components obtained for the respective projecting directions.

8. A method in accordance with either one of claims 6 and 7, wherein at least one of said steps (b) and (c) further comprises the step of: varying a ratio of said first arithmetic value to said second arithmetic value to relatively vary an effect said first arithmetic value and said second arithmetic value have on the sum of said projective components.

9. A method of controlling activation of a passive restraint mounted on a vehicle, said method comprising the steps of:

(a) measuring a first acceleration acting in a first direction of said vehicle, a second acceleration acting in a second direction of said vehicle, and a third acceleration acting in a third direction of said vehicle, said first direction, said second direction, and said third direction being different from one another;

(b) calculating a first arithmetic value from said first acceleration according to a specified arithmetic operation, calculating a second arithmetic value from said second acceleration according to a specified arithmetic operation, and calculating a third arithmetic value from said third acceleration according to a specified arithmetic operation;

(c) setting a first vector that is along said first direction and based on said first arithmetic value and a second vector that is along said second direction and based on said second arithmetic value, deriving projective components of said first vector and said second vector in a specified first projecting direction in a plane including said first vector and said second vector, and summing up the projective components thus derived to yield a fourth arithmetic value;

(d) setting a third vector that is along said third direction and based on said third arithmetic value and a fourth vector that is along said first projecting direction and based on said fourth arithmetic value, deriving projective components of said third vector and said fourth vector in a specified second projecting direction in a plane including said third vector and said fourth vector, and summing up the projective components thus derived; and (e) activating said passive restraint based on the sum of the projective components given in said step (d).

10. A method in accordance with claim 9, wherein said step (c) further comprises the steps of: presetting a plurality of first projecting directions, deriving projective components of said first vector and said second vector in each of said first projecting directions, and summing up the projective components to yield a fourth arithmetic value for said each first projecting direction, said step (d) further comprising the steps of: presetting a plurality of second projecting directions, deriving projective components of said third vector and said fourth vector in each of said second projecting directions, and summing up the projective components for said each second projecting direction, said step (e) further comprising the step of: activating said passive restraint based on any one of the sums of the projective components obtained for the respective second projecting directions.

* * * * *